United States Patent
Omura et al.

(10) Patent No.: US 12,166,191 B2
(45) Date of Patent: Dec. 10, 2024

(54) BATTERY MODULE AND BATTERY PACK

(71) Applicant: PANASONIC INTELLECTUAL PROPERTY MANAGEMENT CO., LTD., Osaka (JP)

(72) Inventors: Tetsuji Omura, Hyogo (JP); Toshiya Gotou, Osaka (JP); Shinya Motokawa, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 736 days.

(21) Appl. No.: 17/264,246

(22) PCT Filed: Jul. 26, 2019

(86) PCT No.: PCT/JP2019/029399
§ 371 (c)(1),
(2) Date: Jan. 28, 2021

(87) PCT Pub. No.: WO2020/026973
PCT Pub. Date: Feb. 6, 2020

(65) Prior Publication Data
US 2021/0296721 A1  Sep. 23, 2021

(30) Foreign Application Priority Data

Jul. 31, 2018 (JP) .................. 2018-144222
Aug. 29, 2018 (JP) .................. 2018-160715
(Continued)

(51) Int. Cl.
*H01M 10/6556* (2014.01)
*H01M 10/613* (2014.01)
(Continued)

(52) U.S. Cl.
CPC ..... *H01M 10/6556* (2015.04); *H01M 10/613* (2015.04); *H01M 10/647* (2015.04);
(Continued)

(58) Field of Classification Search
CPC .......... H01M 10/6556; H01M 10/613; H01M 10/647; H01M 10/653; H01M 10/6553;
(Continued)

(56) References Cited

U.S. PATENT DOCUMENTS 8,940,421 B2 *  1/2015  Zhao .................. H01M 50/553
429/432
2011/0097614 A1 *  4/2011  Kim .................... H01M 10/613
429/120

(Continued)

FOREIGN PATENT DOCUMENTS

EP  3343672 A1  7/2018
JP  2012-018904 A  1/2012
(Continued)

OTHER PUBLICATIONS

English Translation of Chinese Office Action dated Nov. 15, 2022 for the related Chinese Patent Application No. 201980044731.7.

*Primary Examiner* — Matthew J Merkling
(74) *Attorney, Agent, or Firm* — Rimon P.C.

(57) ABSTRACT

Battery module includes a plurality of batteries (secondary batteries), one or more bus bars that electrically connect the plurality of batteries, and cooling plate that is in contact with bus bar and has one or more passages through which a coolant flows. Each of the plurality of batteries has: an electrode body; an outer can that accommodates the electrode body; a lid that seals an opening of the outer can; and positive electrode terminal and negative electrode terminal that are individually inserted through a pair of through holes provided on the lid, are insulated from the lid, and are
(Continued)

electrically connected to the electrode body. One of positive electrode terminal and negative electrode terminal is connected to bus bar.

50 Claims, 36 Drawing Sheets

(30) Foreign Application Priority Data

| Aug. 29, 2018 | (JP) | ................................. 2018-160716 |
| Sep. 28, 2018 | (JP) | ................................. 2018-183258 |
| Sep. 28, 2018 | (JP) | ................................. 2018-183259 |

(51) Int. Cl.
| *H01M 10/647* | (2014.01) |
| *H01M 10/653* | (2014.01) |
| *H01M 10/6553* | (2014.01) |
| *H01M 10/6567* | (2014.01) |
| *H01M 10/658* | (2014.01) |
| *H01M 50/209* | (2021.01) |
| *H01M 50/224* | (2021.01) |
| *H01M 50/227* | (2021.01) |
| *H01M 50/276* | (2021.01) |
| *H01M 50/278* | (2021.01) |
| *H01M 50/289* | (2021.01) |
| *H01M 50/50* | (2021.01) |
| *H01M 50/526* | (2021.01) |

(52) U.S. Cl.
CPC ..... *H01M 10/653* (2015.04); *H01M 10/6553* (2015.04); *H01M 10/6567* (2015.04); *H01M 10/658* (2015.04); *H01M 50/209* (2021.01); *H01M 50/224* (2021.01); *H01M 50/227* (2021.01); *H01M 50/276* (2021.01); *H01M 50/278* (2021.01); *H01M 50/289* (2021.01); *H01M 50/50* (2021.01); *H01M 50/526* (2021.01)

(58) Field of Classification Search
CPC ........... H01M 10/6567; H01M 10/658; H01M 50/526
See application file for complete search history.

(56) References Cited

U.S. PATENT DOCUMENTS

| 2012/0009461 | A1 | 1/2012 | Kim et al. |
| 2012/0141861 | A1* | 6/2012 | Uchida ............... H01M 50/591 |
| | | | 429/179 |
| 2012/0171532 | A1* | 7/2012 | Lee ................... H01M 10/6556 |
| | | | 429/72 |
| 2014/0193678 | A1 | 7/2014 | Kim |
| 2016/0293926 | A1 | 10/2016 | Yamada |
| 2017/0077566 | A1* | 3/2017 | Mascianica ....... H01M 10/6556 |
| 2017/0098808 | A1* | 4/2017 | Guen ................. H01M 10/058 |
| 2017/0222283 | A1 | 8/2017 | Choi |
| 2018/0069277 | A1* | 3/2018 | Mastrandrea ....... H01M 10/613 |
| 2018/0269545 | A1 | 9/2018 | Liu et al. |
| 2019/0074557 | A1 | 3/2019 | Shin et al. |
| 2019/0207184 | A1* | 7/2019 | Koutari ............. H01M 50/534 |
| 2019/0252744 | A1* | 8/2019 | Zimmermann ........ B64D 27/24 |
| 2022/0045387 | A1* | 2/2022 | Taniuchi ........... H01M 10/6568 |

FOREIGN PATENT DOCUMENTS

| JP | 2012-181972 A | 9/2012 |
| JP | 2012-216360 A | 11/2012 |
| JP | 2013-110039 A | 6/2013 |
| JP | 2014-135247 A | 7/2014 |
| JP | 2016-189248 A | 11/2016 |
| JP | 2017-084630 A | 5/2017 |
| JP | 2017-534143 A | 11/2017 |
| JP | 2019-009220 A | 1/2019 |
| WO | 2017/088719 A1 | 6/2017 |

* cited by examiner

FIG. 14
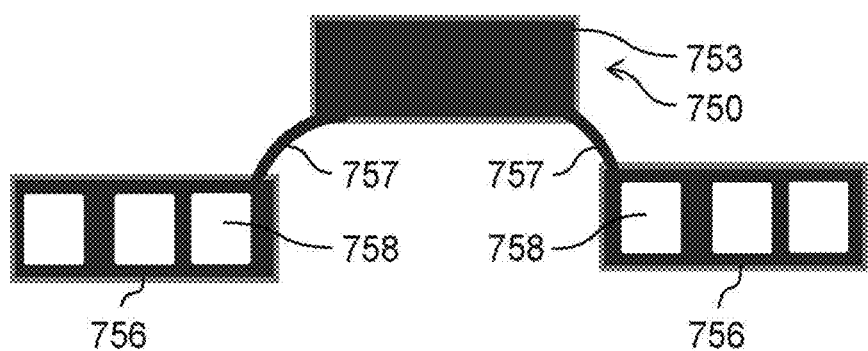
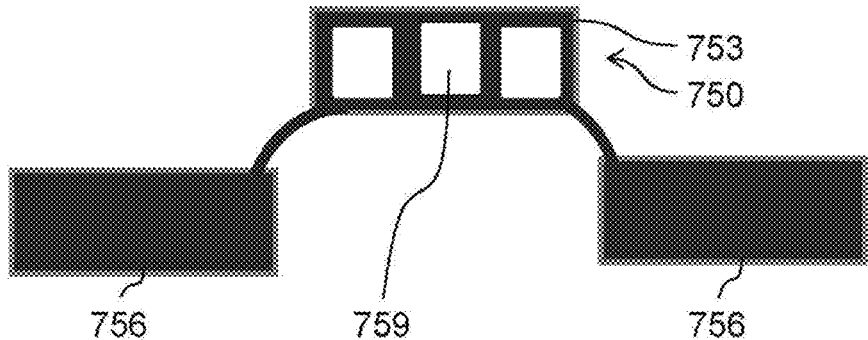
FIG. 15
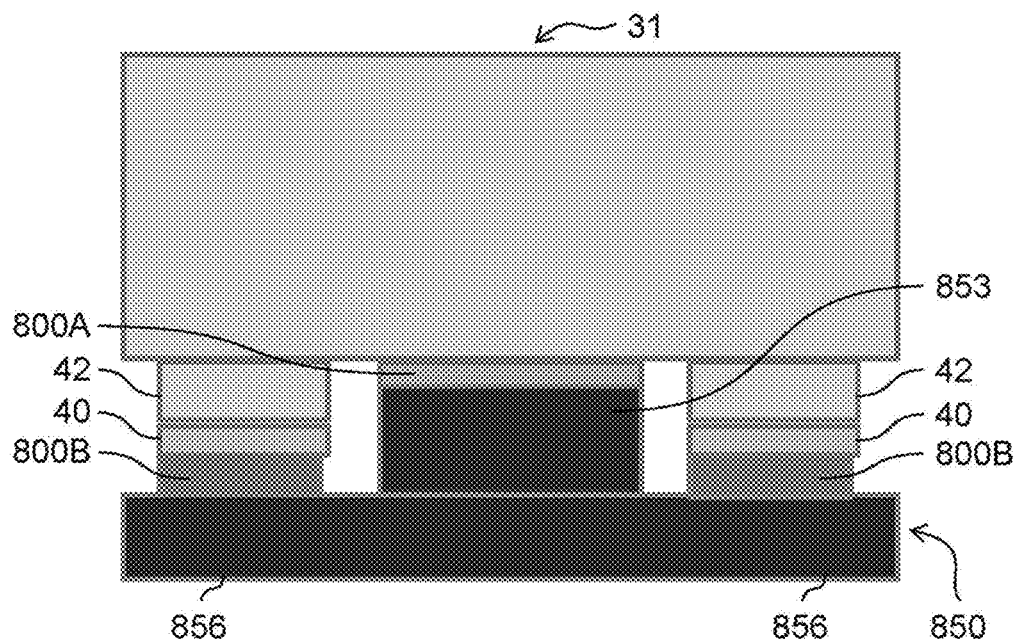

FIG. 17
(A)
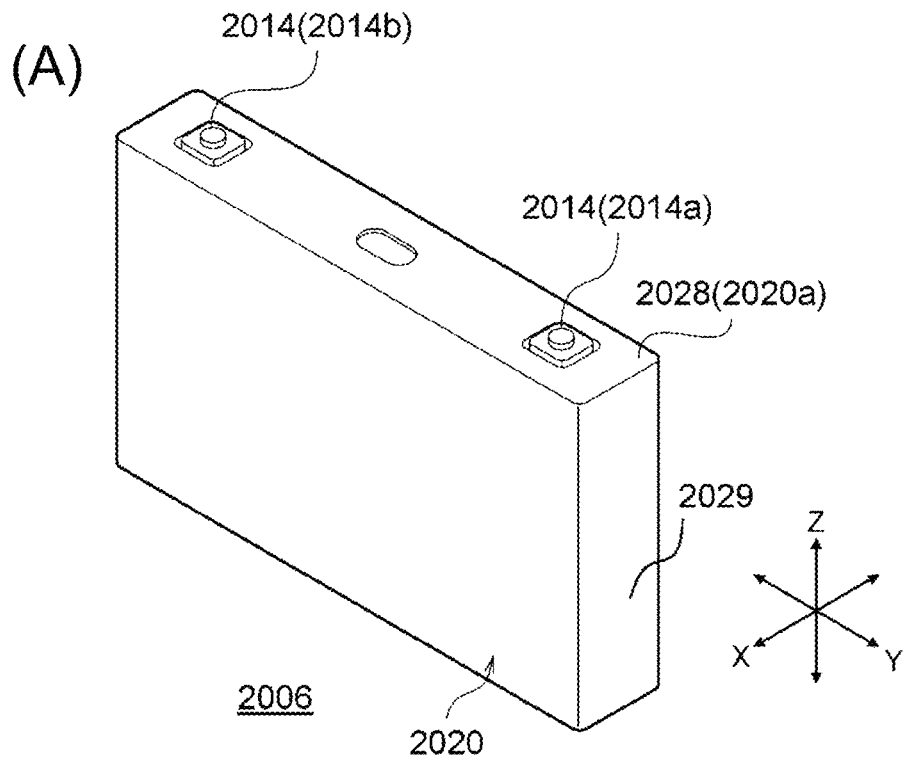
(B)
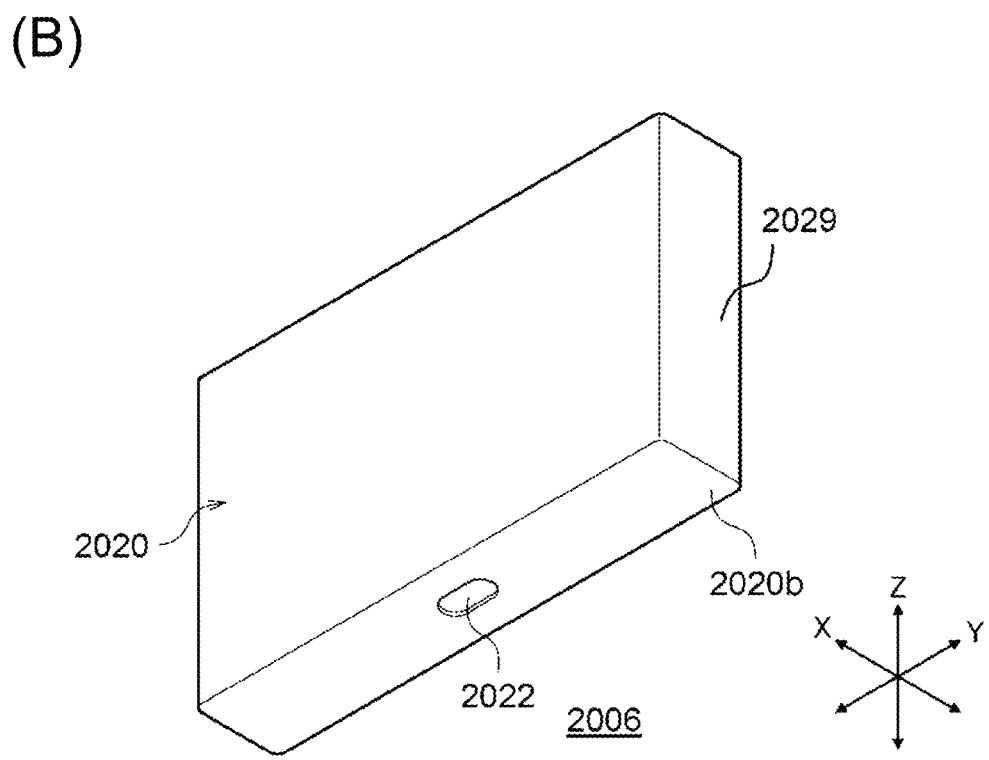

FIG. 19
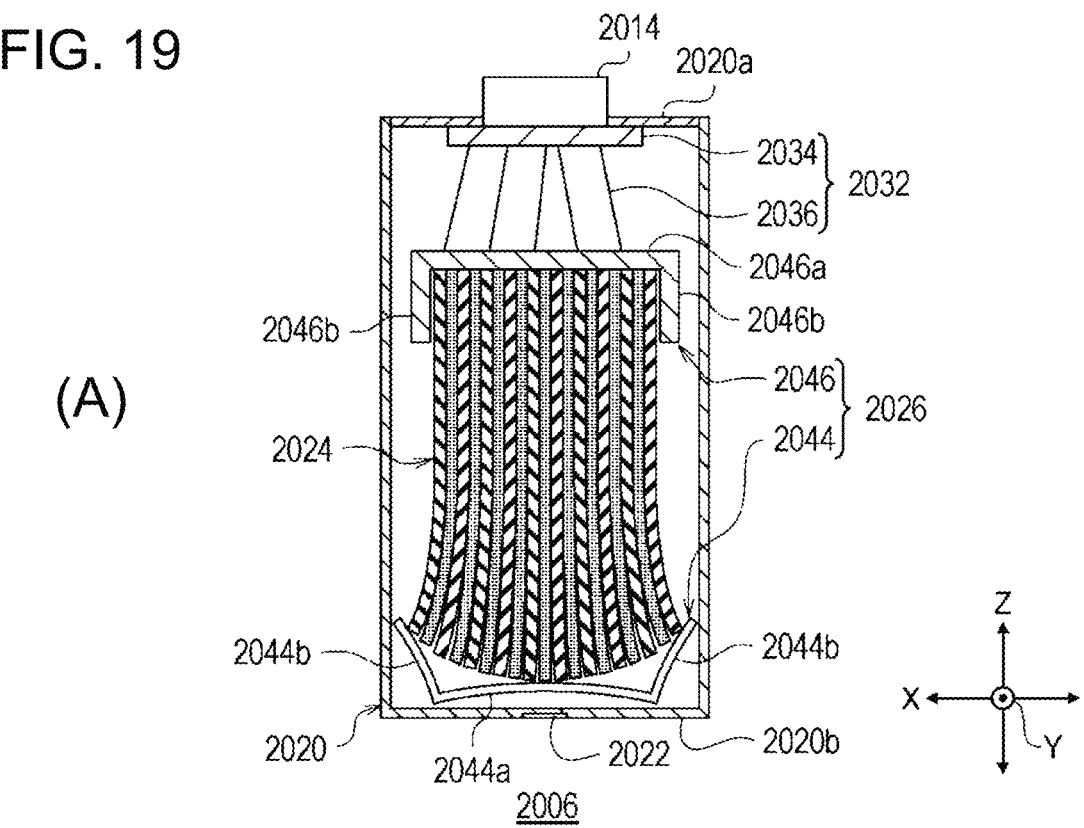
(A)
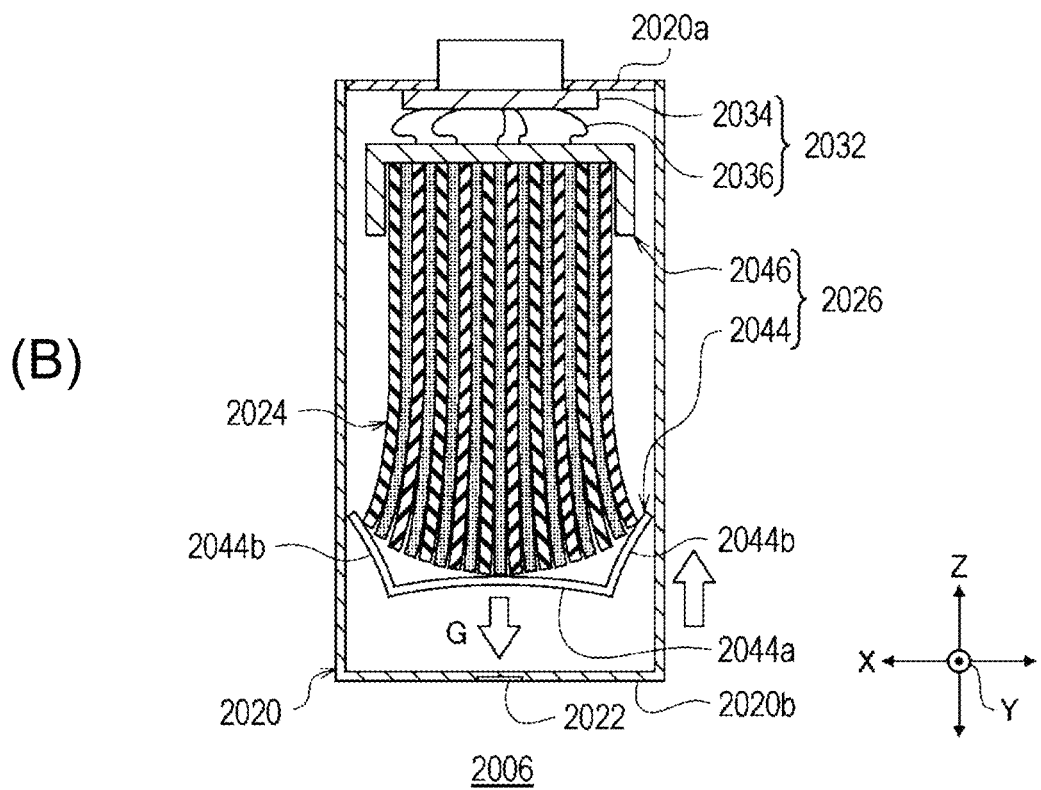
(B)

FIG. 20
(A)
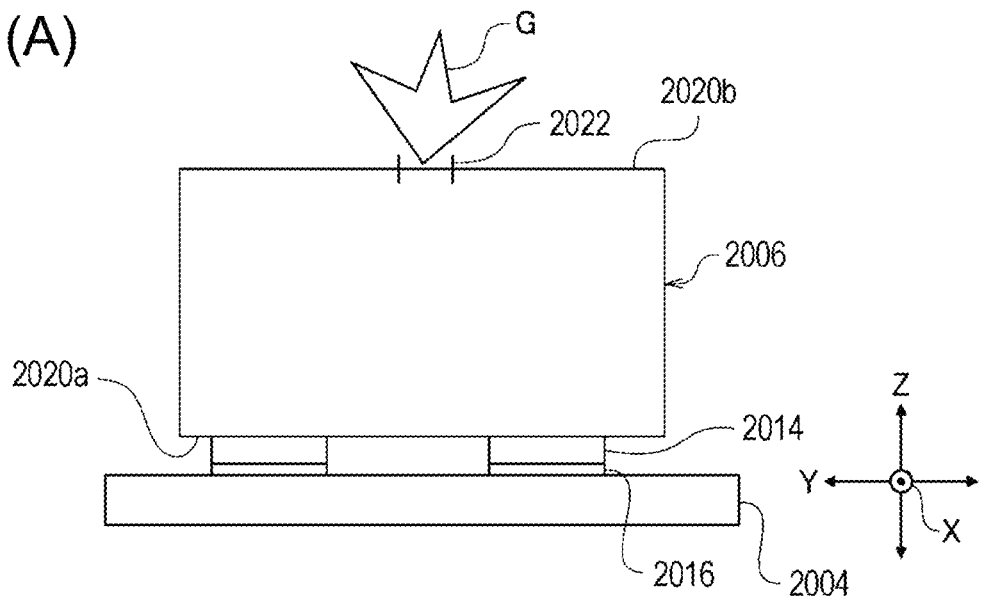
(B)
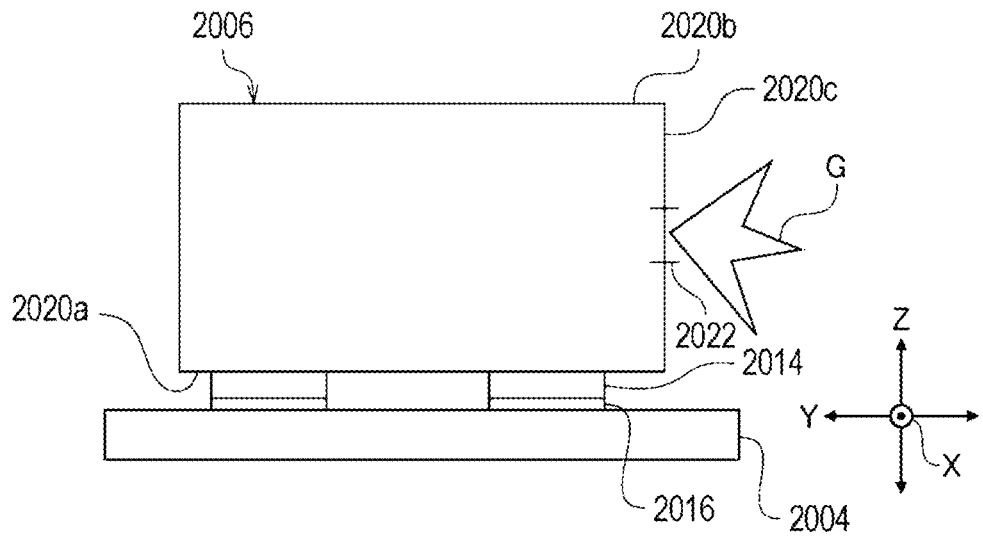

FIG. 22
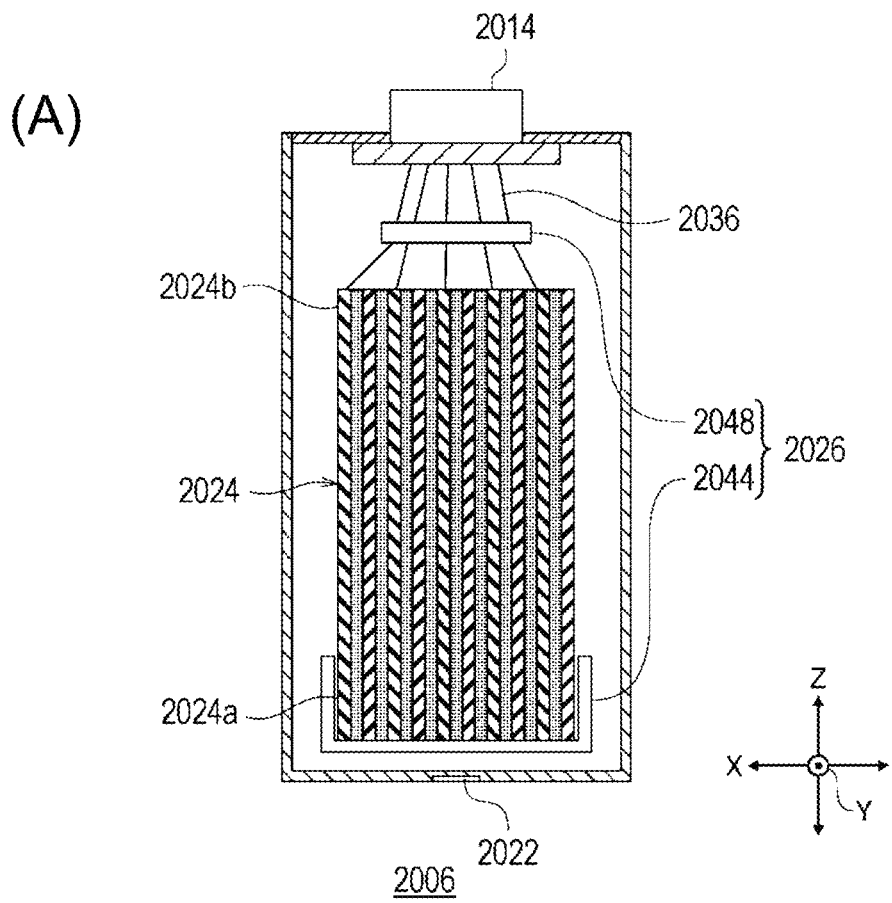
(A)
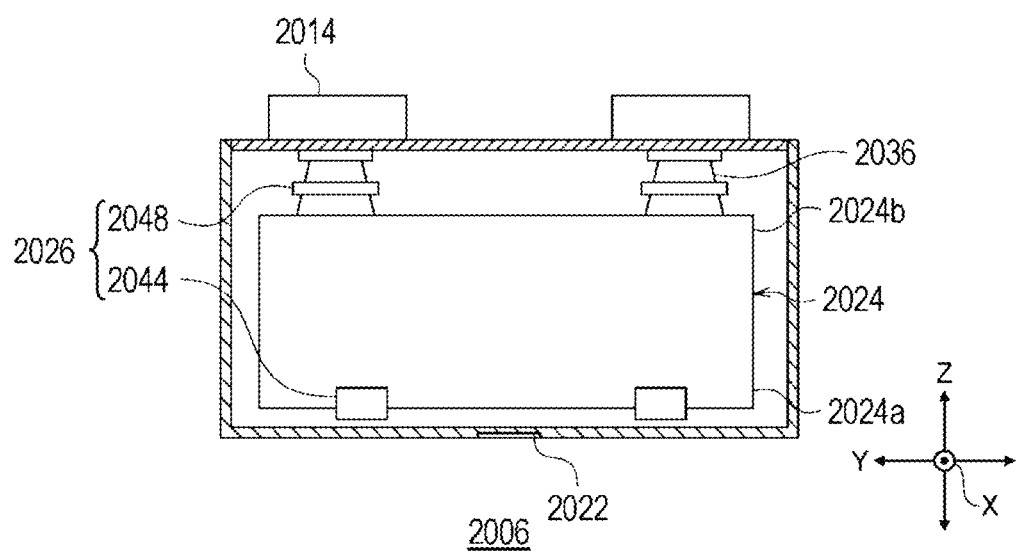
(B)

FIG. 24
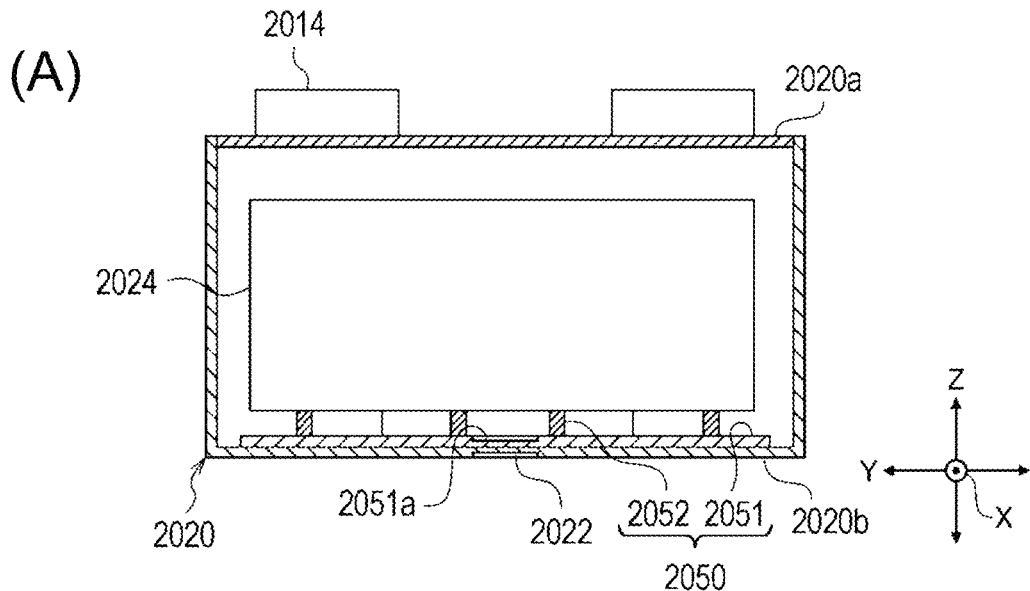
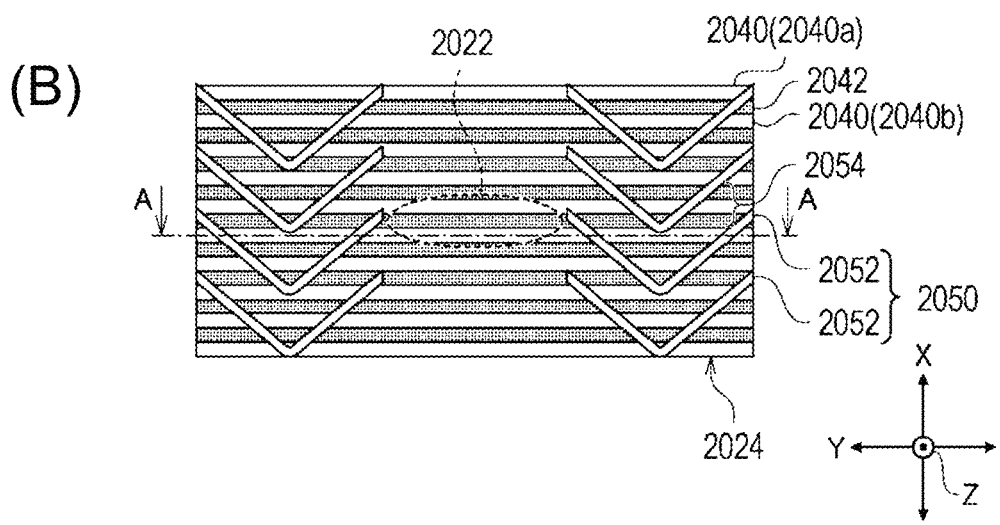
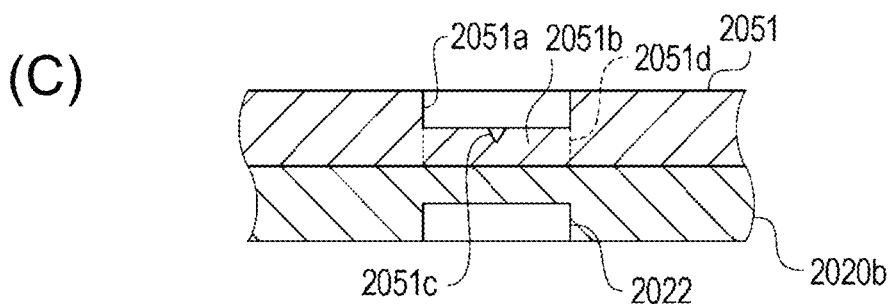

FIG. 28
(A)
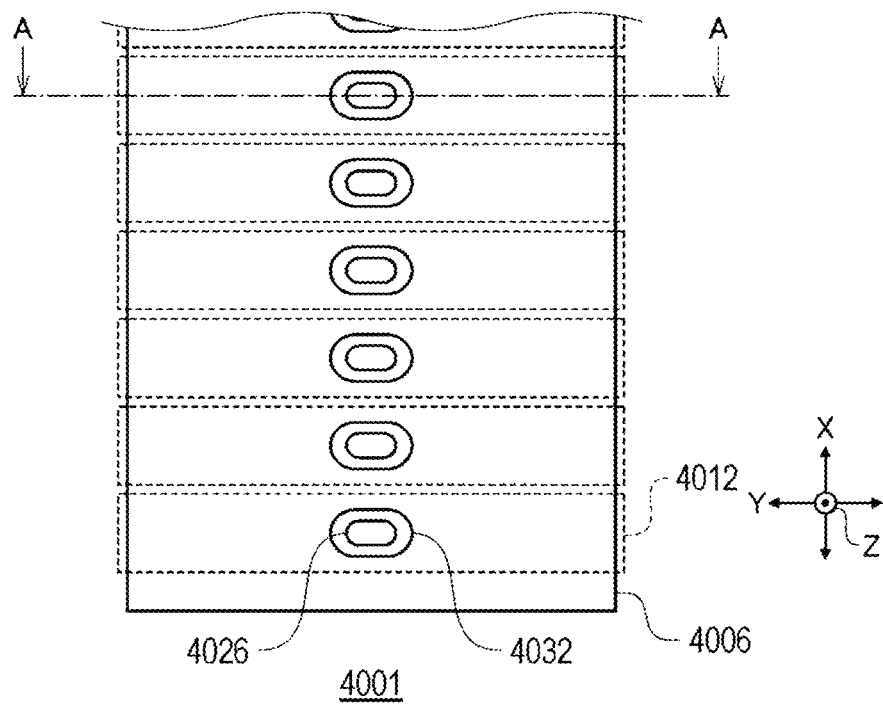
(B)
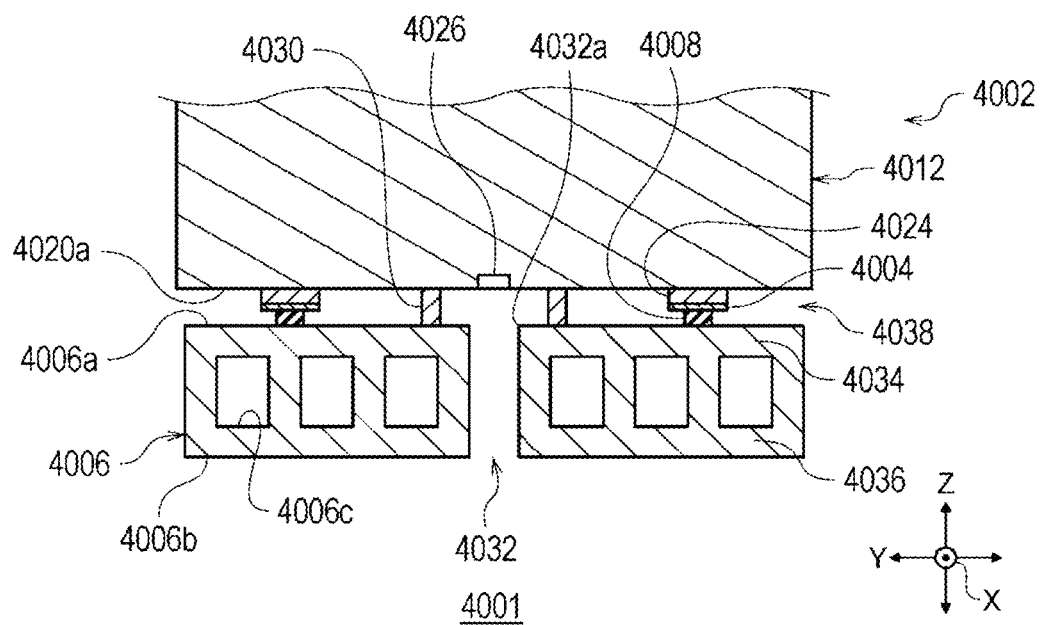

FIG. 29
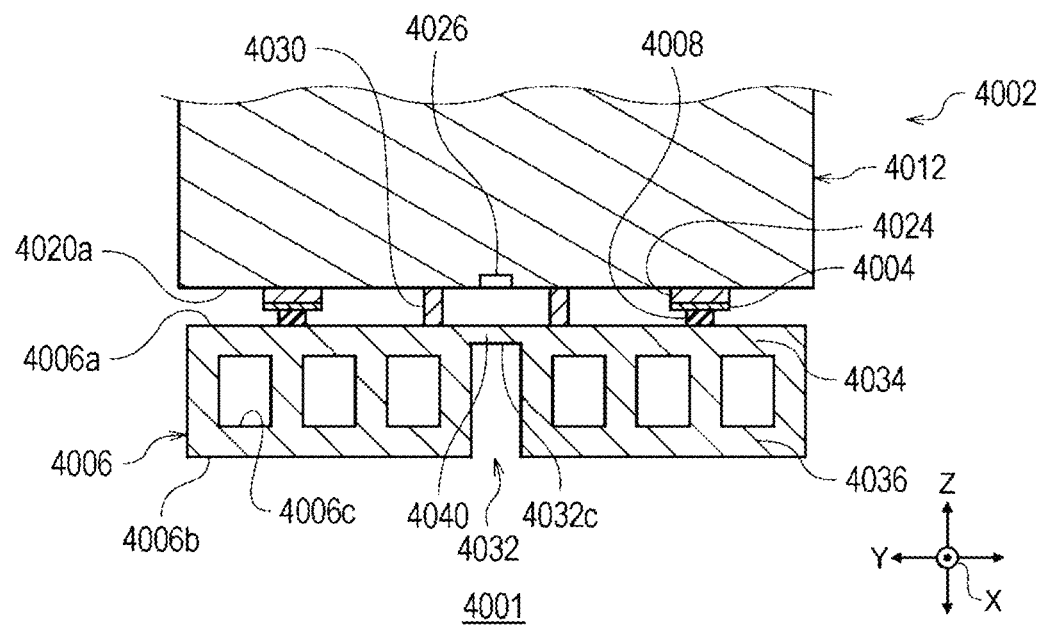
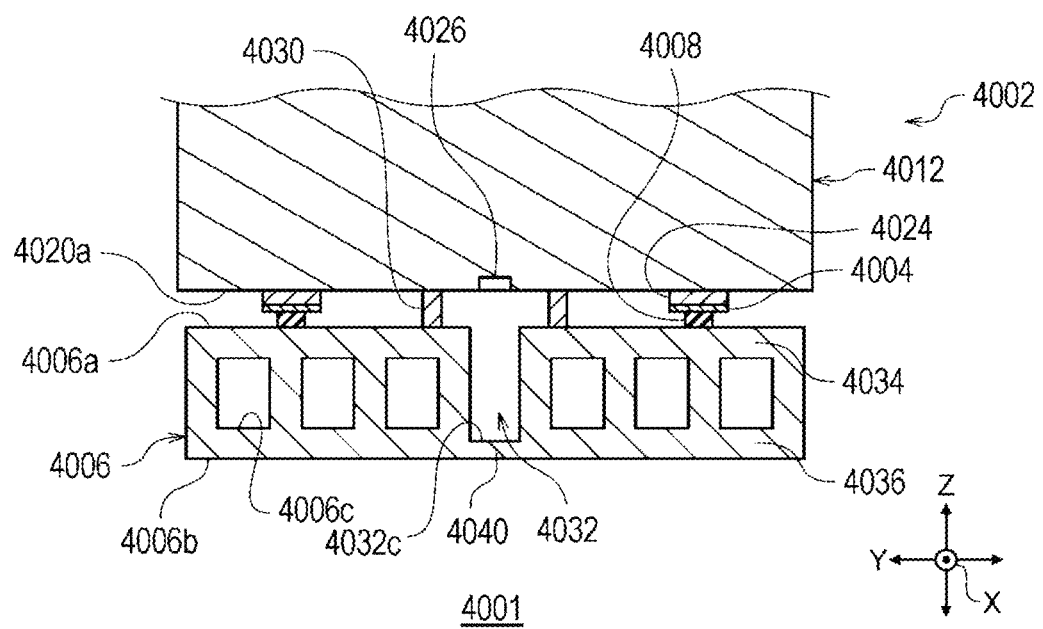

FIG. 31
(A)
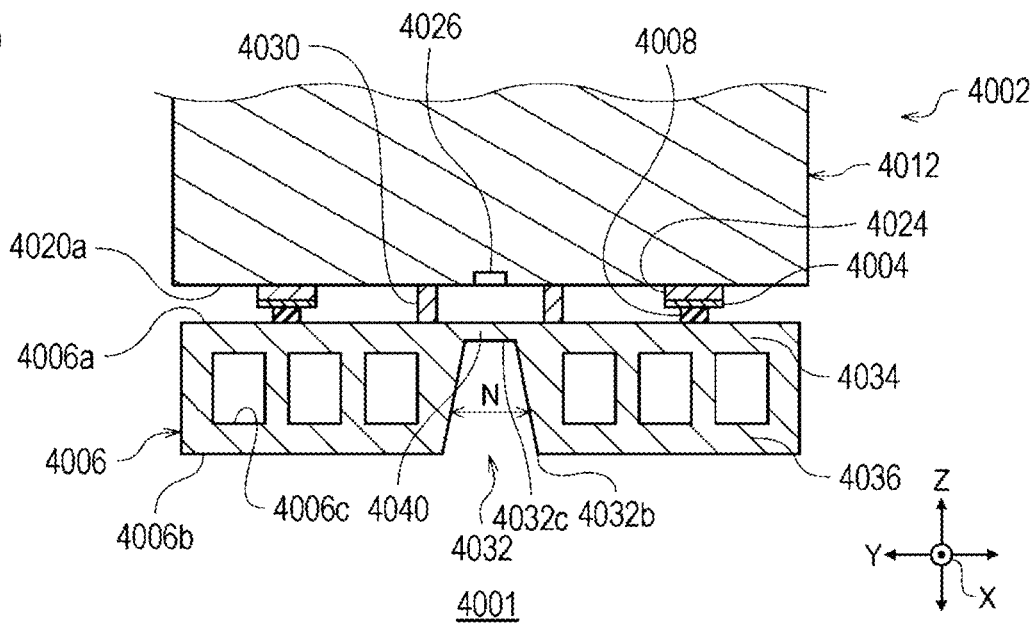
(B)
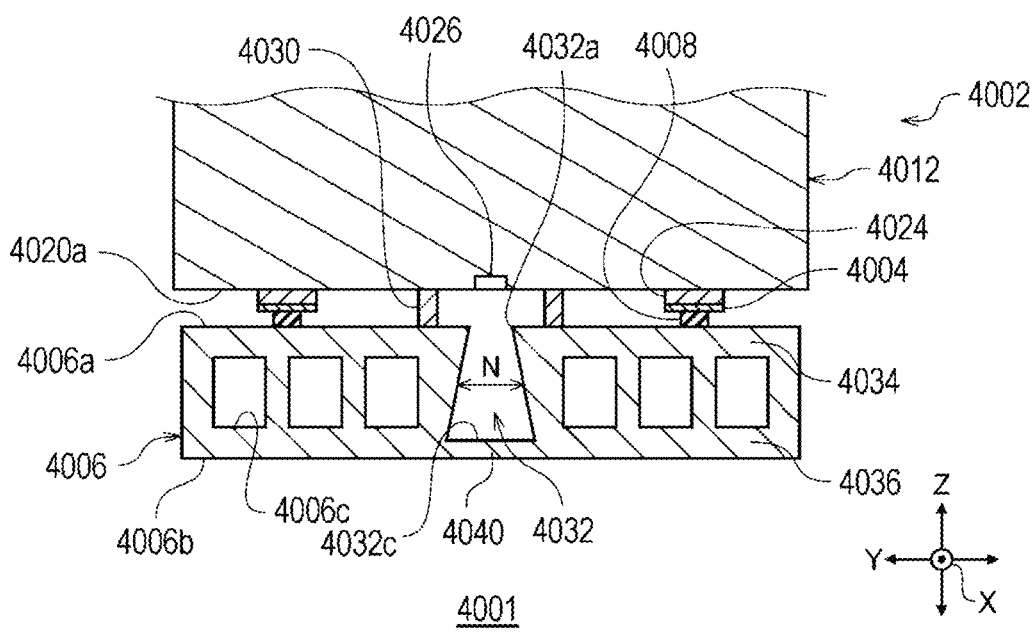

FIG. 33
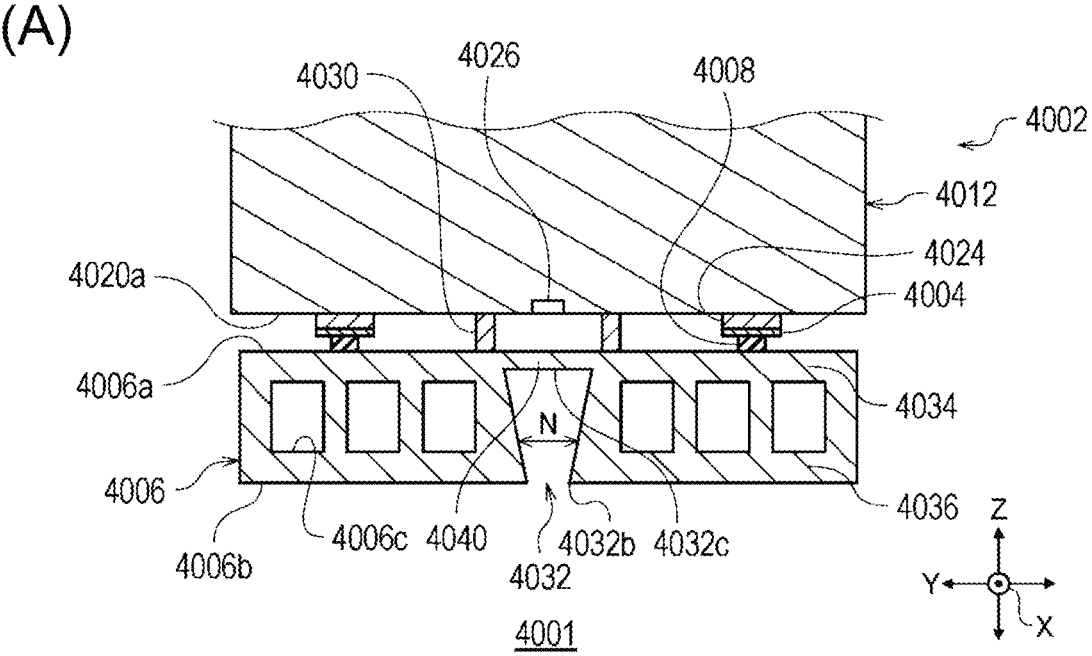
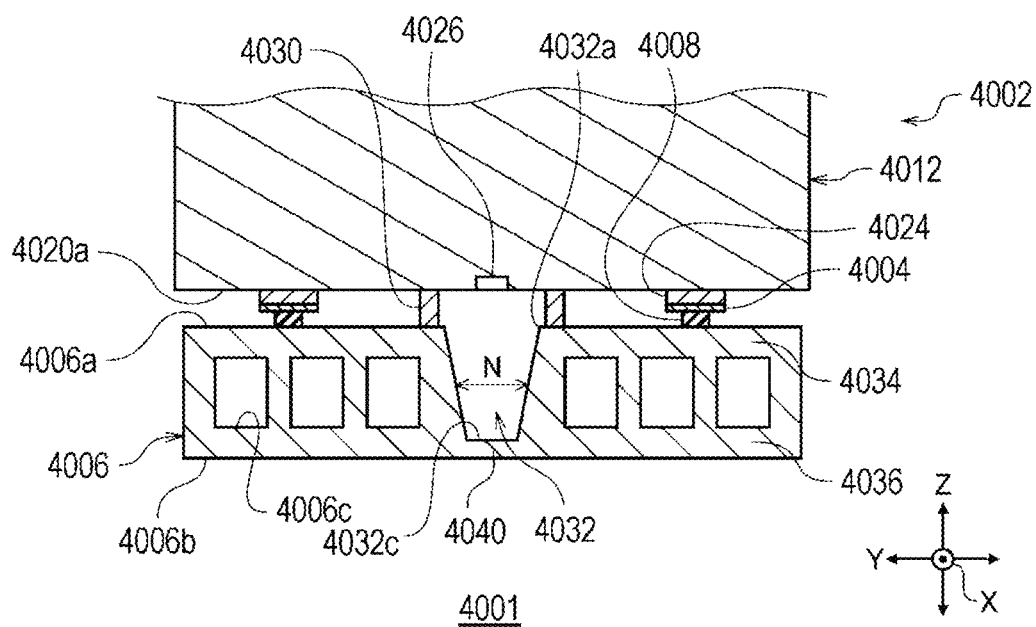

BATTERY MODULE AND BATTERY PACK

CROSS-REFERENCE OF RELATED APPLICATIONS

This application is a U.S. National Stage Application of the PCT International Application No. PCT/JP2019/029399 filed on Jul. 26, 2019, which claims the benefit of foreign priority of Japanese Patent Application No. 2018-144222, filed on Jul. 31, 2018, Japanese Patent Application No. 2018-160715, filed on Aug. 29, 2018, Japanese Patent Application No. 2018-160716, filed on Aug. 29, 2018, Japanese Patent Application No. 2018-183258, filed on Sep. 28, 2018 and Japanese Patent Application No. 2018-183259 filed on Sep. 28, 2018, the contents all of which are incorporated herein by reference.

TECHNICAL FIELD

The present disclosure relates to a battery module and a battery pack containing a plurality of secondary batteries electrically connected by a bus bar.

BACKGROUND ART

Conventionally, as a battery pack, there is one described in PTL 1 (see FIG. 5). This battery pack includes a plurality of square batteries and a plurality of cooling plates. The plurality of batteries are arranged in a row in the same orientation, and the cooling plate is arranged between each two adjacent batteries. The cooling plate has a cooling passage extending along an axis orthogonal to a height of the battery pack. This battery pack cools each battery by dissipating heat generated during charging and discharging of the battery to a space in the cooling passage.

CITATION LIST

Patent Literature

PTL 1: Japanese Translation of PCT International Application Publication No. 2017-534143

SUMMARY OF THE INVENTION

Technical Problems

During rapid charging of a battery, a large current flows through the battery and a large Joule heat is generated inside the battery. Here, Joule heat can be efficiently conducted to outside the battery by increasing a heat capacity of a bus bar that electrically connects the battery. Therefore, thermal deterioration of the battery can be suppressed, and an inside of the battery can be cooled efficiently. However, increasing the heat capacity of the bus bar leads to an increase in a size of the bus bar, which accordingly increases a size of the battery pack and also increases a manufacturing cost of the battery pack.

Therefore, an object of the present disclosure is to provide a battery module and a battery pack that can facilitate efficient cooling of an inside of a secondary battery and can facilitate downsizing of a bus bar.

In order to solve the above problems, the battery module of the present disclosure includes: a plurality of batteries; one or more bus bars that electrically connect the plurality of batteries individually; and a cooling plate that is thermally connected to the one or more bus bars. The plurality of batteries include an electrode body, a housing that accommodates the electrode body, and a pair of output terminals electrically connected to the electrode body and arranged on a first face of the housing. Among the pair of output terminals, one output terminal is connected to the one or more bus bars.

Advantageous Effects of Invention

According to the battery module of the present disclosure, an inside of a secondary battery can be easily cooled efficiently, and a bus bar can be easily downsized.

BRIEF DESCRIPTION OF DRAWINGS

FIG. 14(A) is a schematic cross-sectional view of a cooling plate corresponding to FIG. 2 in Modified Example 3. FIG. 14(B) is a schematic cross-sectional view showing a structure in which a passage of FIG. 14(A) is changed.

FIG. 15 is a schematic cross-sectional view corresponding to FIG. 2, in a battery module of an additional modified example.

FIG. 17(A) is a perspective view of a battery as viewed from a first face side. FIG. 17(B) is a perspective view of the battery as viewed from a second face side.

FIGS. 19(A) and 19(B) are schematic views showing a state where an electrode body expands.

FIGS. 20(A) and 20(B) are schematic views showing a state where gas is ejected from the battery.

FIGS. 22(A) and 22(B) are cross-sectional views schematically showing an internal structure of a battery according to Modified Example 4 of the second exemplary embodiment.

FIG. 24(A) is a cross-sectional view schematically showing an internal structure of a battery according to a fourth exemplary embodiment. FIG. 24(B) is a schematic view of an electrode body and a spacer as viewed from a valve side. FIG. 24(C) is an enlarged view of a region including the valve.

FIG. 28(A) is a bottom view schematically showing the battery module. FIG. 28(B) is a cross-sectional view taken along line A-A in FIG. 28(A).

FIG. 29(A) is a cross-sectional view schematically showing a battery module according to Modified Example 1 of the fifth exemplary embodiment. FIG. 29(B) is a cross-sectional view schematically showing a battery module according to Modified Example 2 of the fifth exemplary embodiment.

FIG. 31(A) is a cross-sectional view schematically showing a battery module according to Modified Example 3 of the sixth exemplary embodiment. FIG. 31(B) is a cross-sectional view schematically showing a battery module according to Modified Example 4 of the sixth exemplary embodiment.

FIG. 33(A) is a cross-sectional view schematically showing a battery module according to Modified Example 5 of the seventh exemplary embodiment. FIG. 33(B) is a cross-sectional view schematically showing a battery module according to Modified Example 6 of the seventh exemplary embodiment.

DESCRIPTION OF EMBODIMENTS

Figure 1:
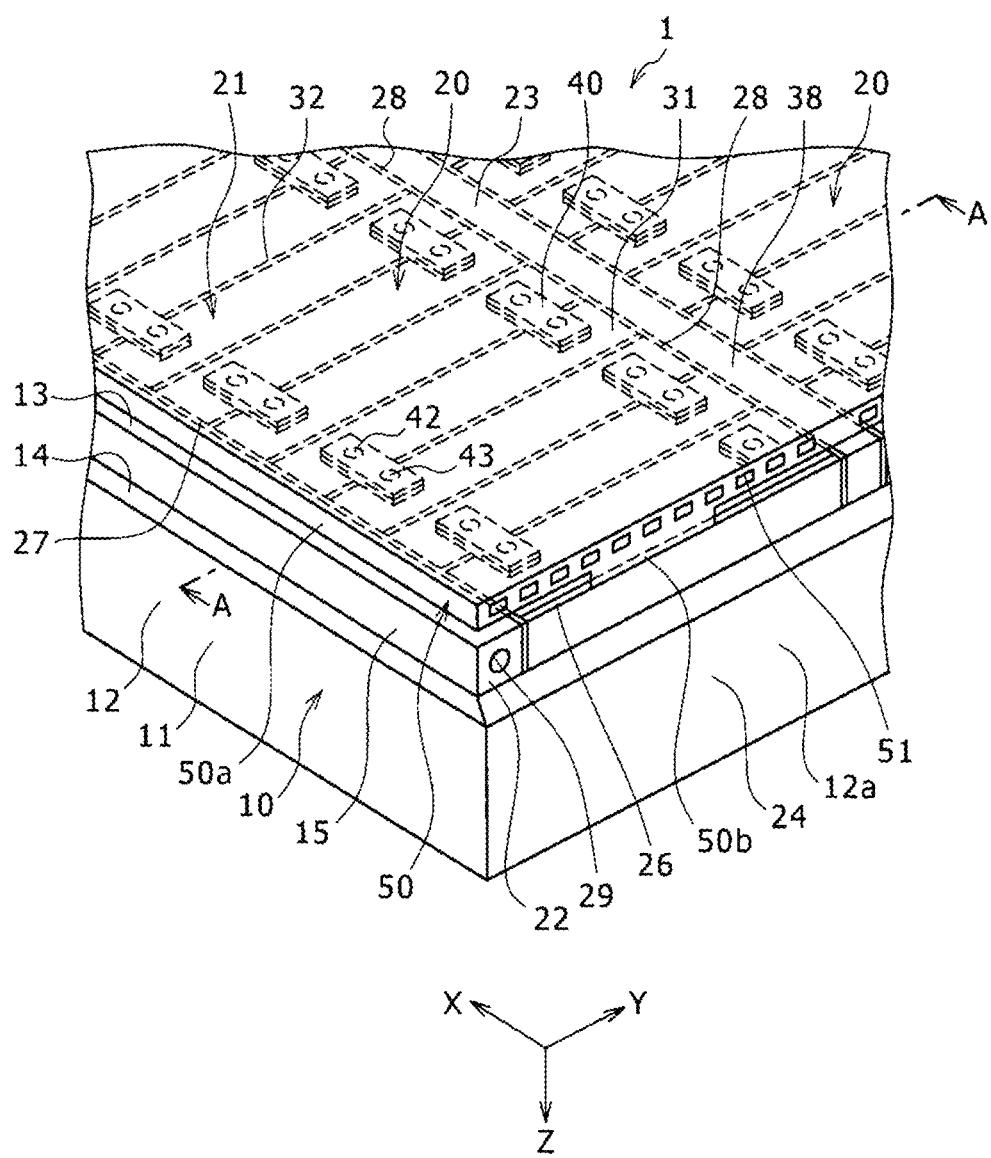
FIG. 1 is a schematic perspective view of a part of a battery pack according to one exemplary embodiment of the present disclosure when viewed from a bottom side, and is a perspective view in which an internal structure of a part of a lower side of the battery pack is made visible by omitting illustration of a lower side of a side wall of a pack case and a bottom of the pack case.

Hereinafter, exemplary embodiments according to the present disclosure will be described in detail with reference to the accompanying drawings. Hereinafter, the present disclosure will be described on the basis of preferred exemplary embodiments with reference to the drawings. The exemplary embodiments do not limit the invention, but are examples. Therefore, all the features and combinations thereof described in the exemplary embodiments are not necessarily essential to the invention. Note that, in the following, in a case where a plurality of exemplary embodiments and modified examples are included, it has been assumed from the beginning to construct a new exemplary embodiment by appropriately combining feature parts of these. Further, in the drawings below, the same elements (configurations) are designated by the same reference numerals, and redundant description will be omitted. Furthermore, each figure below is a schematic view, and vertical, horizontal, and height dimensional ratios of individual members do not match between different figures. Redundant explanations will be omitted as appropriate. In addition, when terms such as "first" and "second" are used in this specification or claims, unless otherwise stated, the terms do not refer to any order or importance, but are to distinguish one configuration from another configuration. In addition, some of the members that are not important for explaining the exemplary embodiments may be omitted in each figure.

First Exemplary Embodiment

FIG. 1 is a schematic perspective view of a part of battery pack 1 according to this first exemplary embodiment when viewed from a bottom side, and is a perspective view in which an internal structure of a part of a lower side of battery pack 1 is made visible by omitting illustration of a lower side of side wall 12 of pack case 10 and a bottom of the pack case. Note that, in order to explain a structure of battery pack 1 in an easy-to-understand manner, in FIG. 1, a dotted line indicates a structure that becomes invisible due to the presence of cooling plate 50 described below. Further, in the exemplary embodiment shown in FIG. 1, output terminals 42, 43 of battery 31 are located on a lower side in a vertical. Therefore, in the description of the present exemplary embodiment, an upper side is a side opposite to a terminal formation side in a Z axis of battery 31, and a lower side is to be the electrode terminal formation side in the Z axis of battery 31. Note that, in the following description and drawings of the present exemplary embodiment, an X axis is along a stacking direction in which a plurality of batteries 31 are stacked in battery group 21, a Y axis is along an arrangement direction of a plurality of battery groups 21, and the Z axis is along a height direction of battery 31. The X, Y, and Z axes are orthogonal to each other.

As shown in FIG. 1, battery pack 1 includes pack case 10, a plurality of battery modules 20, and cooling plate 50. Pack case 10 includes main body 11, a lid part (not illustrated) included in a bottom, and a plurality of screws (not illustrated). Main body 11 and the lid part are made of metal such as aluminum or iron, or a resin, for example. Main body 11 is a box-shaped member of a substantially rectangular parallelepiped shape having a recess, and the recess has a rectangular opening only on a lower side in the Z axis. Further, although not illustrated, the lid part is a plate-shaped member having a rectangular shape in plan view. Main body 11 has an end face (not illustrated) on a lower side in the Z axis. On the end face and the lid part, screw holes (not illustrated) are provided at a predetermined interval at positions overlapping with each other when viewed along the Z axis, and there is a one-to-one correspondence between the screw hole on the end face and the screw hole on the lid part.

With the opening of main body 11 facing upward in the vertical, each battery module 20, which will be described in detail later, is arranged so that output terminals 42, 43 of a positive electrode and a negative electrode of battery 31 are arranged to be located on an upper side, and cooling plate 50 is arranged on battery module 20 so as to be in contact with bus bar 40 of battery module 20. Subsequently, screws are tightened into corresponding screw holes of the end face and the lid part. This tightening of the screws causes the lid part (the bottom) to be fixed to main body 11, to form battery pack 1. An appearance of battery pack 1 has a substantially rectangular parallelepiped shape. Finally, by turning battery pack 1 over, and fixing battery pack 1 at a predetermined position so that the lid part is on a lower side in the vertical, installation of battery pack 1 is completed.

The plurality of battery modules 20 are arranged so as to be adjacent to each other along the Y axis in the recess of pack case 10. An area of the plurality of battery modules 20 arranged adjacent to each other along the Y axis in plan view is slightly smaller than an area of the recess in plan view. As a result, each battery module 20 is positioned along the X axis and the Y axis in the recess while the plurality of battery modules 20 are accommodated in the recess.

Battery module 20 includes battery group 21, first side bind bar 22, second side bind bar 23, a pair of end plates 24, and a plurality of bus bars 40. In this example, the pair of end plates 24 correspond to a pair of walls 12a extending along the Y axis in main body 11 of pack case 10. However, the configuration is not limited to this, and the pair of end plates 24 may be members provided separately from the pair of walls 12a.

Battery group 21 includes a plurality of substantially rectangular parallelepiped batteries (hereinafter referred to as batteries) 31 and a plurality of inter-battery separators 32. Battery 31 is configured by a rechargeable secondary battery such as, for example, a lithium ion battery, a nickel-hydrogen battery, or a nickel-cadmium battery, and has positive electrode output terminal 42 and negative electrode output terminal 43 projecting downward along the Z axis from same first face 45 (FIG. 2) formed of a substantially flat face. More specifically, each battery 31 includes: electrode body 61 (see FIG. 2); outer can 62 (see FIG. 2) that accommodates electrode body 61; lid 63 (see FIG. 2) that seals an opening of outer can 62; and positive electrode output terminal 42 and negative electrode output terminal 43 that are respectively inserted through a pair of through holes provided on lid 63, are insulated from lid 63, and are electrically connected to electrode body 61. Here, outer can 62 and lid 63 form a housing. A part of output terminals 42, 43 is exposed from lid 63 into outer can 62. The plurality of batteries 31 included in battery module 20 are arranged in a row along the X axis so that output terminals 42, 43 are alternately arranged when viewed along the X axis. Inter-battery separator 32 is arranged between two batteries 31 adjacent along the X axis. A main surface of battery 31 is covered with an insulating sheet such as a shrink tube. Further, inter-battery separator 32 is a sheet-shaped member, and is made of an insulating material such as resin. Inter-battery separator 32 is provided to reliably insulate between two batteries 31 adjacent along the X axis.

In this example, the plurality of batteries 31 included in battery module 20 are connected in series by bus bar 40. Specifically, bus bar 40 is a plate-shaped member containing a conductive material. Bus bar 40 is made of metal or the like.

Each bus bar 40 extends along the X axis. For each battery 31, one terminal of positive electrode output terminal 42 and negative electrode output terminal 43 is connected to bus bar 40. Specifically, in each battery 31, output terminal 42 is connected to bus bar 40, and output terminal 43 is connected to bus bar 40 that is different from bus bar 40 connected with output terminal 42. Each bus bar 40 electrically connects output terminal 42 of one battery 31 and output terminal 43 of another battery 31 among two batteries 31 adjacent along the X axis. Bus bar 40 has, for example, two through holes formed in a thickness direction. These two through holes are arranged side by side at an interval along the X axis.

In a state where battery 31 and inter-battery separator 32 are in close contact with each other, by inserting output terminal 42 of one battery 31 through one through hole of bus bar 40, inserting output terminal 43 of another battery 31 through another through hole of bus bar 40, and welding these output terminals 42, 43 to an inner face of each through hole of bus bar 40, two adjacent batteries 31 are connected in series.

Each of first and second side bind bars 22, 23 is a plate member or a square tube member made of metal such as, for example, aluminum, iron, or stainless steel, and extends along the X axis. Each dimension of first and second side bind bars 22, 23 in the X axis is slightly longer than a dimension of battery group 21 in the X axis. First side bind bar 22 restrains one end of battery group 21 in the Y axis, and second side bind bar 23 restrains another end of battery group 21 in the Y axis. Further, each end plate 24 is a plate member made of metal such as aluminum or iron, and extends in the Y axis. End plate 24 arranged on one side in the X axis restrains one side of battery group 21 in the X axis, and end plate 24 arranged on another side in the X axis restrains another side of battery group 21 in the X axis. Note that first and second side bind bars 22, 23 are not limited to metal members, but may be plastic members of carbon fiber reinforced plastic (CFRP) or the like when weight reduction is more important than heat dissipation.

At lid side ends of both side end faces in the X axis of first and second side bind bars 22, 23 each, screw holes 29 to fix the end plate are provided, and these screw holes 29 extend along the X axis. Further, each of the pair of end plates 24 is provided with a through hole (a screw hole) extending along the X axis. Furthermore, battery module 20 further includes end separator 26, first side-separator 27, and second side-separator 28. Each of end separator 26, first side-separator 27, and second side-separator 28 is a sheet-shaped member, and is made of an insulating material such as resin. End separator 26 is arranged between one end of battery group 21 in the X axis and end plate 24 arranged on one side, and between another end of battery group 21 in the X axis and end plate 24 arranged on another side. On the other hand, first and second side-separators 27, 28 extend along the X axis. An X-axis length of each of first and second side-separators 27, 28 is substantially coincident with a sum of a length of battery group 21 in the X axis and twice a length (a thickness) of end separator 26 in the X axis.

First side-separator 27 is arranged between one end of battery group 21 in the Y axis and first side bind bar 22. Second side-separator 28 is arranged between another end of battery group 21 in the Y axis and second side bind bar 23. Further, end separator 26 is arranged between both ends of battery group 21 in the X axis and the pair of end plates 24. Then, in this state, the screws are inserted and tightened into the through holes of end plates 24 and the screw holes of first and second side bind bars 22, 23, from an outside in the X axis of end plate 24. This tightening fixes battery group 21, first and second side bind bars 22, 23, the pair of end plates 24, the pair of end separators, and first and second side separators 27, 28, to form battery module 20. Regarding each battery group 21, one side face of each battery 31 in the Y axis is located substantially coplanar by the restraint from first side bind bar 22, and another side face of each battery 31 in the Y axis is located substantially coplanar by the restraint from second side bind bar 23.

Note that battery module 20 may be configured by pressing the pair of end plates 24 from both sides with a press machine (not illustrated), and screwing the pair of end plates 24 to first and second side bind bars 22, 23 while battery group 21 is compressed by end plates 24. Further, in the example shown in FIG. 1, for example, in two battery groups 21 adjacent in the Y axis, one side bind bar 38 is interposed between the two battery groups. This side bind bar 38 restrains a side face of one electrode group 21 facing another electrode group 21, and a side face of another electrode group 21 facing one electrode group 21. Note that, in two adjacent battery groups, one side bind bar may be provided on each of side faces opposed to each other. Further, in the example shown in FIG. 1, for a plurality of battery modules 20 arranged in the Y axis, end plate 24 on one side restrains one end of battery group 21 of each battery module 20 in the X axis, and end plate 24 on another side restrains another end side in the X axis of the battery group. However, in the present disclosure, the end plate is not limited to the above configuration. For example, for each battery module, there may be provided separate first and second end plates that restrain only both ends of a battery group of the battery module in the X axis. Note that, when the plurality of battery modules 20 are fixed by integrated end plate 24 as in the present exemplary embodiment, it becomes easy to connect in parallel the plurality of battery modules 20 arranged in parallel along the Y axis, by embedding and fixing a bus bar extending along the Y axis into end plate 24.

Further, end separator 26 may have elasticity. In this case, even if there is a dimensional change in a gap between battery 31 at an end in the X axis and at least one of end plates 24 on one side and another side, end separator 26 can easily fill the gap between battery 31 at the end in the X axis and at least one of end plates 24 on one side and another side. Therefore, battery group 21 can be arranged to be in close contact along the X axis.

Continuing with reference to FIG. 1, cooling plate 50 is made of metal such as aluminum or aluminum alloy. Cooling plate 50 includes flat plate 50a arranged below battery module 20. Flat plate 50a has a shape corresponding to a rectangular parallelepiped space that is generated, in pack case 10, below a lower face of bus bar 40 and above an upper face of the lid part, when a plurality of battery modules 20 are arranged in an internal chamber of pack case 10. As a result, when the lid part is fixed to main body 11, cooling plate 50 is positioned with respect to pack case 10, and thermally connected to both bus bar 40 connected to output terminal 42 and bus bar 40 connected to output terminal 43 in each battery 31.

Cooling plate 50 internally has a plurality of passages 51 through which a coolant flows. The plurality of passages 51 are arranged at an interval along the Y axis. Each passage 51 extends along the X axis. Cooling plate 50 has a merging part (not illustrated) on a downstream of the plurality of passages 51 where flows of the coolant flowing out of individual passages 51 merge. Then, on an upstream side of the plurality of passages 51, there is a branch part (not illustrated) allowing the coolant to branch and flow into each passage 51. Although not illustrated, the pair of walls 12a extending along the Y axis in pack case 10 have coolant through holes at positions respectively overlapping with the merging part and the branch part. Through these coolant through holes, a supply pipe (not illustrated) and a return pipe (not illustrated) are inserted. A coolant such as water is sent from a discharge port of a pump (not illustrated) to the branch part via the supply pipe (not illustrated). Then, after passing through the plurality of passages 51 and the merging part, the coolant flows from the merging part to a suction port of the pump via the return pipe (not illustrated). By causing the coolant to circulate in this way, cooling plate 50 is cooled by the coolant, bus bar 40 is cooled by cooling plate 50, and accordingly each battery 31 is cooled by bus bar 40. Note that, in the battery module of the present disclosure, the coolant through holes may be provided at locations other than the pair of walls 12a.

Figure 2:
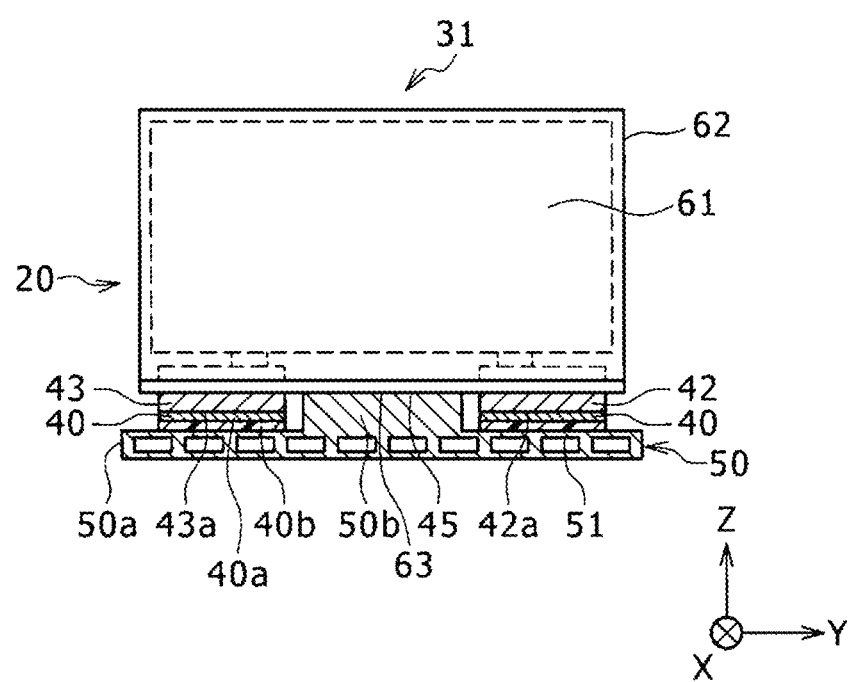
FIG. 2 is a part of a schematic cross-sectional view taken along line A-A of FIG. 1, and is a schematic cross-sectional view showing a part of a battery module and a cooling plate.

FIG. 2 is a part of a schematic cross-sectional view taken along line A-A of FIG. 1, and is a schematic cross-sectional view showing a part of battery module 20 and cooling plate 50. As shown in FIG. 2, bus bar 40 of battery module 20 has metal part 40a having a flat plate shape as a main body, and insulating part 40b having a flat plate shape and having an insulating property. Metal part 40a comes into contact with lower faces 42a, 43a of terminals 42, 43, and is electrically connected to lower faces 42a, 43a. Further, insulating part 40b is provided so as to cover a lower face of metal part 40a, and is formed by, for example, coating the lower face of metal part 40a with an insulating material such as a silicon-based insulating resin. Insulating part 40b is not limited to the silicon-based insulating resin, and may be made of any material as long as an insulating property is provided. However, insulating part 40b is preferably made of an insulating material having a heat conductivity of 0.1 W or more, more preferably made of an insulating material having a heat conductivity of 1 W or more, and most preferably made of an insulating material having a heat conductivity of 2 W or more.

As shown in FIGS. 1 and 2, cooling plate 50 has first face contact part 50b in addition to flat plate 50a described above. As described above, flat plate 50a is arranged below battery module 20, and first face contact part 50b extends upward from a portion located between output terminal 42 and output terminal 43 on an upper face of flat plate 50a. Battery 31 has first face 45 (an outer face of lid 63) formed of a substantially flat face, and output terminals 42, 43 project downward from first face 45 along the Z axis. First face contact part 50b has a flat plate shape. An upper face of first face contact part 50b comes into contact with first face 45. As a result, first face 45 is efficiently cooled by first face contact part 50b of cooling plate 50, and accordingly battery 31 is efficiently cooled by first face contact part 50b.

Figure 3:
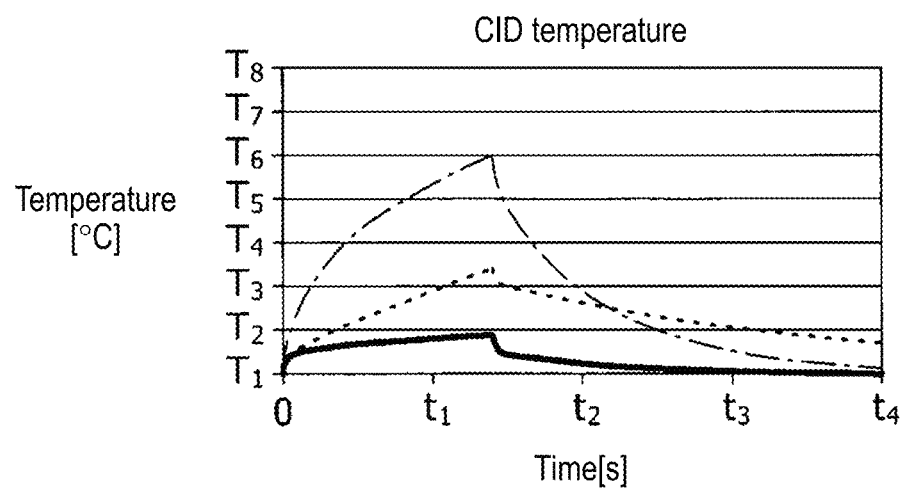
FIG. 3 is a graph showing an example of simulation results indicating a cooling degree of a current interrupt device of a battery, and is a graph showing an example of simulation results indicating a comparison of top face cooling, terminal cooling, and bottom face cooling.
Figure 4:
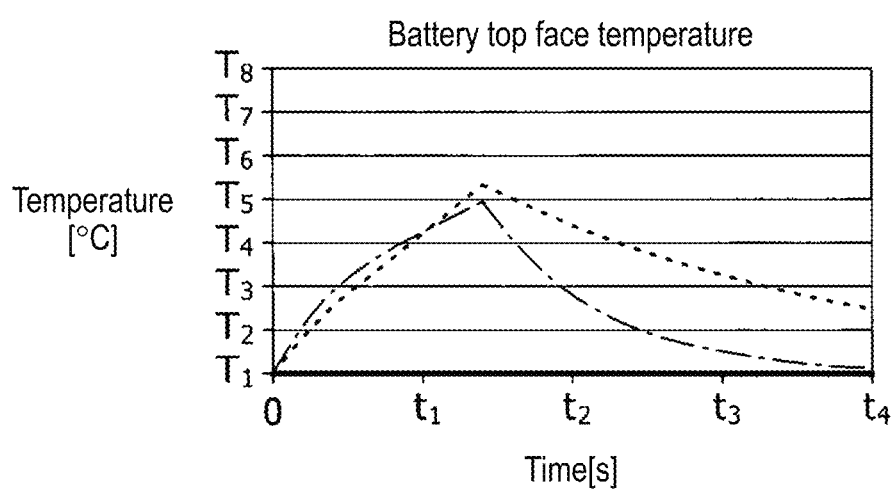
FIG. 4 is a graph showing an example of simulation results indicating a cooling degree of a top face of the battery, and is a graph showing an example of simulation results indicating a comparison of top face cooling, terminal cooling, and bottom face cooling.
Figure 5:
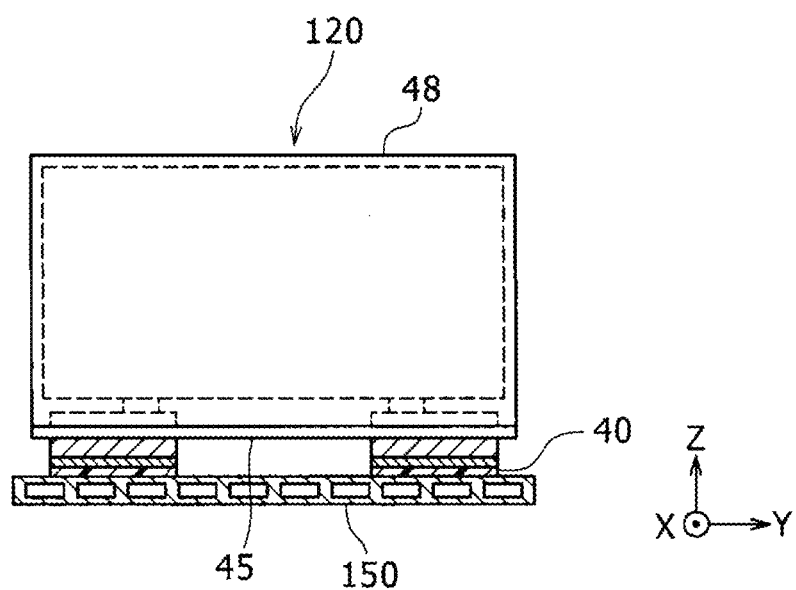
FIG. 5 is a schematic cross-sectional view corresponding to FIG. 2 in a battery module of Modified Example 1.

FIGS. 3 and 4 are views showing an example of simulation results indicating a cooling degree of battery 31, and are views showing an example of simulation results indicating a comparison of top face cooling, terminal cooling, and bottom face cooling. Specifically, the top face cooling is cooling using flat plate 50a and first face contact part 50b described above. Further, the terminal cooling is cooling by cooling plate 150 having a flat plate shape in which first face contact part 50b is omitted, in comparison with the above-described exemplary embodiment as shown in FIG. 5, that is, as shown in a schematic cross-sectional view corresponding to FIG. 2 in battery module 120 of a modified example. That is, in the terminal cooling, cooling is performed without bringing cooling plate 150 into contact with first face 45, but only with bus bar 40. Further, although not described in detail, the bottom face cooling is cooling in which a cooling plate having a flat plate shape is brought into contact with face 48 (see FIG. 5) on an opposite side to the first face 45 side in the Z axis, with battery 31 arranged to have first face 45 on an upper side.

Battery 31 has a current interrupt device (CID) on a portion the terminals 42, 43 side in the Z axis inside battery 31. FIG. 3 is a graph showing simulation results of a temperature of the current interrupt device (CID), and is a graph showing simulation results of a temperature at a position indicated by P inside battery 31, in substantially rectangular parallelepiped battery 31 shown in FIG. 6. In addition, FIG. 4 is a graph showing simulation results of a battery top face temperature, and is a graph showing simulation results of a temperature at a position indicated by Q in battery 31 shown in FIG. 6.

Note that, in FIGS. 3 and 4, and FIGS. 7 and 8 described later, $T_8 > T_7 > T_6 > T_5 > T_4 > T_3 > T_2 > T_1 > 0$, $T_k + 1 - T_k = C1$ (constant) [° C.] (k is an integer between 1 and 7 (inclusive)), $t_4 > t_3 > t_2 > t_1 > 0$, and $t_{l+1} - t_l = C2$ (constant) [sec] (1 is an integer between 1 and 3 (inclusive)) are satisfied. Further, in those figures, a dotted line indicates a simulation result of the terminal cooling, a solid line indicates a simulation result of the top face cooling, and a one dotted chain line indicates a simulation result of the bottom face cooling.

According to the simulation results shown in FIG. 3, a CID temperature is highest in the bottom face cooling, is a lower temperature in the terminal cooling than bottom face cooling, and is a lowest temperature in the top face cooling. Therefore, execution of cooling by bringing cooling plate 150 (see FIG. 5) into contact with bus bar 40 enables efficient cooling of a terminal side structure in the internal structure of battery 31. Furthermore, execution of cooling by adding cooling plate 50 (see FIG. 2) to bus bar 40 and bringing into contact with first face 45 enables further effective cooling of the terminal-side structure in the internal structure of battery 31. Moreover, as shown in FIG. 4, performing the top face cooling allows a top face temperature of battery 31 to be lowered in addition to the CID temperature, and enables effective cooling of the entire battery 31.

Figure 6:
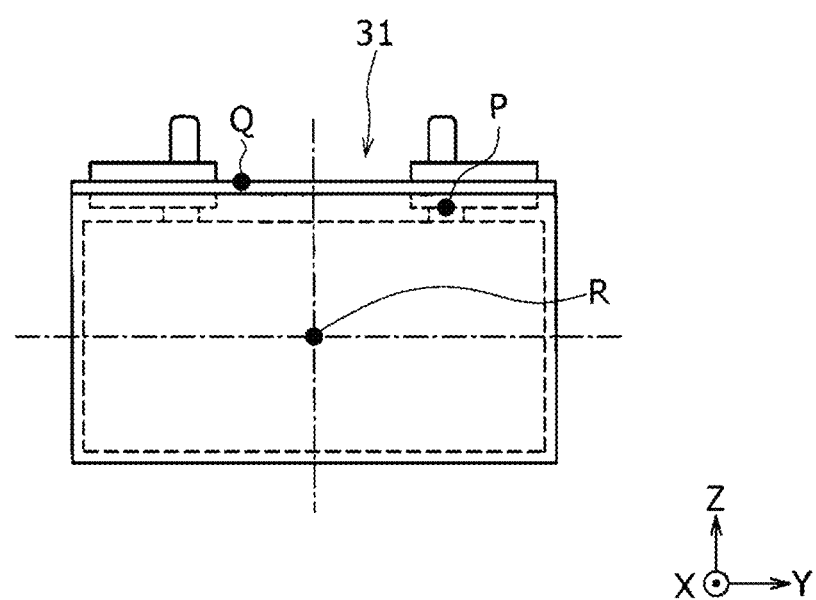
FIG. 6 is a schematic view showing the battery.
Figure 7:
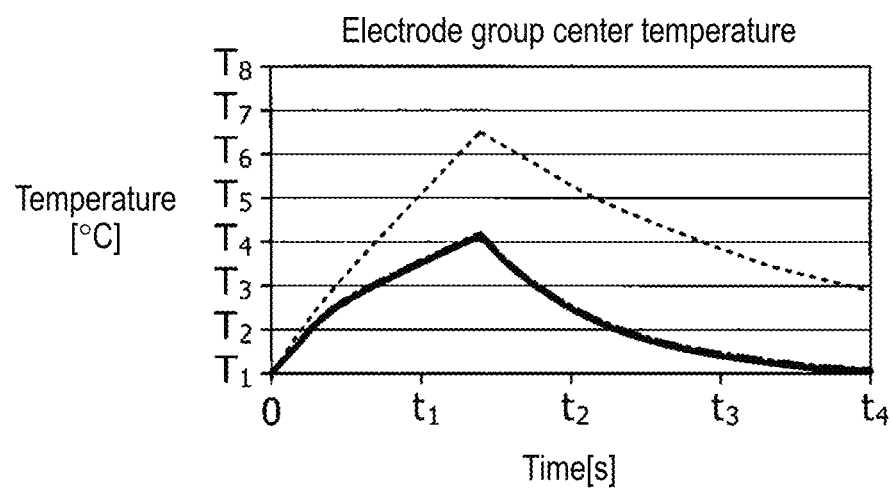
FIG. 7 is a graph showing an example of simulation results of an electrode group center temperature indicated by R in FIG. 6, and is a graph showing an example of simulation results indicating a comparison of top face cooling, terminal cooling, and bottom face cooling.
Figure 8:
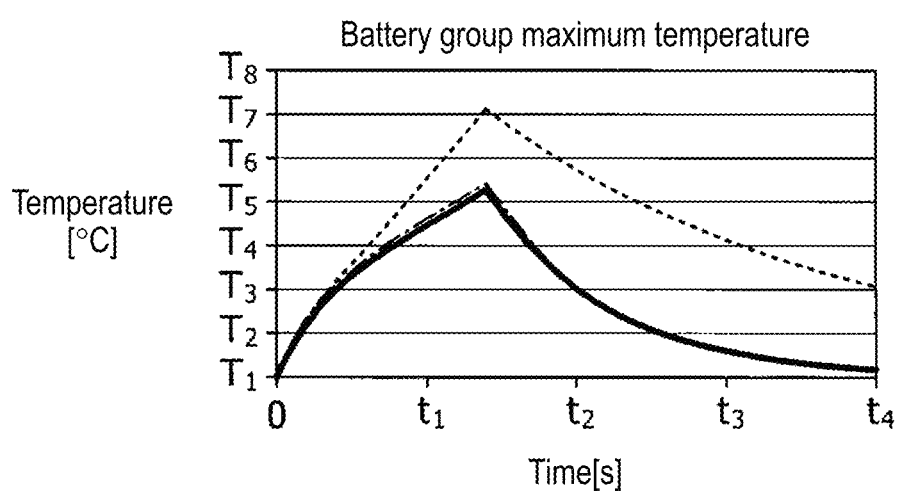
FIG. 8 is a graph showing an example of simulation results of a battery group maximum temperature of a battery group, and is a graph showing an example of simulation results indicating a comparison of top face cooling, terminal cooling, and bottom face cooling.

Note that FIG. 7 shows simulation results of an electrode group center temperature shown by R in FIG. 6, and FIG. 8 shows simulation results of a battery group maximum temperature. According to these simulation results, it can be seen that, also in the top face cooling similarly to the bottom face cooling, an effect equal to that of a condition for the bottom face cooling can be obtained for the electrode group center temperature and the battery group maximum temperature.

As described above, battery module 20 has: a plurality of batteries (secondary batteries) 31; one or more bus bars 40 that electrically connect the plurality of batteries 31; and cooling plate 50 that internally has one or more internal passages 51 through which the coolant flows, and is thermally connected to bus bar 40. In addition, each of the plurality of batteries 31 includes: electrode body 61; outer can 62 that accommodates electrode body 61; lid 63 that seals an opening of outer can 62; and a pair of output terminals 42, 43 that are inserted through a pair of through holes provided on lid 63, are insulated from lid 63, and are electrically connected to electrode body 61. Further, one output terminal of the pair of output terminals 42, 43 is connected to bus bar 40.

Therefore, cooling plate 50 can be used to efficiently cool bus bar 40, terminals 42, 43, and an upper portion of the internal structure of battery 31, and to accordingly cool the inside of battery 31 efficiently.

Further, since the internal structure of the battery can be efficiently cooled by cooling plate 50, it is not necessary to increase a heat capacity of bus bar 40 in order to cool the internal structure of battery 31. Therefore, the bus bar can be easily downsized, and battery module 20 can also be easily downsized.

Further, bus bar 40 may include metal part 40a, and insulating part 40b that is made of an insulating material and insulates cooling plate 50 from metal part 40a.

According to this configuration, cooling plate 50 can be reliably insulated from metal part 40a that electrically connects between batteries 31 in bus bar 40. This makes it possible to reliably prevent a short circuit between batteries 31.

Further, cooling plate 50 may include first face contact part 50b that is in contact with a portion on first face 45 between positive electrode terminal 42 and negative electrode terminal 43.

According to this configuration, cooling plate 50 is in contact with a portion on first face 45 between the positive electrode output terminal 42 and negative electrode output terminal 43 in addition to bus bar 40, which enables efficient cooling on the terminals 42, 43 sides in the Z axis of battery 31 in addition to the internal structure of battery 31, and enables effective cooling of entire battery 31.

Further, cooling plate 50 may have flat plate 50a arranged below output terminals 42, 43 in the vertical.

According to this configuration, flat plate 50a of cooling plate 50 is arranged below output terminals 42, 43 in the vertical, which can realize larger flat plate 50a and a remarkable cooling effect of cooling plate 50. Further, flat plate 50a can stably support battery 31, and can stabilize an orientation of battery module 20. Further, "flat plate 50a is arranged below in the vertical" can be rephrased as being arranged so that gravity is applied from the battery toward the flat plate.

Further, cooling plate 50 may be thermally connected to both bus bar 40 connected to positive electrode output terminal 42 and bus bar 40 connected to negative electrode output terminal 43 in each battery 31.

According to this configuration, both output terminals 42, 43 of each battery 31 can be cooled by cooling plate 50, and the internal structure of battery 31 can be efficiently cooled.

Further, battery pack 1 may include a plurality of battery modules 20.

Furthermore, each battery module 20 may have battery group 21 including a plurality of batteries 31 arranged in a row. Moreover, a plurality of battery groups 21 included in the plurality of battery modules 20 may be arranged such that alignment directions of batteries 31 in each battery group 21 are substantially parallel to each other. Then, a plurality of cooling plates 50 included in the plurality of battery modules 20 may be integrally configured.

According to this configuration, each bus bar 40 of the plurality of battery modules 20 can be cooled by one integrally inseparable cooling plate 50. Therefore, the internal structure of each battery module 20 can be efficiently cooled, and battery pack 1 can be easily assembled.

Note that the present disclosure is not limited to the above-described exemplary embodiment and the modified example thereof, and various improvements and changes are possible within the matters described in the claims of the present application and the equivalent scope thereof.

For example, in the above-described exemplary embodiment, a case where insulating part 40b is provided on bus bar 40 has been described. However, the insulating part may be provided on the cooling plate instead of the bus bar. Specifically, the cooling plate may have a main body made of metal, and an insulating part made of an insulating material to insulate the main body from the bus bar. Further, in this case, the insulating part may be provided on the entire face on the bus bar side in the cooling plate, or may be provided only on a portion overlapping with the bus bar when viewed along the Z axis, on a face on the bus bar side in the cooling plate. Alternatively, the cooling plate may be made of resin having an insulating property. In addition, also when the insulating part is provided on the cooling plate or the cooling plate is made of an insulating material, the insulating part or the insulating material of the cooling plate may be made of an insulating material having a heat conductivity of 0.1 W or more. At this time, the insulating material may have a heat conductivity of 1 W or more, or may be made of an insulating material having a heat conductivity of 2 W or more.

Figure 9:
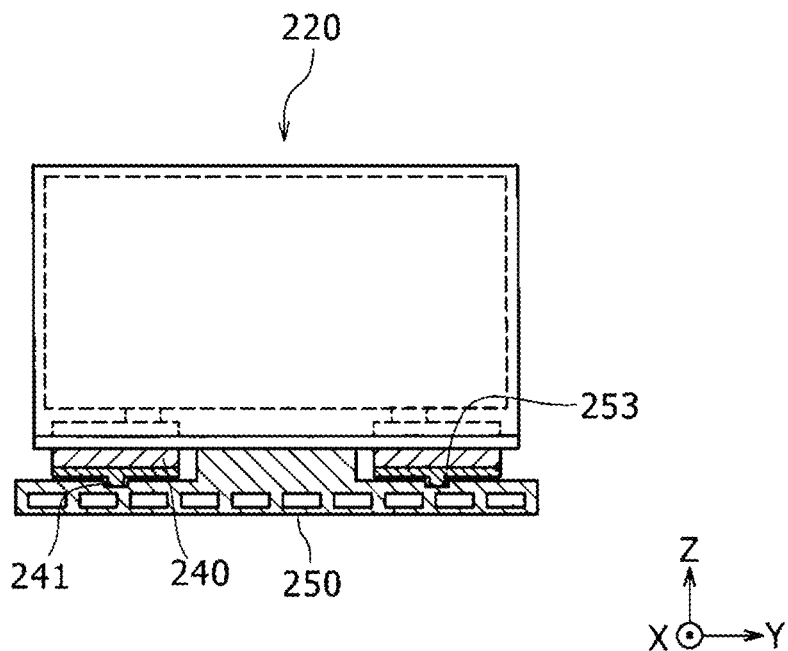
FIG. 9 is a schematic cross-sectional view corresponding to FIG. 2 in a battery module of another Modified Example 2.

In addition, a case where cooling plate 50 is not positioned with respect to bus bar 40 has been described. However, as shown in FIG. 9, that is, as shown in the schematic cross-sectional view corresponding to FIG. 2 in the battery module 220 of another modified example, at least one bus bar 240 may have protrusion 241 as a first locking part projecting downward along the Z axis, and cooling plate 250 may have hole 253 as a second locking part, to allow protrusion 241 to be locked in hole 253. Alternatively, at least one bus bar may have a hole, and the cooling plate may have a protrusion that engages with the hole.

Alternatively, a through hole may be provided in each of the bus bar and the cooling plate, and the output terminal of the battery may be provided with a shaft part projecting in a height direction and having a male screw. Then, by inserting the shaft part of the output terminal through the through hole of the bus bar and the through hole of the cooling plate, and then tightening a nut on a projecting part that projects from the cooling plate in the shaft part, the bus bar and the cooling plates may be fixed to the terminals of the battery. Alternatively, the output terminal of the battery may have a shaft part extending in the height direction, and the cooling plate and the bus bar may each have a U-shaped groove. Then, the cooling plate and the bus bar may be fixed to the output terminal of the battery by press-fitting the shaft part into each U-shaped groove.

More generally, regarding the battery module, at least one bus bar may have one or more first locking parts, and the cooling plate may have one or more second locking parts that are locked to the first locking part. According to these modified examples, the cooling plate can be positioned with respect to the battery module. Therefore, it is easy to cool the battery module with the cooling plate, and it is easy to realize efficient cooling of the battery. Further, providing two or more second locking parts on one cooling plate facilitates positioning.

In addition, a case where battery 31 has terminals 42, 43 facing downward in the vertical direction has been described. However, as shown in a schematic cross-sectional view in FIG. 10 corresponding to FIG. 2 in battery module 320 of another modified example, substantially rectangular parallelepiped battery 31 may be arranged in the battery pack with output terminals 42, 43 facing upward in the vertical direction. Then, cooling plate 350 may have flat plate 350a located above bus bar 340, and a lower face of flat plate 350a may come into contact with an upper face of bus bar 340.

Figure 11:
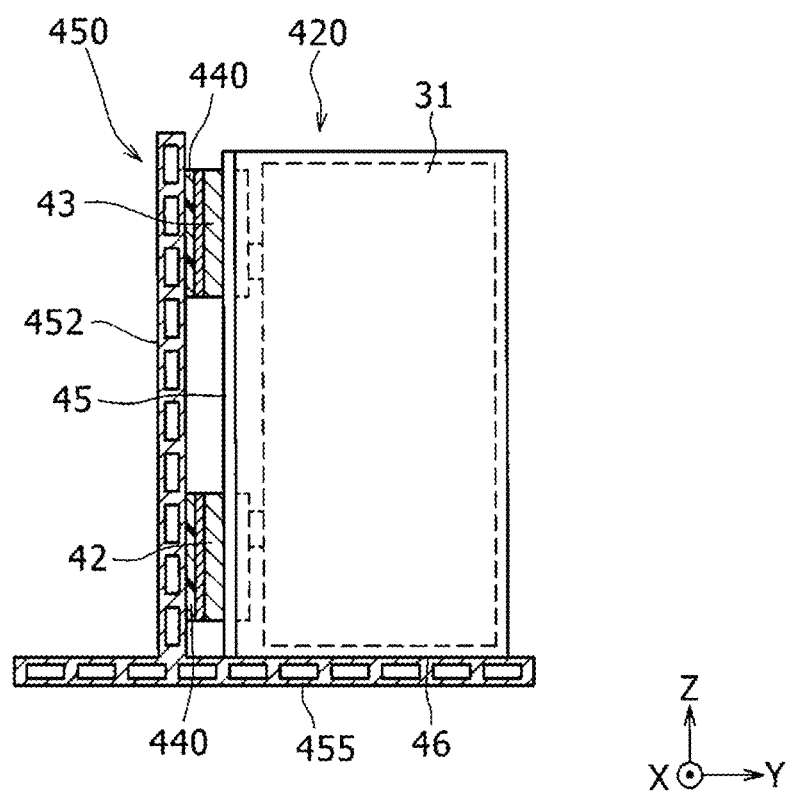
FIG. 11 is a schematic cross-sectional view corresponding to FIG. 2 in a battery module of even another Modified Example 4.

Further, as shown in a schematic cross-sectional view in FIG. 11 corresponding to FIG. 2 in battery module 420 of even another modified example, the secondary battery may be substantially rectangular parallelepiped battery 31, and battery 31 may have output terminals 42, 43 projecting outward from the same first face 45 formed of a substantially flat face. Further, cooling plate 450 may include: flat plate 452 that is in contact with bus bar 440 that electrically connects between the terminals of the plurality of batteries 31; and orthogonal face contact part 455 that is in contact with orthogonal face 46 that is substantially orthogonal to first face 45 in battery 31. Note that, in the modified example shown in FIG. 11, orthogonal face 46 is arranged on a lower side in the vertical and extends in a direction orthogonal to a height direction. However, orthogonal face 46 substantially orthogonal to first face 45 may extend in the height direction in a used state, or may be arranged on an upper side in the vertical direction and extend in a direction orthogonal to the height direction.

According to the above modified example, it is not only possible to effectively cool the internal structure of battery 31 with flat plate 452 in contact with the bus bar 440 in cooling plate 450, but also to cool orthogonal face 46 of battery 31 with orthogonal face contact part 455 of cooling plate 450. Therefore, battery 31 can be cooled more efficiently. The battery module of the present disclosure may be provided with a cooling plate that cools the outer can of the battery, in addition to the cooling plate that cools the bus bar.

In addition, a case where cooling plate 50 is arranged in pack case 10 of battery pack 1 has been described. However, the cooling plate may be included in the lid part or the bottom of the pack case.

In addition, with reference to FIG. 1, a case where passage 51, which is a coolant passage, extends within cooling plate 50 along the X axis has been described. However, the coolant passage may extend along the Y axis within the cooling plate.

In addition, a description has been made on a case where cooling plate 50 is commonly used in the plurality of battery modules 20, and battery pack 1 has only one cooling plate 50. However, the battery pack may have a plurality of battery modules and a plurality of cooling plates, and each cooling plate may cool only one battery module.

In addition, a case where all batteries 31 included in battery module 20 are connected in series has been described. However, all the batteries included in the battery module may be connected in parallel. Alternatively, the plurality of batteries included in the battery module may include two or more batteries connected in series and two or more batteries connected in parallel.

In addition, a description has been made on a case where cooling plate 50 is thermally connected to both bus bar 40 connected to positive electrode terminal 42 and bus bar 40 connected to negative electrode terminal 43 in each battery 31. However, the cooling plate need not be thermally connected to both the bus bar connected to the positive electrode output terminal and the bus bar connected to the negative electrode output terminal in each battery.

In addition, a case where cooling plate 50 is insulated from bus bar 40 has been described. However, the cooling plate may come into contact only with the bus bar where conduction is allowed, and the cooling plate need not be insulated from the bus bar.

Figure 12:
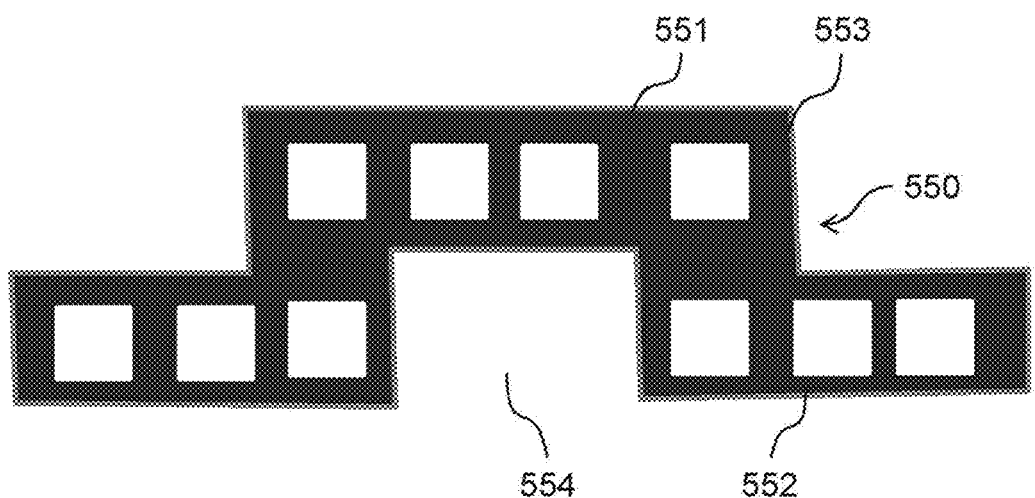
FIG. 12 is a schematic cross-sectional view of a cooling plate corresponding to FIG. 2 in Modified Example 1.
Figure 13:
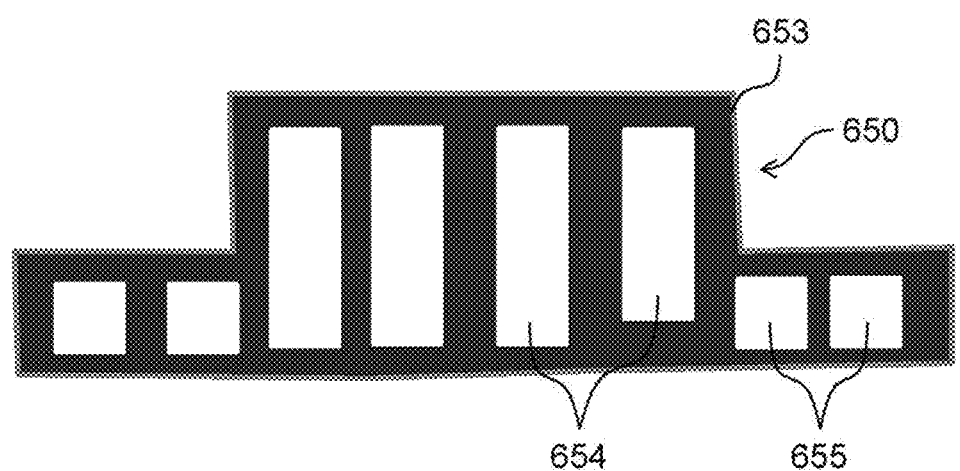
FIG. 13 is a schematic cross-sectional view of a cooling plate corresponding to FIG. 2 in Modified Example 2.

FIGS. 12, 13, and 14 are schematic cross-sectional views corresponding to FIG. 2, and showing Modified Examples 1, 2, and 3 of the cooling plate.

As shown in FIG. 12, cooling plate 550 has: first main surface 551 opposed to a plurality of batteries 31; and second main surface 552 located on an opposite side to this first main surface 551. On this first main surface 551, a region formed with an abutting face of first face contact part 553 may project toward the plurality of batteries 31. Further, on second main surface 552, at least a part of a region overlapping with the abutting face of first face contact part 553 may be recessed to form depression 554. This configuration makes it possible to prevent first face contact part 553 from becoming significantly larger than a remaining portion, while reducing a distance between the first face (for example, a surface of lid 63) and the abutting face of first face contact part 553. Therefore, a weight of cooling plate 550 can be reduced.

Further, as shown in FIG. 13, in cooling plate 650, first face contact part 653 may be thicker than a remaining portion, and passage 654 in first face contact part 653 may have a larger dimension of cooling plate 650 in a thickness direction (in other words, a direction in which the plurality of batteries 31 and cooling plate 650 are opposed to each other) than that of passage 655 of the remaining portion. This configuration makes it easy to increase an area of a cross section perpendicular to a flow direction of a coolant, in passage 654 in first face contact part 653. Therefore, it is possible to transfer more heat to the coolant not only as first face contact part 653 but also as cooling plate 650. Further, it is possible to reduce a pressure loss of the coolant flowing through cooling plate 650.

In addition, as shown in FIGS. 14(A) and 14(B), cooling plate 750 may have two flat plates 756 opposed to bus bar 40, and connector 757 that connects flat plate 756 and first face contact part 753. Further, this connector 757 may be more flexible than flat plate 756 and first face contact part 753. With this configuration, even if a plurality of batteries 31 (or bus bars 40) have a tolerance (a dimensional tolerance, an assembly tolerance, or the like), it is possible to thermally connect to the plurality of batteries 31 or bus bars 40 with connector 757 having high flexibility, while absorbing these tolerances. This connector 757 may be provided by joining a separate member to first face contact part 753 and flat plate 756, or may be provided by processing a portion integrated with first face contact part 753 and flat plate 756 in cooling plate 750. Here, in cooling plate 750 shown in FIG. 14(A), passage 758 is provided in each flat plate 756. Further, in cooling plate 750 shown in FIG. 14(B), first face contact part 753 and passage 759 are provided.

FIG. 15 shows a battery module of an additional modified example showing battery 31 and cooling plate 850, and is a schematic cross-sectional view corresponding to FIG. 2. In addition, cooling plate 850 may be opposed to a first face of the housing such as lid 63, and a plurality of heat transfer sheets 800 may be provided between cooling plate 850 and the first face. Further, among heat transfer sheets 800, rigidity of heat transfer sheet 800A interposed between first face contact part 853 and the first face may be different from rigidity of heat transfer sheet 800B interposed between the first face and a remaining portion excluding first face contact part 853 of cooling plate 850. This configuration allows cooling plate 850 to be connected to the plurality of batteries 31 (or bus bars 40) while each heat transfer sheet 800 absorbs a difference in a height generated between the plurality of batteries 31 and an inclination of each battery 31, when cooling plate 850 is connected to the plurality of batteries 31 (or bus bars 40). Specifically, an elastic modulus of heat transfer sheet 800B covering output terminal 42 (or bus bars 40) of each battery 31 and an abutting face in flat plate 856 of cooling plate 850 may be higher than that of heat transfer sheet 800A provided on an abutting face with the first face in the first face abutting part. This is because, by satisfying such a magnitude relationship of an elastic modulus, an inclination tolerance of the batteries tends to be larger than a height tolerance between the batteries, and a tolerance to be absorbed tends to be larger.

Next, second, third, and fourth exemplary embodiments will be described.

In recent years, there has been a demand for even higher capacities of battery modules, and higher capacities of batteries are being promoted in order to meet this demand. Increase of the capacity of batteries leads to a flow of a large current through a bus bar that connects the batteries. This increases an amount of heat generated in the bus bar. Increase of the amount of heat generated by the bus bar causes heat to be transferred from the bus bar to the battery to raise a temperature of the battery, which may deteriorate power generation performance of the battery. As a method of suppressing heat generation of the bus bar, it is conceivable to cause a cooling plate to abut on the bus bar. However, in a conventional battery, an output terminal and a safety valve are provided on the same face of an outer can. Therefore, when the cooling plate abuts on the bus bar, an upper part of the safety valve is covered with the cooling plate. In this case, when gas is released from the safety valve, the gas stays between the cooling plate and the battery, and contents of the battery tend to adhere to the output terminal. Adhesion of contents of the battery to the output terminal causes corrosion of the output terminal and short circuit between batteries, which may deteriorate reliability of the battery module. Therefore, there is room for improvement in the conventional battery module in terms of improving the reliability.

Battery modules of the second, third, and fourth exemplary embodiments are made in view of such a situation, and an object is to provide technology for increasing reliability of the battery modules.

In the battery modules of the second, third, and fourth exemplary embodiments, a housing of the battery has a valve arranged on a face different from a first face and configured to release gas inside the housing.

According to the battery modules of the second, third, and fourth exemplary embodiments, the reliability of the battery modules can be improved.

Second Exemplary Embodiment

Figure 16:
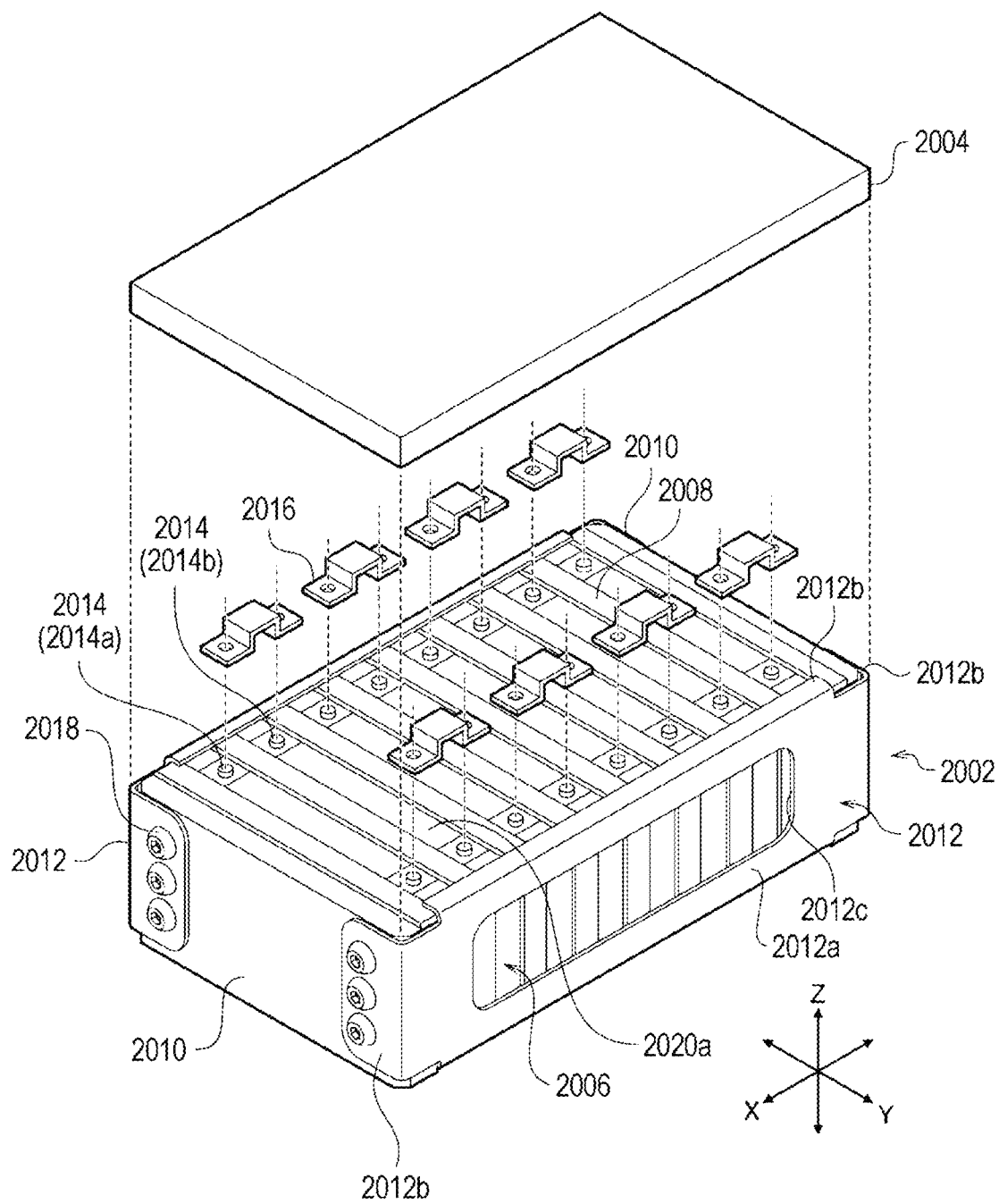
FIG. 16 is a perspective view of a battery module according to a second exemplary embodiment.

FIG. 16 is a perspective view of a battery module according to the second exemplary embodiment. FIG. 16 illustrates a state where a cooling plate and a bus bar are disassembled. Battery module 2001 includes assembly 2002, cooling plate 2004, and a plurality of bus bars 2016. Assembly 2002 has a structure in which a plurality of batteries 2006 are assembled. Assembly 2002 of the present exemplary embodiment takes a form of a battery group in which a plurality of flat batteries 2006 are stacked, that is, a battery stack. Assembly 2002 has a plurality of batteries 2006, a plurality of separators 2008, a pair of end plates 2010, and a pair of bind bars 2012.

Each battery 2006 is a rechargeable secondary battery such as, for example, a lithium ion battery, a nickel-hydrogen battery, or a nickel-cadmium battery. Battery 2006 is a so-called square battery. Battery 2006 has output terminal 2014 of a positive electrode and output terminal 2014 of a negative electrode on first face 2020a in housing 2020, which will be described later. Hereinafter, as appropriate, output terminal 2014 of a positive electrode will be referred to as positive electrode terminal 2014a, and output terminal 2014 of a negative electrode will be referred to as negative electrode terminal 2014b. Further, when it is not necessary to distinguish the polarities of output terminals 2014, positive electrode terminal 2014a and negative electrode terminal 2014b are collectively referred to as output terminal 2014.

First face 2020a provided with a pair of output terminals 2014 has a substantially rectangular shape. Battery 2006 has a pair of long side faces connected to a long side of first face 2020a and a pair of short side faces connected to a short side of first face 2020a. The long side faces are faces (main surfaces) having a largest area among faces of battery 2006. The plurality of batteries 2006 are arranged side by side at a predetermined interval so that long side faces of adjacent batteries 2006 are opposed to each other. In the present exemplary embodiment, an alignment direction of the plurality of batteries 2006 is along axis X.

Output terminals 2014 of individual batteries 2006 are arranged so as to face the same direction. Two adjacent batteries 2006 are stacked so that positive electrode terminal 2014a of one battery 2006 is adjacent to negative electrode terminal 2014b of another battery 2006. Positive electrode terminal 2014a and negative electrode terminal 2014b are electrically connected via bus bar 2016. Moreover, output terminals 2014 of the same polarity in a plurality of adjacent batteries 2006 may be connected in parallel by bus bar 2016 to form a battery block, and battery blocks may be connected in series.

Separator 2008 is also called an insulating spacer, and is made of, for example, resin having an insulating property. Separator 2008 is arranged between two adjacent batteries 2006 to electrically insulate between these two batteries 2006. Further, separator 2008 is arranged between battery 2006 and end plate 2010 to insulate between battery 2006 and end plate 2010. Further, separator 2008 extends along axis X and covers a part of battery 2006. This makes it possible to secure a creepage distance between adjacent batteries 2006 or between battery 2006 and end plate 2010. Examples of resin constituting separator 2008 include thermoplastic resin such as polypropylene (PP), polybutylene terephthalate (PBT), polycarbonate (PC), and Noryl (registered trademark) resin (modified PPE).

A plurality of batteries 2006 and a plurality of separators 2008 arranged side by side are sandwiched between a pair of end plates 2010. The pair of end plates 2010 are arranged adjacent to batteries 2006 located at both ends in axis X, via separator 2008. End plate 2010 is made of, for example, a metal plate. On a face of end plate 2010 opposed to a long side face of battery 2006, there is provided a screw hole (not illustrated) into which screw 2018 is screwed.

The pair of bind bars 2012 are elongated members whose longitudinal axis is axis X. The pair of bind bars 2012 are arranged so as to face each other in axis Y orthogonal to axis X and parallel to a longitudinal axis of first face 2020a. Between the pair of bind bars 2012, the plurality of batteries 2006, the plurality of separators 2008, and the pair of end plates 2010 are interposed. Each bind bar 2012 has rectangular flat part 2012a extending parallel to a short side face of battery 2006, and four eaves 2012b projecting from individual end sides of flat part 2012a toward battery 2006. Two eaves 2012b opposed to each other in axis X are provided with through holes (not illustrated) through which screw 2018 is inserted. Flat part 2012a is provided with opening 12c that exposes a short side face of battery 2006.

In a state where the plurality of batteries 2006 and the plurality of separators 2008 are arranged alternately and sandwiched between the pair of end plates 2010 in axis X, the plurality of batteries 2006, the plurality of separators 2008, and the pair of end plates 2010 are sandwiched by a pair of bind bars 2012 in axis Y. Each bind bar 2012 is positioned so that a through hole of bind bar 2012 overlaps with a screw hole of end plate 2010. Then, screw 2018 is inserted through the through hole and screwed into the screw hole. By engaging the pair of bind bars 2012 with the pair of end plates 2010 in this way, the plurality of batteries 2006 are restrained.

The plurality of batteries 2006 are positioned in axis X by being tightened in axis X by bind bar 2012. In addition, first face 2020a and second face 2020b opposed to first face 2020a (see FIG. 17(B)) of the plurality of batteries 2006 abut, via separator 2008, on two eaves 2012b opposed to each other in axis Z orthogonal to axis X and axis Y. This allows the plurality of batteries 2006 to be positioned in axis Z. As an example, after the positioning of these are completed, bus bar 2016 is attached to output terminal 2014 of each battery 2006, and output terminals 2014 of the plurality of batteries 2006 are electrically connected to each other.

In assembly 2002, a face on a side on which output terminal 2014 projects is covered with cooling plate 2004. Cooling plate 2004 is arranged so as to be opposed to output terminal 2014 or first face 2020a with bus bar 2016 sandwiched in between, and is connected to each bus bar 2016 thermally, that is, to be heat exchangeable. A main surface of cooling plate 2004 abuts on each bus bar 2016. This allows each bus bar 2016 to be cooled, and accordingly each battery 2006 to be cooled. Between each bus bar 2016 and cooling plate 2004, a resin sheet or the like having good heat conductivity may be interposed in order to further improve the heat exchange efficiency between the two. Further, between cooling plate 2004 and a surface opposed to cooling plate 2004 in battery 2006, and, for example, between cooling plate 2004 and a surface between two output terminals 2014 in battery 2006, a heat conductive sheet may be interposed.

Cooling plate 2004 is made of a material having high heat conductivity, such as aluminum. Note that cooling plate 2004 may internally have a flow path through which a refrigerant such as water or ethylene glycol flows. That is, cooling plate 2004 may be a flat plate-shaped tube. This can further enhance the cooling efficiency of bus bar 2016 and battery 2006. Cooling plate 2004 has, at a predetermined position, an insertion part (not illustrated) through which a fastening member such as a screw is inserted. By insertion of the fastening member through the insertion part, assembly 2002 and cooling plate 2004 are fixed to each other. Note that the fastening member that fixes assembly 2002 and cooling plate 2004 may be used for fixing cooling plate 2004 to a module case. Further, the fastening member is preferably provided at a position that does not overlap with battery 2006 when viewed in an alignment direction of assembly 2002 and cooling plate 2004. For example, the fastening member is connected to end plate 2010 or bind bar 2012.

Figure 18:
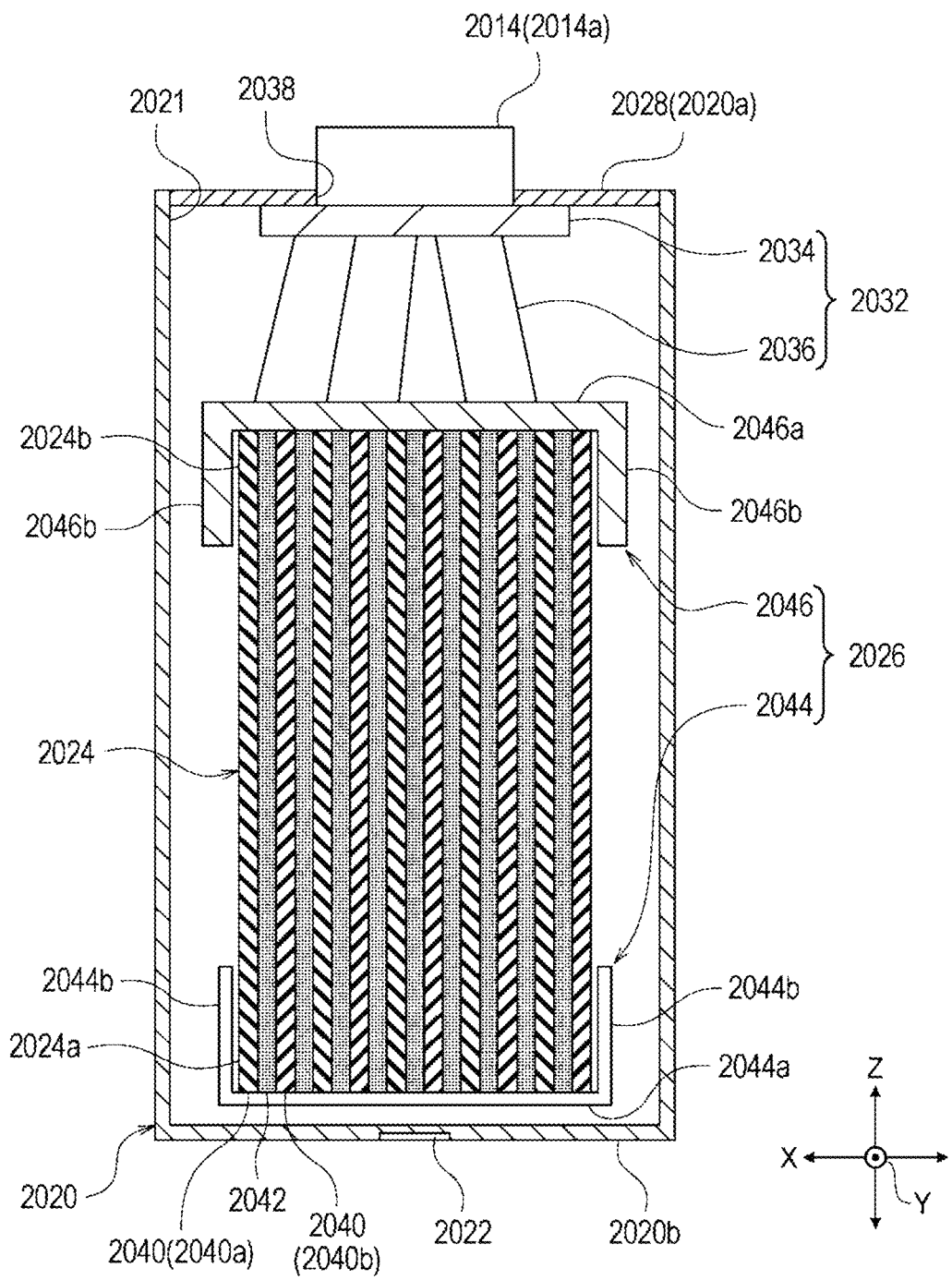
FIG. 18 is a cross-sectional view schematically showing an internal structure of the battery.

Next, a structure of battery 2006 will be described in detail. FIG. 17(A) is a perspective view of a battery as viewed from a first face side. FIG. 17(B) is a perspective view of the battery as viewed from a second face side. FIG. 18 is a cross-sectional view schematically showing an internal structure of the battery. Battery 2006 includes housing 2020, output terminal 2014, valve 2022, electrode body 2024, and restraint part 2026.

Housing 2020 has a flat rectangular parallelepiped shape. Housing 2020 has outer can 2029 having a bottomed tubular shape formed with substantially rectangular opening 2021, and accommodates electrode body 2024, an electrolytic solution, and the like in outer can 2029 through opening 2021. Housing 2020 has lid 2028 that closes opening 2021. Lid 2028 is, for example, a rectangular plate. Lid 2028 and outer can 2029 (including lid 2028) are conductors, and are made of metal, for example. For example, housing 2020 is made of aluminum, iron, stainless steel, or the like. Lid 2028 and opening 2021 are joined, for example, by a laser. Lid 2028 is provided with positive electrode terminal 2014*a* near one end in a longitudinal axis and negative electrode terminal 2014*b* near another end. Therefore, lid 2028 is included in first face 2020*a* of housing 2020. Alternatively, lid 2028 and outer can 2029 may be made of resin.

On a face different from first face 2020*a* in housing 2020, valve 2022 is arranged. Therefore, housing 2020 has a valve arrangement face on which valve 2022 is arranged, and a valve non-arrangement face on which valve 2022 is not arranged. First face 2020*a* is included in the valve non-arrangement face. In the present exemplary embodiment, valve 2022 is arranged on second face 2020*b* opposed to first face 2020*a*. Therefore, second face 2020*b* is the valve arrangement face. Therefore, the valve arrangement face is opposed to first face 2020*a*.

Valve 2022 is also called a safety valve, and is a mechanism to release gas inside housing 2020. For example, valve 2022 includes a thin-walled part provided on a part of second face 2020*b* and having a thickness thinner than other portions, and a linear groove formed on a surface of the thin-walled part. In this configuration, when internal pressure of housing 2020 rises to a predetermined value or more, valve 2022 opens by tearing the thin-walled part starting from the groove. This causes gas in housing 2020 to be released from valve 2022. Examples of the gas in housing 2020 include carbon dioxide gas generated by decomposition of an electrolytic solution. In addition, the gas released to the outside of housing 2020 may also contain fine particles such as fragments of the battery structure. Note that valve 2022 is not limited to the configuration formed by recessing a surface of second face 2020*b* on a side exposed to the outside of housing 2020. For example, a surface of second face 2020*b* on a side opposed to electrode body 2024 may be recessed to form valve 2022.

Each of the pair of output terminals 2014 is electrically connected to electrode body 2024 via current collector 2032 arranged in housing 2020. Current collector 2032 has current collector plate 2034 and tab 2036. Each of the pair of output terminals 2014 is inserted through hole 2038 formed on lid 2028 and fixed to current collector plate 2034. Between lid 2028, and output terminal 2014 and current collector plate 2034, an insulating sealing member (not illustrated) is interposed.

Electrode body 2024 has a structure in which a plurality of electrode plates 2040 are stacked. Specifically, electrode body 2024 has a structure in which positive electrode plate 2040*a*, which is electrode plate 2040 of the positive electrode, and negative electrode plate 2040*b*, which is electrode plate 2040 of the negative electrode, are alternately stacked. Between adjacent positive electrode plate 2040*a* and negative electrode plate 2040*b*, electrode plate separator 2042 is interposed. Each electrode plate 2040 and current collector plate 2034 are electrically connected via tab 2036. Each positive electrode plate 2040*a* is connected to current collector plate 2034 fixed to positive electrode terminal 2014*a*, and each negative electrode plate 2040*b* is connected to current collector plate 2034 fixed to negative electrode terminal 2014*b*. Electrode plate separator 2042 is infiltrated with an electrolytic solution. Therefore, when gas is generated by decomposition of the electrolytic solution, electrode body 2024 may expand. Second face 2020*b*, which is the valve arrangement face, is opposed to an end face parallel to a stacking direction (direction along axis X in the present exemplary embodiment) of the plurality of positive electrode plates 2040*a* and the plurality of negative electrode plates 2040*b* in electrode body 2024.

Restraint part 2026 is a member that restrains an edge of electrode body 2024. Restraint part 2026 bundles the plurality of positive electrode plates 2040*a* and the plurality of negative electrode plates 2040*b*. Moreover, restraint part 2026 also bundles electrode plate separator 2042 together with the plurality of electrode plates 2040. Restraint part 2026 restrains an edge opposed to the valve non-arrangement face, among edges of electrode body 2024. In the example shown in FIG. 18, among edges of electrode body 2024, second edge 2024*b* opposed to first face 2020*a* that is the valve non-arrangement face is restrained by restraint part 2026, more specifically, by second gripper 2046 described later.

Further, in the valve non-arrangement face, first face 2020*a* corresponds to an opposing face that is opposed to second face 2020*b*, which is the valve arrangement face. Therefore, second gripper 2046 of restraint part 2026 restrains an edge closer to the opposing face than the valve arrangement face. Furthermore, second gripper 2046 of restraint part 2026 restrains second edge 2024*b* that is opposed to the opposing face. The edge closer to the opposing face than the valve arrangement face includes, in addition to the edge opposed to the opposing face, a region close to the opposing face in an edge connecting an edge opposed to the valve placement surface and an edge opposed to the opposing face, for example, a region on the opposing face side from a midpoint of the edge.

Further, electrode body 2024 has first edge 2024a opposed to the valve arrangement face and second edge 2024b on a side opposite to first edge 2024a. Then, when electrode body 2024 expands, restraint part 2026 of the present exemplary embodiment restrains the plurality of electrode plates 2040 so that first edge 2024a on the valve 2022 side in electrode body 2024 expands in the stacking direction of electrode plates 2040 from second edge 2024b.

Restraint part 2026 has first gripper 2044 that grips first edge 2024a and second gripper 2046 that grips second edge 2024b. First gripper 2044 and second gripper 2046 are made of, for example, resin having an insulating property and corrosion resistance to the electrolytic solution. Specifically, it is possible to preferably adopt a polymer material such as polyphenylene sulfide resin (PPS), polyimide resin, polyamide-imide resin, polyetheretherketone resin (PEEK), polyetherketoneketone resin (PEKK), and polyethersulfone resin (PES).

Alternatively, it is possible to use a polymer material such as polyolefin resin such as polypropylene (PP) or polyethylene (PE); or fluororesin such as perfluoroalkoxy alkane (PFA) or polytetrafluoroethylene (PTFE). Further, first gripper 2044 and second gripper 2046 may be adhesive tapes having an insulating property.

Specifically, polyethylene (PE), polypropylene (PP), or polyphenylene sulfide (PPS) may be used.

First gripper 2044 has flat plate 2044a and a pair of arms 2044b. Flat plate 2044a extends up to electrode plates 2040 located at both ends in the stacking direction of electrode plates 2040 (direction along axis X in the present exemplary embodiment), and a main surface abuts on each electrode plate 2040. The pair of arms 2044b extend from both ends of flat plate 2044a in the stacking direction of electrode plates 2040 toward second edge 2024b. First gripper 2044 restrains first edge 2024a of the plurality of electrode plates 2040 in the stacking direction, with the pair of arms 2044b. Note that first gripper 2044 is not limited to a configuration in which flat plate 2044a covers a face of first edge 2024a opposed to second face 2020b when first edge 2024a is restrained. For example, flat plate 2044a may be arranged so as to cover a face of electrode body 2024 opposed to short side face 2020c.

Second gripper 2046 has flat plate 2046a and a pair of arms 2046b. Flat plate 2046a extends up to electrode plates 2040 located at both ends in the stacking direction of electrode plates 2040, and a main surface abuts on each electrode plate 2040. The pair of arms 2046b extend from both ends of flat plate 2046a in the stacking direction of electrode plates 2040 toward first edge 2024a. Second gripper 2046 restrains second edge 2024b of the plurality of electrode plates 2040 in the stacking direction, with the pair of arms 2046b. Note that second gripper 2046 is not limited to a configuration in which flat plate 2046a covers a face of second edge 2024b opposed to first face 2020a when second edge 2024b is restrained. For example, flat plate 2046a may be arranged so as to cover a face of electrode body 2024 opposed to short side face 2020c.

First gripper 2044 has a larger deformation amount than that of second gripper 2046 when receiving a force in the stacking direction of the plurality of positive electrode plates 2040a and the plurality of negative electrode plates 2040b. For example, flat plate 2044a and arm 2044b of first gripper 2044 have a thinner thickness than that of flat plate 2046a and arm 2046b of second gripper 2046. This allows first gripper 2044 to have higher flexibility than second gripper 2046. Therefore, first gripper 2044 has a smaller restraint force than second gripper 2046. For this reason, gas is more likely to flow out from first edge 2024a than second edge 2024b. Further, when gas is generated to an extent of expanding electrode body 2024, first gripper 2044 is deformed more than second gripper 2046. Note that, a deformation amount of first gripper 2044 can be made larger than a deformation amount of second gripper 2046, by making first gripper 2044 with a material that is more flexible than a material that constitutes second gripper 2046.

Note that the following methods are exemplified as a method of attaching first gripper 2044 and second gripper 2046 to electrode body 2024. For example, when the flat plate of each gripper has low flexibility and the arm has high flexibility, the gripper can be attached to electrode body 2024 by press-fitting electrode body 2024 between the pair of arms. In addition, in order to facilitate the attachment of the gripper to electrode body 2024, faces opposed to each other in the pair of arms, that is, faces in contact with electrode body 2024 may be tapered such that a distance from each other toward a tip end of the arm is increased. When the arm has low flexibility similarly to the flat plate, electrode body 2024 can be restrained by the gripper, for example, by making a distance between the pair of arms smaller than a thickness of electrode body 2024 in the stacking direction. Further, when first gripper 2044 and/or second gripper 2046 is made of a material that has little rigidity, such as adhesive tape, the adhesive tape may be attached to electrode body 2024 while applying tension, when the gripper is attached to electrode body 2024.

FIGS. 19(A) and 19(B) are schematic views showing a state where an electrode body expands. As shown in FIG. 19(A), when gas is generated by decomposition of the electrolytic solution inside electrode body 2024, electrode body 2024 may expand. When electrode body 2024 expands, first gripper 2044 and second gripper 2046 receive a force in the stacking direction of electrode plates 2040, more specifically, a force in a direction in which the pair of arms 2044b and the pair of arms 46b are separated from each other. At this time, first gripper 2044 having lower rigidity than that of second gripper 2046 may be deformed more than second gripper 2046. Therefore, in electrode body 2024, first edge 2024a may expand more than second edge 2024b.

Therefore, as shown in FIG. 19(B), gas G generated inside electrode body 2024 may be ejected from the first edge 2024a side to the outside of electrode body 2024. When the gas is ejected from first edge 2024a, electrode body 2024 may be displaced in a direction away from valve 2022, with the ejection of the gas as a propulsive force. In this case, electrode body 2024 may be retreated from a periphery of valve 2022. Therefore, it is possible to secure a flow path for gas in housing 2020 to reach valve 2022.

FIGS. 20(A) and 20(B) are schematic views showing a state where gas is ejected from the battery. As shown in FIG. 20(A), as an example, battery 2006 is placed on cooling plate 2004 with an orientation determined such that output terminal 2014 faces downward in the vertical direction. Further, in the present exemplary embodiment, valve 2022 is arranged on second face 2020b an opposite side to first face 2020a on which output terminal 2014 is arranged. Therefore, valve 2022 faces upward in the vertical direction. This causes gas G in battery 2006 to be released from valve 2022 toward a side opposite to output terminal 2014.

Note that a position where valve 2022 is provided, that is, the valve arrangement face is not limited to second face 2020b opposed to first face 2020a where output terminal 2014 is provided. For example, as shown in FIG. 20(B), valve 2022 may be arranged on short side face 2020*c* of battery 2006. In this case, gas G in battery 2006 is released from valve 2022 toward a side of battery 2006.

As described above, battery module 2001 of the present exemplary embodiment includes assembly 2002 of the plurality of batteries 2006, bus bar 2016, and cooling plate 2004. Battery 2006 has housing 2020, the pair of output terminals 2014 arranged on first face 2020*a* in housing 2020, and valve 2022 arranged on a face different from first face 2020*a* of housing 2020 and configured to release gas inside housing 2020. Bus bar 2016 electrically connects output terminals 2014 of the plurality of batteries 2006. Cooling plate 2004 is thermally connected to bus bar 2016 and is opposed to first face 2020*a*. Connecting cooling plate 2004 to bus bar 2016 in this way allows bus bar 2016 to be efficiently cooled. This makes it possible to increase capacities of battery 2006 and battery module 2001, without increasing a heat capacity of the bus bar by increasing a size and complicating a structure of the bus bar.

In addition, it is possible to suppress temperature rise of battery 2006 due to transmission of heat generated in bus bar 2016 to battery 2006. Further, cooling plate 2004 can also cool output terminal 2014 and electrode body 2024 via bus bar 2016. Therefore, battery 2006 can be cooled efficiently, and deterioration in power generation performance of battery module 2001 can be suppressed. In addition, a heat dissipation structure of battery module 2001 other than cooling plate 2004 can be omitted or reduced, which enables downsizing and cost reduction of battery module 2001.

Further, in battery 2006 of the present exemplary embodiment, output terminal 2014 and valve 2022 are arranged on different faces of housing 2020. Therefore, even if cooling plate 2004 is connected to bus bar 2016, valve 2022 is not covered with cooling plate 2004. This makes it possible to prevent gas G released from valve 2022 from staying in a space between housing 2020 and cooling plate 2004. As a result, it is possible to suppress contents of battery 2006 from adhering to output terminal 2014. This can suppress corrosion of output terminal 2014 and short circuit between batteries 2006, and can improve reliability of battery module 2001.

Further, battery 2006 according to the present exemplary embodiment includes: housing 2020; electrode body 2024 accommodated in housing 2020 and having a plurality of positive electrode plates 2040*a* and a plurality of negative electrode plates 2040*b* being stacked; a pair of output terminals 2014 arranged on first face 2020*a* of housing 2020 and electrically connected to electrode body 2024; valve 2022 arranged on a face different from first face 2020*a* of housing 2020 and configured to release gas G inside housing 2020; and restraint part 2026 that restrains an edge of electrode body 2024. Housing 2020 has the valve arrangement face and the valve non-arrangement face including first face 2020*a*. Restraint part 2026 restrains an edge opposed to the valve non-arrangement face, among edges of electrode body 2024.

By individually arranging output terminal 2014 and valve 2022 on different faces of housing 2020, it is possible to suppress contents of battery 2006 from adhering to output terminal 2014. In addition, by restraining an edge of electrode body 2024 opposed to the valve non-arrangement face, gas G discharged from electrode body 2024 can be guided toward valve 2022. This makes is possible to promote releasing of gas from valve 2022 to the outside of housing 2020. Therefore, according to battery 2006 of the present exemplary embodiment, it is possible to suppress corrosion of output terminal 2014 and short circuit between batteries 2006, while ensuring releasing of gas from valve 2022 to the outside of housing 2020. This can improve the reliability of battery module 2001.

Further, in the present exemplary embodiment, the valve non-arrangement face has the opposing face that is opposed to the valve arrangement face, and restraint part 2026 restrains an edge that is closer to the opposing face than the valve arrangement face, among edges of electrode body 2024. As a result, the releasing of the gas from electrode body 2024 toward valve 2022 can be further promoted. Further, restraint part 2026 of the present exemplary embodiment restrains an edge opposed to the opposing face, among edges of electrode body 2024. As a result, the releasing of the gas from electrode body 2024 toward valve 2022 can be even further promoted.

Further, in the present exemplary embodiment, electrode body 2024 has first edge 2024*a* opposed to the valve arrangement face and second edge 2024*b* on a side opposite to first edge 2024*a*. Then, restraint part 2026 fixes second edge 2024*b* on the side opposite to valve 2022 more firmly than first edge 2024*a* on the valve 2022 side. More specifically, restraint part 2026 has first gripper 2044 that grips first edge 2024*a* and second gripper 2046 that grips second edge 2024*b*. Then, first gripper 2044 has a larger deformation amount than that of second gripper 2046 when receiving a force in the stacking direction of the plurality of positive electrode plates 2040*a* and the plurality of negative electrode plates 2040*b*.

When output terminal 2014 and valve 2022 are arranged on different faces of housing 2020, electrode body 2024 may hinder the gas from being discharged from valve 2022. That is, between output terminal 2014 and electrode body 2024, current collector 2032 is interposed. Therefore, in a conventional battery in which output terminal 2014 and valve 2022 are arranged on the same face of housing 2020, it has been possible to secure a flow path of gas G leading to valve 2022 with current collector 2032. However, when output terminal 2014 and valve 2022 are individually arranged on different faces of housing 2020, current collector 2032 is not interposed between valve 2022 and electrode body 2024. Therefore, valve 2022 may be closed by electrode body 2024, and releasing of gas from valve 2022 may be hindered.

On the other hand, by fixing second edge 2024*b* on the side opposite to valve 2022 more firmly with restraint part 2026 than first edge 2024*a* on the valve 2022 side, the gas can be easily ejected toward valve 2022. In this case, it is possible to suppress hindrance by electrode body 2024 on the releasing of gas from valve 2022.

The battery of the present exemplary embodiment includes: a housing; an electrode body accommodated in the housing and having a plurality of positive electrode plates and a plurality of negative electrode plates being stacked; a pair of output terminals arranged on a first face of the housing and electrically connected to the electrode body; a valve arranged on a face different from the first face of the housing and configured to release gas inside the housing; and a restraint part that restrains an edge of the electrode body. The housing has a valve arrangement face and a valve non-arrangement face including the first face, and the restraint part restrains an edge opposed to the valve non-arrangement face.

Further, battery module 1 of the present exemplary embodiment includes: assembly 2 of a plurality of batteries 6; bus bar 16 that electrically connects output terminals 14 of the plurality of batteries 6; and cooling plate 4 that is thermally connected to bus bar 16 and is opposed to first face 20*a*. Connecting cooling plate 4 to bus bar 16 in this way allows bus bar 16 to be efficiently cooled. This makes it possible to increase capacities of battery 6 and battery module 1, without increasing a heat capacity of the bus bar by increasing a size and complicating a structure of the bus bar.

In addition, it is possible to suppress temperature rise of battery 6 due to transmission of heat generated in bus bar 16 to battery 6. Further, cooling plate 4 can also cool output terminal 14 and electrode body 24 via bus bar 16. Therefore, battery 6 can be cooled efficiently, and deterioration in power generation performance of battery module 1 can be suppressed. In addition, a heat dissipation structure of battery module 1 other than cooling plate 4 can be omitted or reduced, which enables downsizing and cost reduction of battery module 1.

Further, as described above, in battery 6 of the present exemplary embodiment, output terminal 14 and valve 22 are arranged on different faces of outer can 20. Therefore, even if cooling plate 4 is connected to bus bar 16, valve 22 is not covered with cooling plate 4. This makes it possible to prevent gas G released from valve 22 from staying in a space between outer can 20 and cooling plate 4. As a result, it is possible to suppress contents of battery 6 from adhering to output terminal 14. This can suppress corrosion of output terminal 14 and short circuit between batteries 6, and can improve reliability of battery module 1.

In the present exemplary embodiment, by restraining first edge 2024a with first gripper 2044 and restraining second edge 2024b with second gripper 2046, and by making a deformation amount of first gripper 2044 larger than a deformation amount of second gripper 2046, gas G is made to flow out from electrode body 2024 toward valve 2022. However, the structure is not particularly limited to this, and the following modified examples can be given as a structure in which gas G flows out from electrode body 2024 toward valve 2022.

(Modified Example 1)

Figure 21:
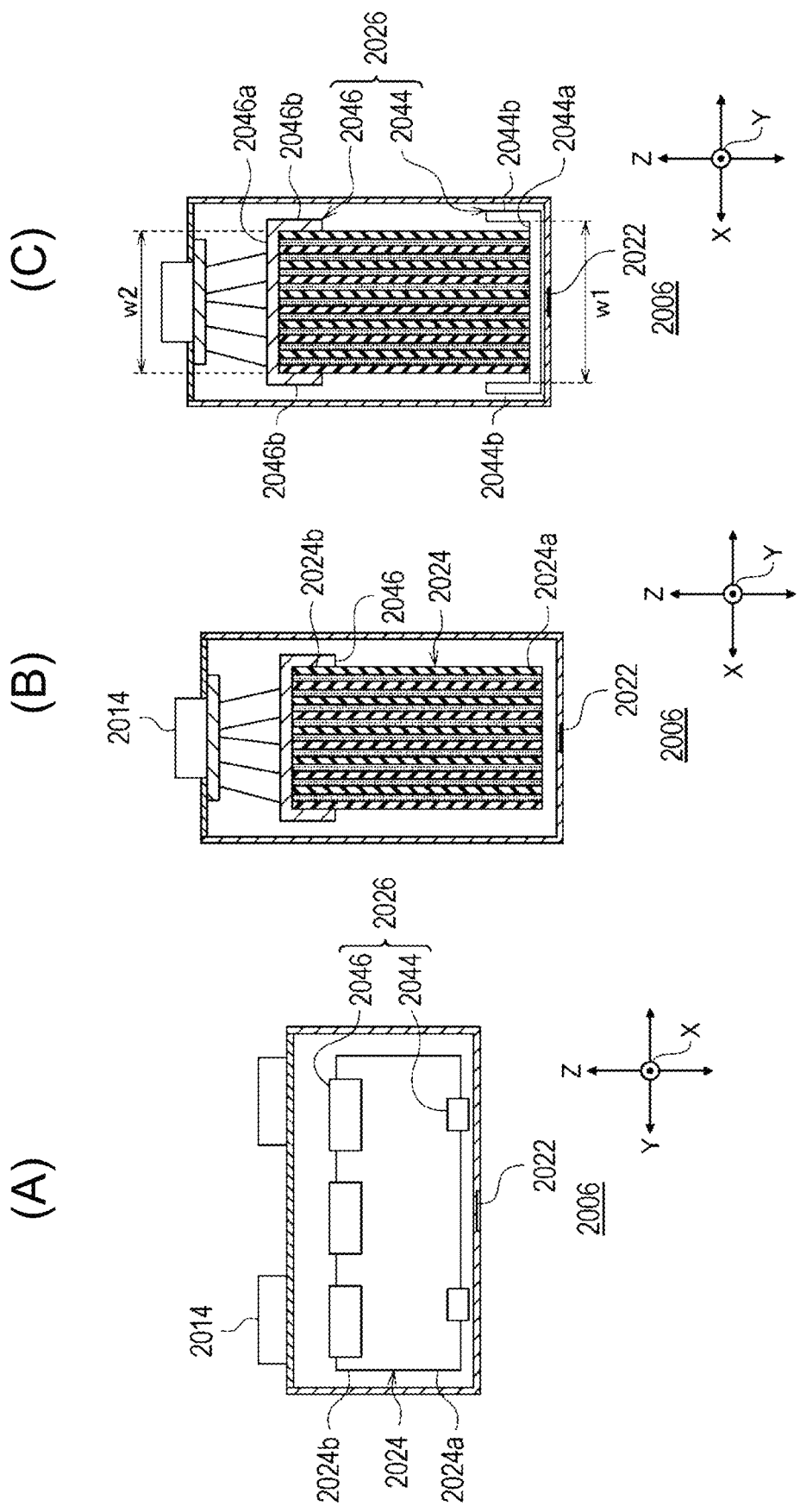
FIG. 21(A) is a cross-sectional view schematically showing an internal structure of a battery according to Modified Example 1 of the second exemplary embodiment.
FIG. 21(B) is a cross-sectional view schematically showing an internal structure of a battery according to Modified Example 2 of the second exemplary embodiment.
FIG. 21(C) is a cross-sectional view schematically showing an internal structure of a battery according to Modified Example 3 of the second exemplary embodiment.

FIG. 21(A) is a cross-sectional view schematically showing an internal structure of a battery according to Modified Example 1. Note that, in FIG. 21(A), illustration of current collector 2032 is omitted. In restraint part 2026 of Modified Example 1, a total area of a portion gripped by first gripper 2044 in first edge 2024a is smaller than a total area of a portion gripped by second gripper 2046 in second edge 2024b. Note that the area of the portion gripped by each gripper is an area of a region where each gripper and electrode body 2024 overlap with each other, when viewed in a stacking direction of the plurality of positive electrode plates 2040a and the plurality of negative electrode plates 2040b.

In this modified example, individual first grippers 2044 are smaller in size than individual second grippers 2046, and further, a total number of first grippers 2044 is smaller than a total number of second grippers 2046. As a result, a total area of a region gripped by first gripper 2044 is smaller than a total area of a region gripped by second gripper 2046. By making an area of a restraint region of first edge 2024a smaller than an area of a restraint region of second edge 2024b, an area of an exposed region in first edge 2024a, that is, a region not gripped by first gripper 2044, is to be larger than an area of a region not gripped by second gripper 2046 in second edge 2024b. Such a structure allows first edge 2024a to easily expand more than second edge 2024b, when gas of an amount to expand electrode body 2024 is generated. Therefore, it is possible to facilitate an outflow of gas G from electrode body 2024 toward valve 2022. Note that, as a matter of course, only by one of making the size of first gripper 2044 smaller than the size of second gripper 2046, or making the total number of first grippers 2044 smaller than the total number of second grippers 2046, the area of the exposed region in first edge 2024a can be made larger than the area of the exposed region in second edge 2024b, and first edge 2024a can be made easy to expand more than second edge 2024b.

(Modified Example 2)

FIG. 21(B) is a cross-sectional view schematically showing an internal structure of a battery according to Modified Example 2. Restraint part 2026 of Modified Example 2 grips only second edge 2024b of electrode body 2024. That is, restraint part 2026 includes only second gripper 2046. First edge 2024a of electrode body 2024 is not restrained by restraint part 2026. This aspect also makes it easy for first edge 2024a to expand more than second edge 2024b. Therefore, it is possible to facilitate an outflow of gas G from electrode body 2024 toward valve 2022.

Modified Example 3

FIG. 21(C) is a cross-sectional view schematically showing an internal structure of a battery according to Modified Example 3. In restraint part 2026 of Modified Example 3, distance W1 between a pair of arms 2044b of first gripper 2044 is wider than distance W2 between a pair of arms 2046b of second gripper 2046. In other words, flat plate 2044a is larger than flat plate 2046a in terms of a size in the stacking direction of electrode plates 2040. Alternatively, first gripper 2044 is larger than second gripper 2046. Therefore, in each electrode plate 2040, first edge 2024a has a higher degree of freedom of displacement in the stacking direction of electrode plates 2040, than second edge 2024b. This aspect also makes it easy for first edge 2024a to expand more than second edge 2024b. Therefore, it is possible to facilitate an outflow of gas G from electrode body 2024 toward valve 2022.

Note that, in FIG. 21(C), flat plate 2046a is illustrated in such a size that arm 2046b is in contact with electrode body 2024, and flat plate 2044a is illustrated in such a size that arm 2044b is separated from electrode body 2024. However, the configuration is not limited to this, and a size of flat plate 2044a may be such a size that arm 2044b and electrode body 2024 are in contact with each other, while flat plate 2046a may be smaller than flat plate 2044a. In a configuration in which both arm 2044b and arm 2046b are in contact with electrode body 2024, when rigidity of first gripper 2044 and rigidity of second gripper 2046 are equal, a restraint force applied to electrode body 2024 becomes larger as a dimension of the flat plate is smaller. That is, a compression rate of electrode body 2024 by the gripper increases. Therefore, the gas preferentially flows toward first edge 2024a gripped by first gripper 2044, which has a weaker restraint force than that of second gripper 2046.

Modified Example 4

FIGS. 22(A) and 22(B) are cross-sectional views schematically showing an internal structure of a battery according to Modified Example 4. Restraint part 2026 of Modified Example 4 has third gripper 48 that restrains tab 2036, instead of second gripper 2046 that restrains second edge 2024b. Third gripper 48 has a smaller deformation amount than that of first gripper 2044 when receiving a force in the stacking direction of electrode plates 2040. Third gripper 48 is, for example, a binding band, an adhesive tape, or the like. This aspect also makes it easy for first edge 2024a to expand more than second edge 2024b. Therefore, it is possible to facilitate an outflow of gas G from electrode body 2024 toward valve 2022.

Third Exemplary Embodiment

Figure 23:
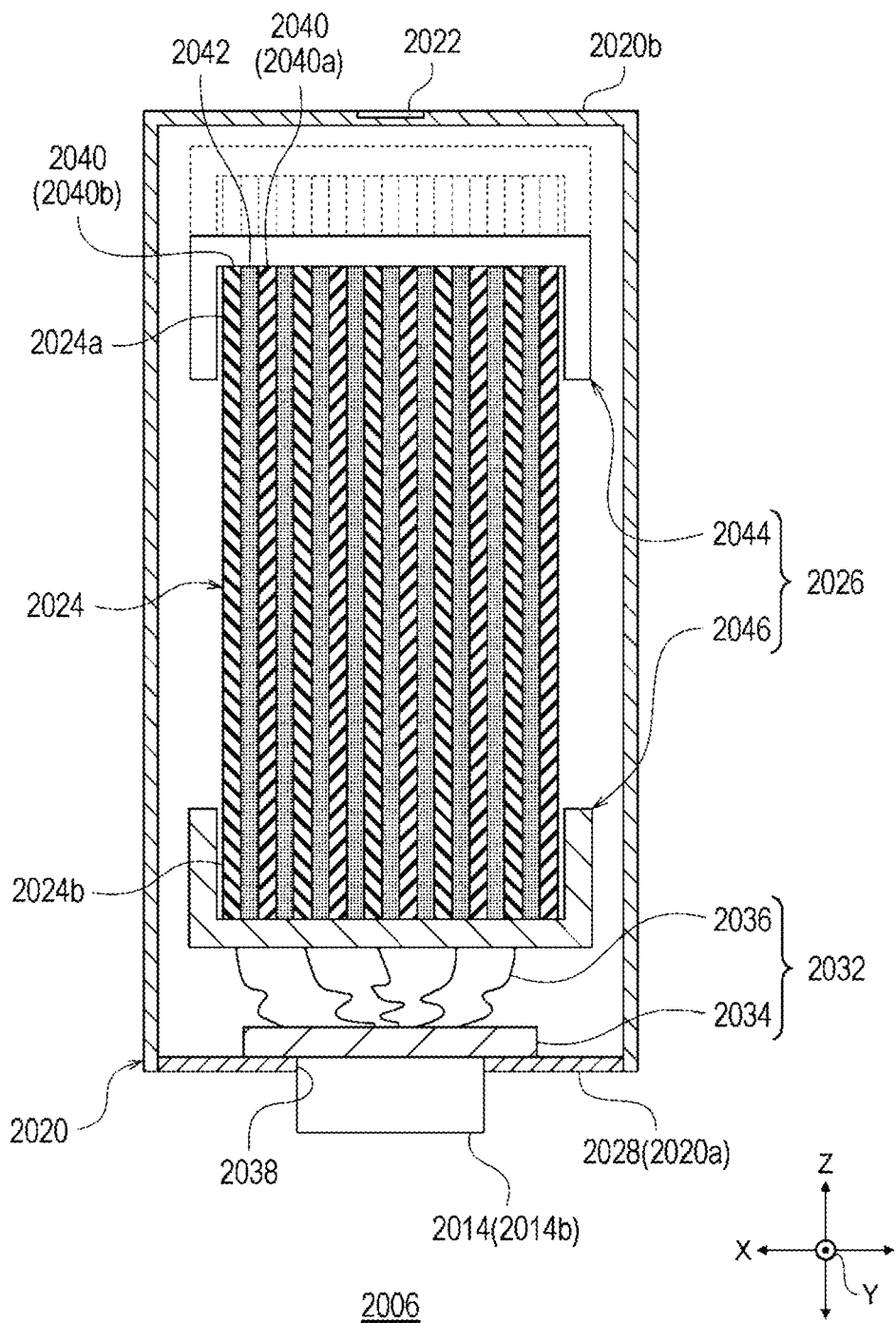
FIG. 23 is a cross-sectional view schematically showing an internal structure of a battery according to a third exemplary embodiment.

The third exemplary embodiment has the same configuration as that of the second exemplary embodiment except that a structure of battery 2006 is different. Hereinafter, the present exemplary embodiment will be mainly described with configurations different from those of other exemplary embodiments, and the common configurations will be briefly described or omitted. FIG. 23 is a cross-sectional view schematically showing an internal structure of a battery according to the second exemplary embodiment.

Battery 2006 has housing 2020. Housing 2020 accommodates electrode body 2024, an electrolytic solution, and the like. On first face 2020a in housing 2020, a pair of output terminals 2014 are arranged. On a face different from first face 2020a in housing 2020, valve 2022 is arranged. In the present exemplary embodiment, valve 2022 is arranged on second face 2020b opposed to first face 2020a.

Each of the pair of output terminals 2014 is electrically connected to electrode body 2024 via current collector 2032 arranged in housing 2020. Current collector 2032 has current collector plate 2034 and tab 2036. Electrode body 2024 has a structure in which a plurality of electrode plates 2040 are stacked. Specifically, electrode body 2024 has a structure in which positive electrode plates 2040a and negative electrode plates 2040b are alternately stacked. Between adjacent positive electrode plate 2040a and negative electrode plate 2040b, electrode plate separator 2042 is interposed.

The plurality of electrode plates 2040 and electrode plate separator 2042 are restrained by restraint part 2026. Restraint part 2026 of the present exemplary embodiment has: first gripper 2044 that grips first edge 2024a on the valve 2022 side in electrode body 2024; and second gripper 2046 that grips second edge 2024b on a side opposite to first edge 2024a. Note that, unlike the second exemplary embodiment, first gripper 2044 and second gripper 2046 may have the same or different deformation amounts when receiving a force in the stacking direction of electrode plates 2040.

Orientation of battery 2006 is set such that valve 2022 faces upward in a vertical direction in a state where battery 2006 is incorporated in battery module 2001. Therefore, output terminal 2014 faces downward in the vertical direction. Further, at least a part of current collector 2032 is flexible to a degree to be deformed by a weight of electrode body 2024. More specifically, in current collector 2032, tab 2036, which is a portion extending in a direction from electrode body 2024 toward first face 2020a, is flexible to a degree to be deformed by the weight of electrode body 2024. Therefore, when the orientation of battery 2006 is determined so that valve 2022 faces upward in the vertical direction, electrode body 2024 is displaced, due to its own weight, downward in the vertical direction, that is, in a direction away from valve 2022. With the displacement of electrode body 2024, tab 2036 elastically deforms such that an end on the electrode body 2024 side and an end on the current collector plate 2034 side come close to each other. As a result, electrode body 2024 can be retreated from the periphery of valve 2022. Therefore, it is possible to secure a flow path for gas in housing 2020 to reach valve 2022.

Moreover, valve 2022 may be provided on a face of housing 2020 other than first face 2020a and second face 2020b, for example, on short side face 2020c (see FIG. 20(B)). In this case, when valve 2022 is directed upward in the vertical direction, output terminal 2014 faces in a horizontal direction. When electrode body 2024 is displaced downward in the vertical direction due to its own weight, an end of tab 2036 on the electrode body 2024 side is displaced downward in the vertical direction.

As described above, battery 2006 of the present exemplary embodiment includes: housing 2020; electrode body 2024 accommodated in housing 2020 and having a plurality of positive electrode plates 2040a and a plurality of negative electrode plates 2040b being stacked; a pair of output terminals 2014 arranged on first face 2020a of housing 2020 and electrically connected to electrode body 2024; valve 2022 arranged on a face different from first face 2020a of housing 2020 and configured to release gas inside housing 2020; and current collector 2032 that connects output terminal 2014 and electrode body 2024. Then, valve 2022 faces upward in the vertical direction, and at least a part of current collector 2032 is flexible to a degree to be deformed by the weight of electrode body 2024. This makes it possible to reduce a possibility that contents of battery 2006 adhere to output terminal 2014, while suppressing hindrance by electrode body 2024 on the gas discharge from valve 2022. This can improve the reliability of battery module 2001.

Fourth Exemplary Embodiment

The fourth exemplary embodiment has the same configuration as that of the second exemplary embodiment except that a structure of battery 2006 is different. Hereinafter, the present exemplary embodiment will be mainly described with configurations different from those of the second exemplary embodiment, and the common configurations will be briefly described or omitted. FIG. 24(A) is a cross-sectional view schematically showing an internal structure of a battery according to the fourth exemplary embodiment. FIG. 24(B) is a schematic view of an electrode body and a spacer as viewed from a valve side. FIG. 24(C) is an enlarged view of a region including the valve. Note that FIG. 24(A) corresponds to a cross-sectional view taken along line A-A in FIG. 24(B). Further, in FIG. 24(A), illustration of restraint part 2026 and current collector 2032 are omitted. Further, in FIG. 24(B), illustration of base 2051 and restraint part 2026 are omitted.

Battery 2006 has housing 2020. Housing 2020 accommodates electrode body 2024, an electrolytic solution, and the like. On first face 2020a in housing 2020, a pair of output terminals 2014 are arranged. On a face different from first face 2020a in housing 2020, valve 2022 is arranged. In the present exemplary embodiment, valve 2022 is arranged on second face 2020b opposed to first face 2020a.

Each of the pair of output terminals 2014 is electrically connected to electrode body 2024 via current collector 2032 arranged in housing 2020. Electrode body 2024 has a structure in which a plurality of electrode plates 2040 are stacked. Specifically, electrode body 2024 has a structure in which positive electrode plates 2040a and negative electrode plates 2040b are alternately stacked. Between adjacent positive electrode plate 2040a and negative electrode plate 2040b, electrode plate separator 2042 is interposed. The plurality of electrode plates 2040 and electrode plate separator 2042 are restrained by restraint part 2026.

In addition, battery 2006 has spacer 2050 that is arranged between electrode body 2024 and a face on which valve 2022 of housing 2020 is provided, and separates electrode body 2024 from valve 2022. Spacer 2050 suppresses displacement of electrode body 2024 toward valve 2022. Therefore, it is possible to prevent valve 2022 from being closed by electrode body 2024. This makes it possible to secure a flow path for gas in housing 2020 to reach valve 2022.

Spacer 2050, spacer 2050 of the present exemplary embodiment has base 2051 opposed to a face on which valve 2022 of housing 2020 is arranged, and a plurality of walls 2052. Each wall 2052 projects toward electrode body 2024 from a face of base 2051 facing toward electrode body 2024. A tip end of each wall 2052 abuts on electrode body 2024. Each wall 2052 is made of, for example, resin having an insulating property and corrosion resistance to an electrolytic solution.

Each wall 2052 extends in a direction intersecting an extending direction of electrode plate 2040. In the present exemplary embodiment, each electrode plate 2040 extends along axis Y. Therefore, each wall 2052 extends in a direction intersecting axis Y in which each electrode plate 2040 extends. Further, adjacent walls extend in parallel with each other, and groove 2054 is formed between the adjacent walls.

More specifically, each wall 2052 has a substantially V-shape. An extending range of each wall 2052 in a stacking direction of electrode plates 2040 is a range that overlaps with a part of electrode body 2024. The plurality of walls 2052 are arranged on both sides of valve 2022 in axis Y at a predetermined interval, in the stacking direction of electrode plates 2040. This causes the plurality of substantially V-shaped grooves 2054 to be arranged on both sides of valve 2022 in axis Y, in the stacking direction of electrode plates 2040. Each groove 2054 constitutes a flow path that guides gas G flowing out of electrode body 2024 to valve 2022.

By wall 2052 extending in the direction intersecting the extending direction of electrode plate 2040, it is possible to suppress entering of electrode plate 2040 into groove 2054. Therefore, it is possible to secure a flow path for gas in housing 2020 to reach valve 2022.

Note that individual walls 2052 may have a bellows shape, may be arranged at a predetermined interval in the stacking direction of electrode plates 2040, and may extend over the entire region of electrode body 2024 along axis Y. In this case, on wall 2052 forming groove 2054 that does not overlap with valve 2022 when viewed in an overlapping direction of electrode body 2024 and valve 2022, a through hole or a notch that penetrates wall 2052 in a thickness is preferably provided. This allows groove 2054 that does not overlap valve 2022 to communicate with valve 2022.

Further, base 2051 has recess 2051a at a position overlapping with valve 2022 in an alignment direction of base 2051 and second face 2020b, which is a valve arrangement face. Recess 2051a opens toward electrode body 2024. This configuration causes thin-walled part 2051b overlapping with valve 2022 to be formed at a bottom of recess 2051a. That is, base 2051 has thin-walled part 2051b that constitutes a bottom face of recess 2051a.

As an example, thin-walled part 2051b has flexibility. Therefore, thin-walled part 2051b is pulled by gas released from valve 2022 when valve 2022 is opened, and tries to jump out from valve 2022 to the outside of housing 2020. At this time, if a tensile stress of a predetermined value or more is applied to thin-walled part 2051b, thin-walled part 2051b is torn. As a result, the gas can be released from the inside of electrode body 2024 to the outside of housing 2020 through recess 2051a. That is, thin-walled part 2051b is flexible to a degree to be broken when the gas is released from valve 2022, with pressure of gas in housing 2020 or pressure of the gas discharged from valve 2022. Alternatively, thin-walled part 2051b may have fragile part 2051c that breaks when the gas is released from valve 2022. By providing fragile part 2051c in thin-walled part 2051b, it is possible to promote breakage of thin-walled part 2051b even when flexibility of thin-walled part 2051b is low.

Recess 2051a can form a part of a gas flow path from electrode body 2024 to valve 2022. Therefore, by providing recess 2051a provided in base 2051, reliability of the gas release from valve 2022 can be improved. Further, since base 2051 has thin-walled part 2051b, electrode body 2024 and housing 2020 can be more reliably insulated when battery 2006 is in a normal state.

Note that base 2051 may have through hole 2051d at a position overlapping with valve 2022 in an alignment direction of the valve arrangement face and base 2051. By providing through hole 2051d, valve 2022 and electrode body 2024 are made to face each other. Through hole 2051d can function as a gas flow path when valve 2022 is opened. This allows the gas to be released more smoothly from valve 2022.

Further, valve 2022 may be provided on a face of housing 2020 other than first face 2020a and second face 2020b, for example, on short side face 2020c (see FIG. 24(B)). In this case, spacer 2050 is provided on a surface of short side face 2020c facing inward of housing 2020. Further, in FIGS. 24(A) to 24(C), on a face of electrode body 2024 opposed to spacer 2050, an area of a region not in contact with wall 2052 is larger than an area of a region in contact with wall 2052, but the configuration is not limited to this. As long as a sufficient gas flow path can be secured, on a face of electrode body 2024 opposed to spacer 2050, the area of the region in contact with wall 2052 may be made larger than the area of the region that is not in contact with wall 2052, by widening a width of each wall 2052, and the like.

As described above, battery 2006 of the present exemplary embodiment includes: electrode body 2024 accommodated in housing 2020; and spacer 2050 that is arranged between electrode body 2024 and a face on which valve 2022 of housing 2020 is provided, and separates electrode body 2024 from valve 2022. Further, electrode body 2024 has a structure in which a plurality of electrode plates 2040 are stacked. Spacer 2050 has: base 2051 opposed to the valve arrangement face; and wall 2052 that projects from a face facing toward electrode body 2024 in base 2051 and extends in a direction intersecting the extending direction of electrode plate 2040. This makes it possible to reduce a possibility that contents of battery 2006 adhere to output terminal 2014, while suppressing hindrance by electrode body 2024 on the gas discharge from valve 2022. This can improve the reliability of battery module 2001. Note that, regarding a shape of spacer 2050, the following modified examples can be given.

Modified Example 5

Figure 25:
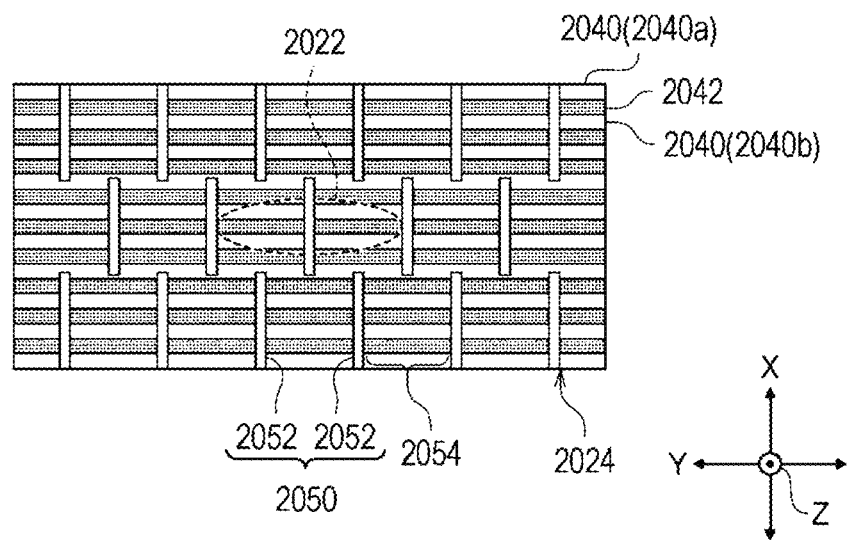
FIG. 25 is a schematic view of an electrode body and a spacer in a battery according to Modified Example 5 of the fourth exemplary embodiment, as viewed from a valve side.

FIG. 25 is a schematic view of an electrode body and a spacer in a battery as viewed from a valve side, according to Modified Example 5. Spacer 2050 of Modified Example 5 has a plurality of walls 2052 extending parallel to the stacking direction of electrode plates 2040. Each wall 2052 is linear, and an extending range in the stacking direction of electrode plates 2040 is a range that overlaps with a part of electrode body 2024. The plurality of walls 2052 are arranged at a predetermined interval in a direction intersecting the stacking direction of electrode plates 2040, and arranged so as to be displaced in zigzag in the stacking direction. By such a shape and an arrangement of wall 2052, effects similar to those of the fourth exemplary embodiment can be obtained.

A number of batteries 2006 included in assembly 2002 and a number of electrode plates 2040 included in electrode body 2024 are not particularly limited. A structure of each part of assembly 2002, including a shape of separator 2008 and a fastening structure of end plate 2010 and bind bar 2012, is also not particularly limited. Further, in the fourth exemplary embodiment and Modified Example 5, it suffices that electrode body 2024 has a structure in which a plurality of electrode plates 2040 are at least partially stacked. For example, electrode body 2024 may have a structure in which a pair of positive electrode plate 2040a and negative electrode plate 2040b are spirally wound. In this case, it suffices that wall 2052 extends in a direction intersecting the extending direction of electrode plate 2040, in a portion where the plurality of electrode plates 2040 are stacked. Similarly, in the third exemplary embodiment as well, electrode body 2024 may have a structure in which a pair of positive electrode plate 2040a and negative electrode plate 2040b are spirally wound.

Further, in the exemplary embodiments, in describing actions and effects of restraint part 2026, the actions and effects under a condition that electrode body 2024 is expanded by gas is described. However, electrode body 2024 being expanded by gas is not essential. That is, the present disclosure is not premised on the expansion of electrode body 2024 by gas, and is effective even for electrode body 2024 that is not expanded by gas.

Next, fifth, sixth, seventh, eighth, and ninth exemplary embodiments will be described.

First, conventional technology and problems will be described.

As described above, a conventional battery module has room for improvement in achieving both power generation performance and reliability.

These fifth, sixth, seventh, eighth, and ninth exemplary embodiments have been made in view of such a situation, and an object is to provide technology for achieving both power generation performance and reliability of a battery module.

These fifth, sixth, seventh, eighth, and ninth exemplary embodiments are battery modules. The battery module includes an assembly of a plurality of batteries, a bus bar, and a cooling plate. The battery has a housing, a pair of output terminals arranged on a first face of the housing, and a valve arranged on the first face and configured to release gas inside the housing. The bus bar electrically connects the output terminals of the plurality of batteries. The cooling plate is thermally connected to the bus bar, is arranged to have a first main surface opposed to the first face, and has a gas flow part including a bottomed hole or an bottomless hole that opens in an arrangement direction of the assembly and the cooling plate and overlapping at least partially with the valve when viewed in the arrangement direction.

According to these fifth, sixth, seventh, eighth, and ninth exemplary embodiments, it is possible to achieve both the power generation performance and the reliability of the battery modules.

Fifth Exemplary Embodiment

Figure 26:
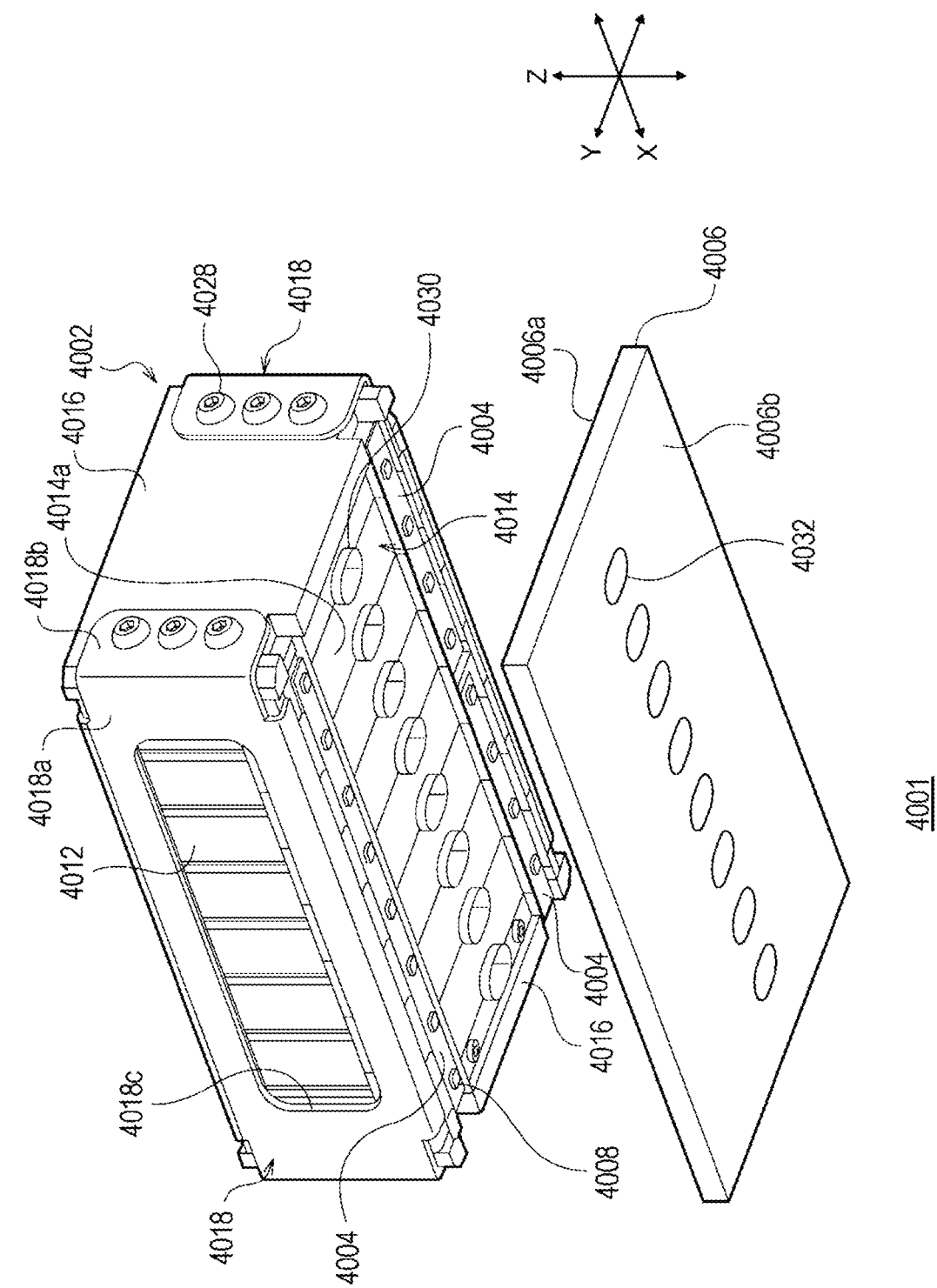
FIG. 26 is a perspective view of a battery module according to a fifth exemplary embodiment.
Figure 27:
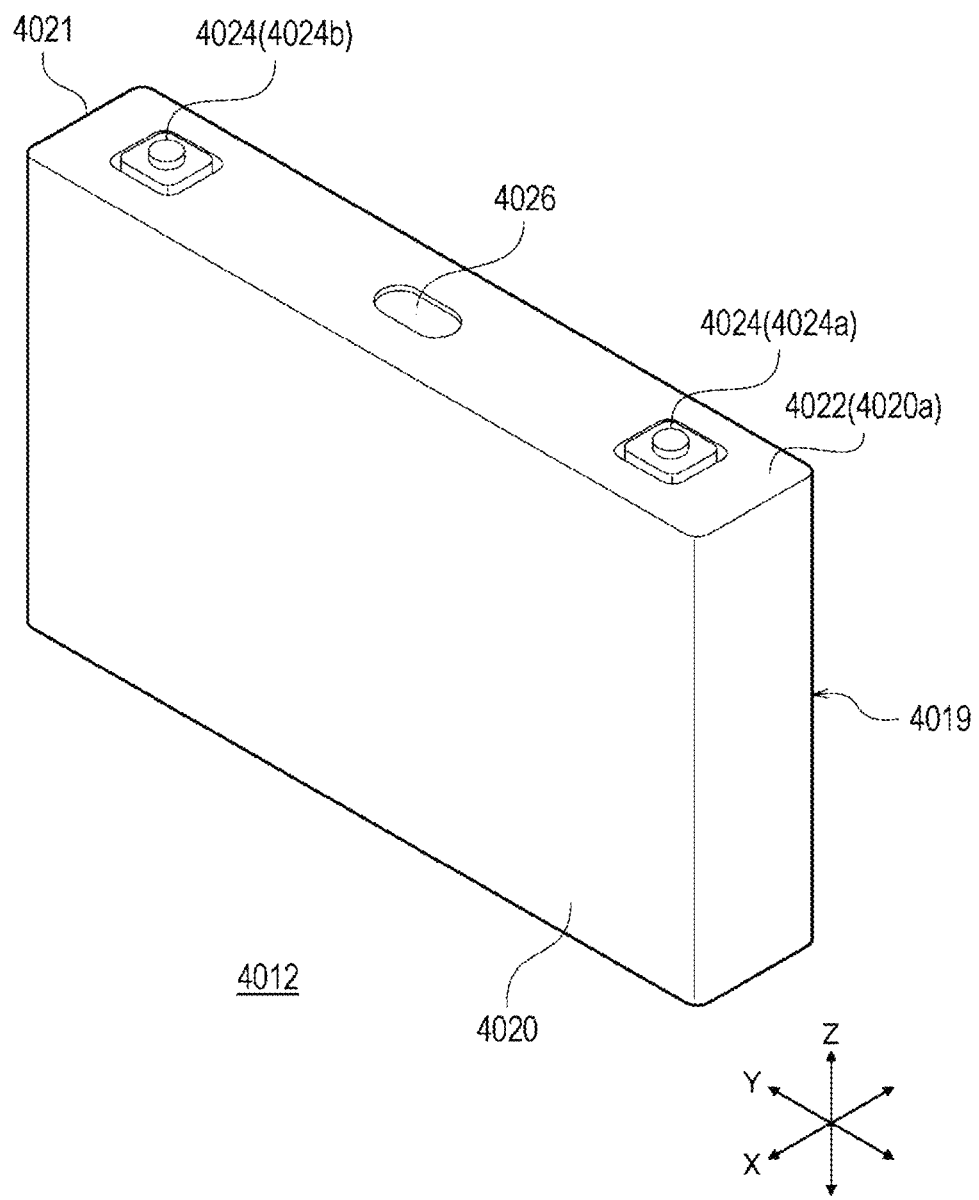
FIG. 27 is a perspective view of a battery.

FIG. 26 is a perspective view of a battery module according to the fifth exemplary embodiment. FIG. 27 is a perspective view of a battery. FIG. 26 illustrates a state where a cooling plate is disassembled. Battery module 4001 includes assembly 4002, bus bar 4004, and cooling plate 4006, cooling plate 4006. Assembly 4002 has a structure in which a plurality of batteries 4012 are assembled. Assembly 4002 of the present exemplary embodiment takes a form of a battery group in which a plurality of flat batteries 4012 are stacked, that is, a battery stack. Assembly 4002 has a plurality of batteries 4012, a plurality of separators 4014 and separator 4014, a pair of end plates 4016, end plate 4016, and a pair of bind bars 4018, bind bar 4018.

Each battery 4012 is a rechargeable secondary battery such as, for example, a lithium ion battery, a nickel-hydrogen battery, or a nickel-cadmium battery. Battery 4012 is a so-called square battery, and has housing 4019 having a flat rectangular parallelepiped shape. Housing 4019 has outer can 4020 and lid 4022. Outer can 4020 has, for example, a bottomed tubular shape and has a substantially rectangular opening (not illustrated). Through this opening, an electrode body, an electrolytic solution, and the like are accommodated in outer can 4020. The opening of outer can 4020 is provided with lid 4022 that seals the substantially rectangular opening of outer can 4020. Lid 4022 is, for example, a rectangular plate. Lid 4022 constitutes first face 4020a of housing 4019.

Lid 4022, that is, first face 4020a of housing 4019 is provided with output terminal 4024 of a positive electrode near one end in a longitudinal axis, and output terminal 4024 of a negative electrode near another end. The pair of output terminals 4024 are electrically connected respectively to a positive electrode plate and a negative electrode plate included in the electrode body. Hereinafter, as appropriate, output terminal 4024 of a positive electrode will be referred to as positive electrode terminal 4024a, and output terminal 4024 of a negative electrode will be referred to as negative electrode terminal 4024b. Further, when it is not necessary to distinguish the polarities of output terminals 4024, positive electrode terminal 4024a and negative electrode terminal 4024b are collectively referred to as output terminal 4024. Outer can 4020 and lid 4022 are conductors, and are, for example, made of metal. For example, outer can 4020 and lid 4022 are made of aluminum, iron, stainless steel, or the like. Lid 4022 and the opening of outer can 4020 are joined, for example, by a laser. Therefore, housing 4019 has joint 21 that joins the opening of outer can 4020 and a peripheral edge of lid 4022. Each of the pair of output terminals 4024 is inserted through a through hole (not illustrated) formed on lid 4022. Between the pair of output terminals 4024 and each through hole, an insulating sealing member (not illustrated) is interposed.

In the description of the present exemplary embodiment, for convenience, a face (first face 4020a) on a side provided with lid 4022 is defined as an upper face of battery 4012, and an opposite face is defined as an a bottom face of battery 4012. Battery 4012 also has four side faces connecting the upper and bottom faces. Two of the four sides are a pair of long side faces connected to long sides of the upper and bottom faces. These long side faces are faces (main surfaces) having a largest area among the six faces of battery 4012. The remaining two side faces, excluding the two long side faces, are a pair of short side faces connected to short sides of the upper and bottom faces. Further, in assembly 4002, a face on the upper face side of battery 4012 is defined as an upper face of assembly 4002, a face on the bottom face side of battery 4012 is defined as a bottom face of assembly 4002, and a face on the short side face side of battery 4012 is defined as a side face of assembly 4002. These directions and positions are defined for convenience. Therefore, for example, a portion defined as an upper face in the present disclosure does not mean being always located above a portion defined as a bottom face. For example, in assembly 4002 of the present exemplary embodiment, the upper face, that is, first face 4020a of battery 4012, is arranged so as to face downward in a vertical direction.

On first face 4020a of housing 4019, valve 4026 is provided between the pair of output terminals 4024. Valve 4026 is also called a safety valve, and is a mechanism to open to release gas inside housing 4019 when internal pressure of housing 4019 rises to a predetermined value or more. Valve 4026 of each battery 4012 is connected to a gas duct (not illustrated), and gas inside the battery is discharged from valve 4026 to the gas duct. For example, valve 4026 includes a thin-walled part provided on a part of lid 4022 and having a thickness thinner than other portions, and a linear groove formed on a surface of the thin-walled part. In this configuration, when internal pressure of housing 4019 rises, valve 4026 opens by tearing the thin-walled part starting from the groove. This causes gas in housing 4019 to be released from valve 4026. Examples of the gas in housing 4019 include carbon dioxide gas generated by decomposition of an electrolytic solution. In addition, the gas released to the outside of housing 4019 may also contain fine particles such as fragments of the battery structure.

The plurality of batteries 4012 are arranged side by side at a predetermined interval so that long side faces of adjacent batteries 4012 are opposed to each other. In the present exemplary embodiment, an alignment direction of the plurality of batteries 4012 is along axis X. Further, output terminals 4024 of individual batteries 4012 are arranged so as to face the same direction. In the present exemplary embodiment, output terminal 4024 of each battery 4012 is arranged so as to face downward in the vertical direction for convenience. Alternatively, output terminals 4024 of individual batteries 4012 may be arranged so as to face different directions. Then, output terminals 4024 of the plurality of batteries 4012 are electrically connected to each other by bus bar 4004.

Bus bar 4004 is a substantially strip-shaped member made of metal such as copper or aluminum. In the present exemplary embodiment, the plurality of batteries 4012 are grouped into a plurality of battery blocks including a plurality of batteries 4012. Then, in each battery block, output terminals 4024 having the same polarity are connected in parallel by bus bar 4004. In addition, output terminals 4024 of two adjacent battery blocks having different polarities are connected in series by bus bar 4004. Moreover, all batteries 4012 may be connected in series.

Separator 4014, separator 4014 is also called an insulating spacer, and is made of, for example, resin having an insulating property. Each separator 4014 is arranged between two adjacent batteries 4012 to electrically insulate between these two batteries 4012. Further, some separators 4014 are arranged between battery 4012 and end plate 4016 to insulate between battery 4012 and end plate 4016. Examples of resin constituting each separator 4014 include thermoplastic resin such as polypropylene (PP), polybutylene terephthalate (PBT), polycarbonate (PC), and Noryl (registered trademark) resin (modified PPE).

Further, each separator 4014 has wall 4014a extending along axis X and covering first face 4020a of battery 4012. Covering first face 4020a of battery 4012 with wall 4014a makes it possible to secure a creepage distance between adjacent batteries 4012 or between battery 4012 and end plate 4016. At each of a position corresponding to output terminal 4024 and a position corresponding to valve 4026, wall 4014a has an opening (not illustrated) so as to expose output terminal 4024 or valve 4026 to outside.

Further, battery module 4001 has gas guiding part 4030, gas guiding part 4030, having a tubular shape. Gas guiding part 4030 is arranged so as to surround a periphery of the opening that exposes valve 4026 in separator 4014. In the present exemplary embodiment, gas guiding part 4030 is integrally molded with separator 4014. A structure of gas guiding part 4030 will be described in detail later. Note that, in battery module 4001, gas guiding part 4030 may be omitted.

The plurality of batteries 4012 and the plurality of separators 4014 arranged side by side are sandwiched between the pair of end plates 4016. The pair of end plates 4016 are arranged adjacent to batteries 4012 located at both ends in axis X, via separator 4014. End plate 4016 is made of, for example, a metal plate. On a face of end plate 4016 opposed to a long side face of battery 4012, there is provided a screw hole (not illustrated) into which screw 4028, screw 4028, is screwed.

The pair of bind bars 4018 are elongated members whose longitudinal axis is axis X. The pair of bind bars 4018 are arranged so as to face each other in axis Y orthogonal to axis X and parallel to a longitudinal axis of first face 4020a. Between the pair of bind bars 4018, the plurality of batteries 4012, the plurality of separators 4014, and the pair of end plates 4016 are interposed. Each bind bar 4018 has rectangular flat part 4018a extending parallel to a side face of assembly 4002, and four eaves 4018b projecting from individual end sides of flat part 4018a toward battery 4012. Two eaves 4018b opposed to each other in axis X are provided with through holes (not illustrated) through which screw 4028 is inserted. Flat part 4018a is provided with opening 4018c that exposes a short side face of battery 4012.

In a state where the plurality of batteries 4012 and the plurality of separators 4014 are arranged alternately and sandwiched between the pair of end plates 4016 in axis X, the plurality of batteries 4012, the plurality of separators 4014, and the pair of end plates 4016 are sandwiched in axis Y by a pair of bind bars 4018. Each bind bar 4018 is positioned so that a through hole of eave 4018b overlaps with a screw hole in end plate 4016. Then, screw 4028 is inserted through the through hole and screwed into the screw hole. By engaging the pair of bind bars 4018 with the pair of end plates 4016 in this way, the plurality of batteries 4012 are restrained.

The plurality of batteries 4012 are positioned in axis X by being tightened in axis X by bind bar 4018. In addition, upper and bottom faces of the plurality of batteries 4012 abut on, via separator 4014, two eaves 4018b opposed to each other in axis Z in which the upper face and the bottom face are aligned. This allows the plurality of batteries 4012 to be positioned in axis Z. As an example, after the positioning of those is completed, bus bar 4004 is attached to output terminal 4024 of each battery 4012, and output terminals 4024 of the plurality of batteries 4012 are electrically connected to each other. For example, bus bar 4004 is fixed to output terminal 4024 by welding.

In assembly 4002, a face on a side on which output terminal 4024 projects is covered with cooling plate 4006. Cooling plate 4006 is a plate-shaped member, and has first main surface 4006a and second main surface 4006b. Second main surface 4006b is opposed to first main surface 4006a. Cooling plate 4006 is arranged so that first main surface 4006a is opposed to first face 4020a of each battery 4012. Between cooling plate 4006 and assembly 4002, bus bar 4004 is interposed. Cooling plate 4006 is made of a material having high heat conductivity, such as aluminum. Further, cooling plate 4006 has flow path 4006c (see FIG. 28(B)) through which a refrigerant such as water or ethylene glycol flows. Further, cooling plate 4006 has gas flow part 4032, gas flow part 4032. A structure of cooling plate 4006 will be described in detail later.

Cooling plate 4006 is thermally connected to each bus bar 4004 via heat conductive member 4008. Heat conductive member 4008 is interposed between each bus bar 4004 and cooling plate 4006, and abuts on each bus bar 4004 and cooling plate 4006. For example, heat conductive member 4008 is fixed to bus bar 4004 by an adhesive. Then, when assembly 4002 fixed with bus bar 4004 and heat conductive member 4008 is placed on cooling plate 4006, heat conductive member 4008 abuts on cooling plate 4006. Heat conductive member 4008 has high heat conductivity and an insulating property. This makes it possible to prevent electrical connection between bus bar 4004 and cooling plate 4006 via heat conductive member 4008.

As heat conductive member 4008, a known resin sheet or the like having good heat conductivity, such as acrylic rubber or silicone rubber, can be used. In the present exemplary embodiment, at a position overlapping with each output terminal 4024 in an arrangement direction (along axis Z) of assembly 4002 and cooling plate 4006, heat conductive member 4008 having a substantially rectangular parallelepiped shape is arranged. A surface opposed to bus bar 4004 in each heat conductive member 4008 abuts on a main surface of bus bar 4004, and a surface opposed to cooling plate 4006 in each heat conductive member 4008 abuts on first main surface 4006a of cooling plate 4006.

By connecting each bus bar 4004 and cooling plate 4006 thermally, that is, to be heat exchangeable via heat conductive member 4008, cooling plate 4006 cools each bus bar 4004, and accordingly cools each battery 4012. Cooling each bus bar 4004 with use of cooling plate 4006 can further improve the cooling efficiency of bus bar 4004 and battery 4012. Further, by providing heat conductive member 4008 at a position overlapping with output terminal 4024 in the arrangement direction of assembly 4002 and cooling plate 4006, a heat conduction path from output terminal 4024 to cooling plate 4006 can be shortened. This can improve the cooling efficiency of output terminal 4024, and accordingly of battery 4012.

Assembly 4002 and cooling plate 4006 have, at a predetermined position, an insertion part (not illustrated) through which a fastening member such as a screw is inserted. Assembly 4002 and cooling plate 4006 are fixed to each other by insertion of the fastening member through the insertion part. Note that the fastening member that fixes assembly 4002 and cooling plate 4006 may be used for fixing cooling plate 4006 to a module case. Further, the fastening part of assembly 4002 is preferably provided at a position that does not overlap with battery 4012 when viewed in the arrangement direction of assembly 4002 and cooling plate 4006. For example, the fastening part of assembly 4002 is provided on end plate 4016 or bind bar 4018.

FIG. 28(A) is a bottom view schematically showing a battery module. FIG. 28(B) is a cross-sectional view taken along line A-A in FIG. 28(A). In FIG. 28(B), illustration of an internal structure of battery 4012 and separator 4014 is omitted.

Cooling plate 4006 is a tube having a flat plate shape, and has first plate part 4034 facing assembly 4002 and second plate part 4036 on an opposite side to first plate part 4034. First plate part 4034 and second plate part 4036 are opposed to each other with a predetermined gap, and a plurality of flow paths 4006c are arranged in the gap. First plate part 4034 constitutes first main surface 4006a, and second plate part 4036 constitutes second main surface 4006b. Flow paths 4006c each are arranged so as to extend in axis X at a predetermined interval from each other in axis Y. To one end of each flow path 4006c in axis X, a refrigerant supply path (not illustrated) is connected, and a refrigerant discharge path (not illustrated) is connected to another end. Such cooling plate 4006 can be formed by combining known methods such as, for example, forming gas flow part 4032 with press and the like on a plate having a plurality of flow paths 4006c obtained by extrusion molding and the like.

Moreover, cooling plate 4006 may be formed by joining first plate part 4034 and second plate part 4036 that are separate bodies from each other. For example, cooling plate 4006 can be obtained by joining, by brazing or the like, a plate material formed with a groove having a shape of flow path 4006c and a plate material without a groove.

As described above, cooling plate 4006 has gas flow part 4032. Gas flow part 4032 is a mechanism to guide gas released from valve 4026 of each battery 4012, from a space on the first main surface 4006a side of cooling plate 4006 to a space on the second main surface 4006b side on an opposite side. Gas flow part 4032 of the present exemplary embodiment includes a bottomless hole that opens in an arrangement direction (along axis Z) of assembly 4002 and cooling plate 4006. That is, gas flow part 4032 includes a through hole extending from first main surface 4006a to second main surface 4006b. A diameter of the through hole is constant from the first main surface 4006a to the second main surface 4006b. The bottomless hole constituting gas flow part 4032 can be formed by performing known processing such as punching processing on a plate material constituting cooling plate 4006. Gas released from valve 4026 of each battery 4012 is sent out to the space on the second main surface 4006b side of cooling plate 4006 via gas flow part 4032. Further, in cooling plate 4006, a plurality of flow paths 4006c may be divided by gas flow part 4032 in a cross section in the Z-axis. In this configuration, a distance between two adjacent flow paths 4006c with gas flow part 4032 sandwiched in between may be larger than a distance between two adjacent flow paths 4006c without gas flow part 4032 sandwiched in between.

When cooling plate 4006 is arranged so as to cover first face 4020a of each battery 4012, diffusion of the gas released from valve 4026 may be hindered by cooling plate 4006. On the other hand, providing gas flow part 4032 on cooling plate 4006 allows the gas released from valve 4026 to be quickly removed from the space between cooling plate 4006 and battery 4012. This makes it possible to suppress contents of battery 4012 from adhering to output terminal 4024.

Further, cooling plate 4006 of the present exemplary embodiment has a plurality of gas flow parts 4032. Each gas flow part 4032 is associated with valve 4026 of each battery 4012. Specifically, each gas flow part 4032 is arranged so as to overlap at least partially with each valve 4026, when viewed in the arrangement direction of assembly 4002 and cooling plate 4006. Preferably, gas flow part 4032 is arranged so as to overlap with a center of valve 4026. The center of valve 4026 is, for example, a geometric center or a geometric center of gravity of a contour shape of valve 4026, as viewed in the arrangement direction of assembly 4002 and cooling plate 4006.

Further, in the present exemplary embodiment, when viewed in the arrangement direction of assembly 4002 and cooling plate 4006, the entire peripheral edge of each valve 4026 is located within a region surrounded by a peripheral edge of an end of each gas flow part 4032 on the first main surface 4006*a* side. That is, an extending region of the end of each gas flow part 4032 on the first main surface 4006*a* side includes entire valve 4026. Gas flow part 4032 of the present exemplary embodiment is the bottomless hole that opens in first main surface 4006*a* and second main surface 4006*b*. Therefore, an end on the first main surface 4006*a* side is end 4032*a* included in the same plane as first main surface 4006*a*. Therefore, each valve 4026 is entirely arranged in the opening of each gas flow part 4032 on the first main surface 4006*a* side. Such an arrangement allows the gas released from valve 4026 to more reliably flow into gas flow part 4032.

Further, between first face 4020*a* of battery 4012 and first main surface 4006*a* of cooling plate 4006, output terminal 4024, bus bar 4004, and heat conductive member 4008 are interposed. Therefore, valve 4026 and gas flow part 4032 are separated from each other in the arrangement direction of assembly 4002 and cooling plate 4006. In gap 4038 between valve 4026 and gas flow part 4032, tubular gas guiding part 4030 is arranged. Gas guiding part 4030 is arranged so that an opening of a tube faces the arrangement direction of assembly 4002 and cooling plate 4006. Then, one end of gas guiding part 4030 surrounds a periphery of valve 4026, and another end surrounds a periphery of gas flow part 4032. The gas released from valve 4026 passes through inside of gas guiding part 4030 to reach gas flow part 4032. This suppresses diffusion of the gas into gap 4038.

In the present exemplary embodiment, gas guiding part 4030 is integrally molded with separator 4014. Therefore, examples of a material constituting gas guiding part 4030 include thermoplastic resin such as polypropylene (PP), polybutylene terephthalate (PBT), polycarbonate (PC), and Noryl (registered trademark) resin (modified PPE). Alternatively, gas guiding part 4030 may be a separate body from separator 4014, and may be integrally molded with, for example, cooling plate 4006. Further, gas guiding part 4030 may be a separate member independent of separator 4014 and cooling plate 4006.

As described above, battery module 4001 of the present exemplary embodiment includes assembly 4002 of a plurality of batteries 4012, bus bar 4004, and cooling plate 4006. Battery 4012 has housing 4019, and a pair of output terminals 4024 and valve 4026 that are arranged on first face 4020*a* of housing 4019. Bus bar 4004 electrically connects output terminals 4024 of the plurality of batteries 4012. Cooling plate 4006 is thermally connected to bus bar 4004, and is arranged so that first main surface 4006*a* is opposed to first face 4020*a* of battery 4012. Further, cooling plate 4006 has gas flow part 4032 including a bottomless hole that opens in the arrangement direction of assembly 4002 and cooling plate 4006. Gas flow part 4032 overlaps at least partially with valve 4026 when viewed in the arrangement direction of assembly 4002 and cooling plate 4006.

Thermally connecting cooling plate 4006 to bus bar 4004 allows bus bar 4004 to be efficiently cooled. This makes it possible to increase capacities of battery 4012 and battery module 4001, without increasing a heat capacity of the bus bar by increasing a size and complicating a structure of the bus bar. In addition, it is possible to suppress temperature rise of battery 4012 due to transmission of heat generated in bus bar 4004 to battery 4012. Further, cooling plate 4006 can also cool output terminal 4024 and the electrode body via bus bar 4004. Therefore, battery 4012 can be cooled efficiently, and deterioration in power generation performance of battery module 4001 can be suppressed. In addition, a heat dissipation structure of battery module 4001 other than cooling plate 4006 can be omitted or reduced, which enables downsizing and cost reduction of battery module 4001.

Further, cooling plate 4006 of the present exemplary embodiment has gas flow part 4032 including a through hole that opens in the arrangement direction of assembly 4002 and cooling plate 4006. Gas released from valve 4026 is discharged to a space on the second main surface 4006*b* side of cooling plate 4006 via gas flow part 4032. This makes it possible to suppress the gas released from valve 4026 from staying in the space between battery 4012 and cooling plate 4006. As a result, it is possible to suppress contents of battery 4012 from adhering to output terminal 4024. This can suppress corrosion of output terminal 4024 and short circuit between batteries 4012, and can improve reliability of battery module 4001. As described above, according to the present exemplary embodiment, it is possible to achieve both the power generation performance and the reliability of battery module 4001.

Moreover, in the present exemplary embodiment, when viewed in the arrangement direction of assembly 4002 and cooling plate 4006, the entire peripheral edge of valve 4026 is located within a region surrounded by a peripheral edge of end 4032*a* of gas flow part 4032 on the first main surface 4006*a* side. This allows the gas released from valve 4026 to more reliably flow into gas flow part 4032. Further, battery module 4001 has gas guiding part 4030 having a tubular shape and arranged in gap 4038 between valve 4026 and gas flow part 4032. This allows the gas released from valve 4026 to more reliably flow into gas flow part 4032.

In the present exemplary embodiment, gas flow part 4032 includes the bottomless hole. However, gas flow part 4032 is not particularly limited to this structure. Gas flow part 4032 may have structures of the following Modified Examples 1 and 2. In the following Modified Examples 1 and 2, configurations different from those of the fifth exemplary embodiment will be mainly described, and the common configurations will be briefly described or omitted.

Modified Example 1

FIG. 29(A) is a cross-sectional view schematically showing a battery module according to Modified Example 1. In FIG. 29(A), illustration of an internal structure of battery 4012 and separator 4014 is omitted. Gas flow part 4032 of Modified Example 1 includes a bottomed hole that opens in the arrangement direction of assembly 4002 and cooling plate 4006. In this modified example, bottom face 4032*c* of the bottomed hole is arranged on the first main surface 4006*a* side. That is, gas flow part 4032 includes a recess that opens on the second main surface 4006*b* side. The bottomed hole constituting gas flow part 4032 can be formed by performing known processing such as press processing on a plate material constituting cooling plate 4006.

Cooling plate 4006 has thin-walled part 4040 that constitutes bottom face 4032*c* of the bottomed hole. Thin-walled part 4040 is arranged so as to be substantially flush with first main surface 4006*a*. Thin-walled part 4040 is a portion having a thickness thinner than a thickness from first main surface 4006*a* to second main surface 4006*b* of cooling plate 4006. Further, thin-walled part 4040 is preferably thinner than a thickness of first plate part 4034, in other words, than a thickness between first main surface 4006*a* and an inner side face of flow path 4006*c* opposed to first main surface 4006*a*.

When gas is released from valve 4026 of each battery 4012, thin-walled part 4040 is torn by pressure of this gas. This causes, in battery module 4001, a space on the first main surface 4006a side to communicate with a space on the second main surface 4006b side of cooling plate 4006 via gas flow part 4032. As a result, the gas released from valve 4026 is sent to the space on the second main surface 4006b side of cooling plate 4006 via gas flow part 4032. Therefore, it is possible to suppress contents of battery 4012 from adhering to output terminal 4024, and the reliability of battery module 4001 can be improved.

When gas flow part 4032 is provided in cooling plate 4006, heat transfer in directions along a plane of cooling plate 4006 tends to be hindered by gas flow part 4032. On the other hand, in a state where valve 4026 of battery 4012 is inactive, thin-walled part 4040 can function as a heat conduction path extending in the directions along the plane of cooling plate 4006. Therefore, by forming gas flow part 4032 with the bottomed hole, that is, by providing thin-walled part 4040 in cooling plate 4006, it is possible to suppress deterioration in heat diffusion efficiency in cooling plate 4006. Therefore, it is possible to suppress deterioration in the cooling efficiency of bus bar 4004 and battery 4012.

Further, thin-walled part 4040 of the present exemplary embodiment is integrally molded with a periphery of the bottomed hole. That is, thin-walled part 4040 is a portion of first plate part 4034. This can enhance heat conductivity between thin-walled part 4040 and a periphery of thin-walled part 4040, as compared with a case where thin-walled part 4040 is a separate body from the periphery. In addition, it is possible to suppress an increase in the number of parts of battery module 4001 and complication of structure.

Alternatively, thin-walled part 4040 may be a separate body from the periphery. In this case, gas flow part 4032 can be formed by performing punching processing on cooling plate 4006 to form a through hole, and closing an opening provided on first main surface 4006a with a heat conductive sheet or the like that constitutes thin-walled part 4040. In this case, gas flow part 4032 can be easily formed as compared with gas flow part 4032 in which thin-walled part 4040 is integrated with the periphery. Further, also in this modified example, when viewed in the arrangement direction of assembly 4002 and cooling plate 4006, the entire peripheral edge of each valve 4026 is located within a region surrounded by an end of each gas flow part 4032 on a portion of the cooling plate 4006 closer to the first main surface 4006a, that is, a peripheral edge of bottom face 4032c.

Modified Example 2

FIG. 29(B) is a cross-sectional view schematically showing a battery module according to Modified Example 2. In FIG. 29(B), illustration of an internal structure of battery 4012 and separator 4014 is omitted. Gas flow part 4032 of Modified Example 2 includes a bottomed hole that opens in the arrangement direction of assembly 4002 and cooling plate 4006. In this modified example, bottom face 4032c of the bottomed hole is arranged on the second main surface 4006b side. That is, gas flow part 4032 includes a recess that opens on the first main surface 4006a side.

Cooling plate 4006 has thin-walled part 4040 that constitutes bottom face 4032c of the bottomed hole. Thin-walled part 4040 is arranged so as to be substantially flush with second main surface 4006b. Thin-walled part 4040 is thinner than a thickness from first main surface 4006a to second main surface 4006b of cooling plate 4006. Further, thin-walled part 4040 is preferably thinner than a thickness of second plate part 4036, in other words, than a thickness between second main surface 4006b and an inner side face of flow path 4006c opposed to second main surface 4006b.

When gas is released from valve 4026 of each battery 4012, thin-walled part 4040 is torn by pressure of this gas, and a space on the first main surface 4006a side communicates with a space on the second main surface 4006b side of cooling plate 4006 via gas flow part 4032. Further, providing thin-walled part 4040 makes it possible to suppress deterioration in heat diffusion efficiency in cooling plate 4006. Furthermore, in this modified example, gas flow part 4032 opens on the first main surface 4006a side. Therefore, as compared to gas flow part 4032 that opens on the second main surface 4006b side, the gas released from valve 4026 can be easily introduced into gas flow part 4032.

Further, thin-walled part 4040 is integrally molded with a periphery of the bottomed hole. That is, thin-walled part 4040 is a portion of second plate part 4036. This can enhance heat conductivity between thin-walled part 4040 and a periphery of thin-walled part 4040, as compared with a case where thin-walled part 4040 is a separate body from the periphery. In addition, it is possible to suppress an increase in the number of parts of battery module 4001 and complication of structure. Further, also in this modified example, when viewed in the arrangement direction of assembly 4002 and cooling plate 4006, the entire peripheral edge of each valve 4026 is located within a region surrounded by an end of each gas flow part 4032 on the first main surface 4006a side, that is, a peripheral edge of the opening on the first main surface 4006a side.

Moreover, in Modified Example 1, thin-walled part 4040 is arranged so as to be flush with first main surface 4006a. Further, in Modified Example 2, thin-walled part 4040 is arranged so as to be flush with second main surface 4006b. However, the arrangement of thin-walled part 4040 is not limited to these, and thin-walled part 4040 can be provided at any position between first main surface 4006a and second main surface 4006b.

Sixth Exemplary Embodiment

Figure 30:
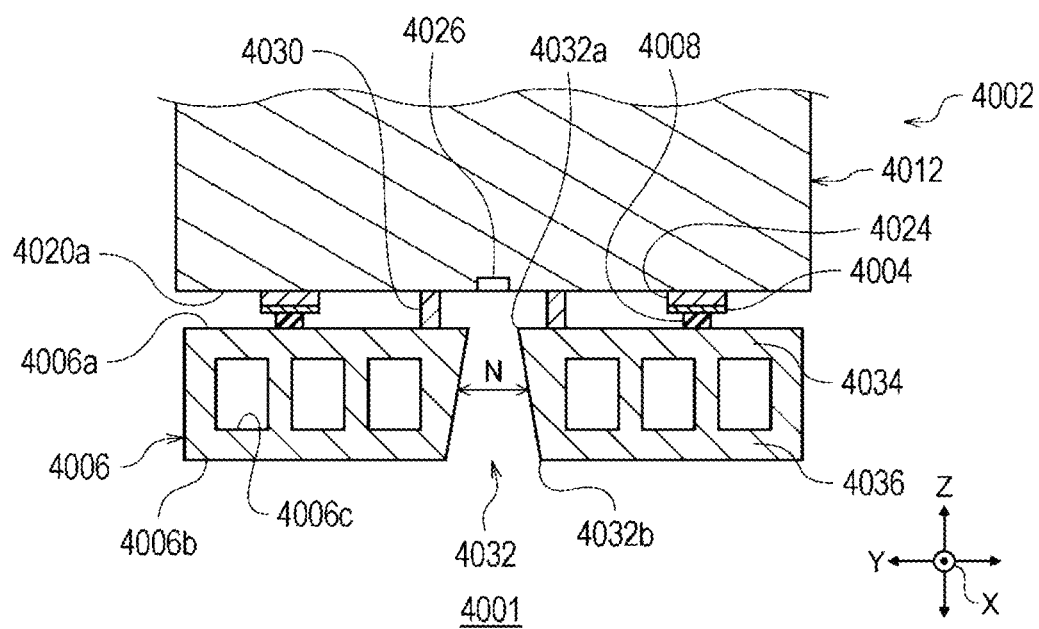
FIG. 30 is a cross-sectional view schematically showing a battery module according to a sixth exemplary embodiment.

The sixth exemplary embodiment has the same configuration as the fifth exemplary embodiment except that a gas flow part has a tapered shape. Hereinafter, the present exemplary embodiment will be mainly described with configurations different from those of the fifth exemplary embodiment, and the common configurations will be briefly described or omitted. FIG. 30 is a cross-sectional view schematically showing a battery module according to the sixth exemplary embodiment. In FIG. 30, illustration of an internal structure of battery 4012 and separator 4014 is omitted.

Battery module 4001 includes assembly 4002, bus bar 4004, and cooling plate 4006. Assembly 4002 has a plurality of batteries 4012. On first face 4020a of each battery 4012, a pair of output terminals 4024 and valve 4026 are arranged. Bus bar 4004 electrically connects output terminals 4024 of the plurality of batteries 4012. Cooling plate 4006 is thermally connected to bus bar 4004 via heat conductive member 4008, and is arranged such that first main surface 4006a is opposed to first face 4020a.

Cooling plate 4006 includes a bottomless hole that opens in an arrangement direction (along axis Z) of assembly 4002 and cooling plate 4006, and has gas flow part 4032 overlapping at least partially with valve 4026 when viewed in the arrangement direction. Gas flow part 4032 has a shape in which gas flow path area N orthogonal to the arrangement direction of assembly 4002 and cooling plate 4006 gradually changes from one end to another end in the arrangement direction. Such gas flow part 4032 can be formed by performing known processing such as punching processing on a plate material constituting cooling plate 4006.

In the present exemplary embodiment, in gas flow part 4032, flow path area N at an end on the first main surface 4006a side is smaller than flow path area N at an end on the second main surface 4006b side. Gas flow part 4032 of the present exemplary embodiment is the bottomless hole that opens in first main surface 4006a and second main surface 4006b. Therefore, the end on the first main surface 4006a side is end 4032a included in the same plane as first main surface 4006a, and the end on the second main surface 4006b side is end 4032b included in the same plane as second main surface 4006b. Therefore, in the bottomless hole constituting gas flow part 4032, an opening on the first main surface 4006a side is smaller than an opening on the second main surface 4006b side.

That is, gas flow part 4032 of the present exemplary embodiment is tapered such that the flow path becomes wider gradually or continuously from first main surface 4006a to second main surface 4006b. Note that, also in the present exemplary embodiment, when viewed in the arrangement direction of assembly 4002 and cooling plate 4006, each valve 4026 is entirely arranged in an opening of each gas flow part 4032 on the first main surface 4006a side.

Battery module 4001 according to the present exemplary embodiment can also achieve both the power generation performance and the reliability of battery module 4001, similarly to the fifth exemplary embodiment. Further, gas flow part 4032 of the present exemplary embodiment has a tapered shape in which flow path area N on a portion far from valve 4026 is larger than flow path area N on a portion closer to valve 4026. That is, gas flow part 4032 has a shape in which a gas outlet is larger than a gas inlet. This allows the gas having flowed into gas flow part 4032 to be easily moved toward the outlet. Therefore, gas released from valve 4026 can be more easily released to a space on the second main surface 4006b side of cooling plate 4006.

In the present exemplary embodiment, gas flow part 4032 includes the bottomless hole. However, gas flow part 4032 is not particularly limited to this structure. Gas flow part 4032 may have structures of the following Modified Examples 3 and 4. In the following Modified Examples 3 and 4, configurations different from those of the sixth exemplary embodiment will be mainly described, and the common configurations will be briefly described or omitted. Note that Modified Examples 3 and 4 for the present exemplary embodiment have a correspondence relationship similar to that of Modified Examples 1 and 2 for the fifth exemplary embodiment.

Modified Example 3

FIG. 31(A) is a cross-sectional view schematically showing a battery module according to Modified Example 3. In FIG. 31(A), illustration of an internal structure of battery 4012 and separator 4014 is omitted. Gas flow part 4032 of Modified Example 3 includes a bottomed hole that opens in the arrangement direction of assembly 4002 and cooling plate 4006. In this modified example, bottom face 4032c of the bottomed hole is arranged on the first main surface 4006a side. That is, gas flow part 4032 includes a recess that opens on the second main surface 4006b side. The bottomed hole constituting gas flow part 4032 can be formed by performing known processing such as press processing on a plate material constituting cooling plate 4006.

Gas flow part 4032 has a shape in which flow path area N at an end on the first main surface 4006a side is smaller than flow path area N at an end on the second main surface 4006b side, and flow path area N gradually changes from one end side to another end side in the arrangement direction. Since gas flow part 4032 is the bottomed hole that opens on second main surface 4006b, the end on the first main surface 4006a side is bottom face 4032c of the bottomed hole, and the end on the second main surface 4006b side is end 4032b included in the same plane as second main surface 4006b. Therefore, gas flow part 4032 of this modified example is tapered such that the flow path becomes wider gradually or continuously from bottom face 4032c toward the opening on the second main surface 4006b side.

Cooling plate 4006 has thin-walled part 4040 that constitutes bottom face 4032c of the bottomed hole. Thin-walled part 4040 is arranged so as to be substantially flush with first main surface 4006a. Further, thin-walled part 4040 is integrally molded with a periphery of the bottomed hole. That is, thin-walled part 4040 is a portion of first plate part 4034. Further, also in this modified example, when viewed in the arrangement direction of assembly 4002 and cooling plate 4006, the entire peripheral edge of each valve 4026 is located in a region surrounded by a peripheral edge of bottom face 4032c of each gas flow part 4032.

Modified Example 4

FIG. 31(B) is a cross-sectional view schematically showing a battery module according to Modified Example 4. In FIG. 31(B), illustration of an internal structure of battery 4012 and separator 4014 is omitted. Gas flow part 4032 of Modified Example 4 includes a bottomed hole that opens in the arrangement direction of assembly 4002 and cooling plate 4006. In this modified example, bottom face 4032c of the bottomed hole is arranged on the second main surface 4006b side. That is, gas flow part 4032 includes a recess that opens on the first main surface 4006a side.

Gas flow part 4032 has a shape in which flow path area N at an end on the first main surface 4006a side is smaller than flow path area N at an end on the second main surface 4006b side, and flow path area N gradually changes from one end side to another end side in the arrangement direction. Since gas flow part 4032 is the bottomed hole that opens on first main surface 4006a, the end on the first main surface 4006a side is end 4032a included in the same plane as first main surface 4006a, and the end on the second main surface 4006b side is bottom face 4032c of the bottomed hole. Therefore, gas flow part 4032 of this modified example is tapered such that the flow path becomes wider gradually or continuously from an opening on the first main surface 4006a side toward bottom face 4032c on the second main surface 4006b side.

Cooling plate 4006 has thin-walled part 4040 that constitutes bottom face 4032c of the bottomed hole. Thin-walled part 4040 is arranged so as to be substantially flush with second main surface 4006b. Further, thin-walled part 4040 is integrally molded with a periphery of the bottomed hole. That is, thin-walled part 4040 is a portion of second plate part 4036. Further, also in this modified example, when viewed in the arrangement direction of assembly 4002 and cooling plate 4006, the entire peripheral edge of each valve 4026 is located in a region surrounded by a peripheral edge of an opening of each gas flow part 4032 on the first main surface 4006a side.

Moreover, in Modified Example 3, thin-walled part 4040 is arranged so as to be flush with first main surface 4006*a*. Further, in Modified Example 4, thin-walled part 4040 is arranged so as to be flush with second main surface 4006*b*. However, the arrangement of thin-walled part 4040 is not limited to these, and thin-walled part 4040 can be provided at any position between first main surface 4006*a* and second main surface 4006*b*.

Seventh Exemplary Embodiment

Figure 32:
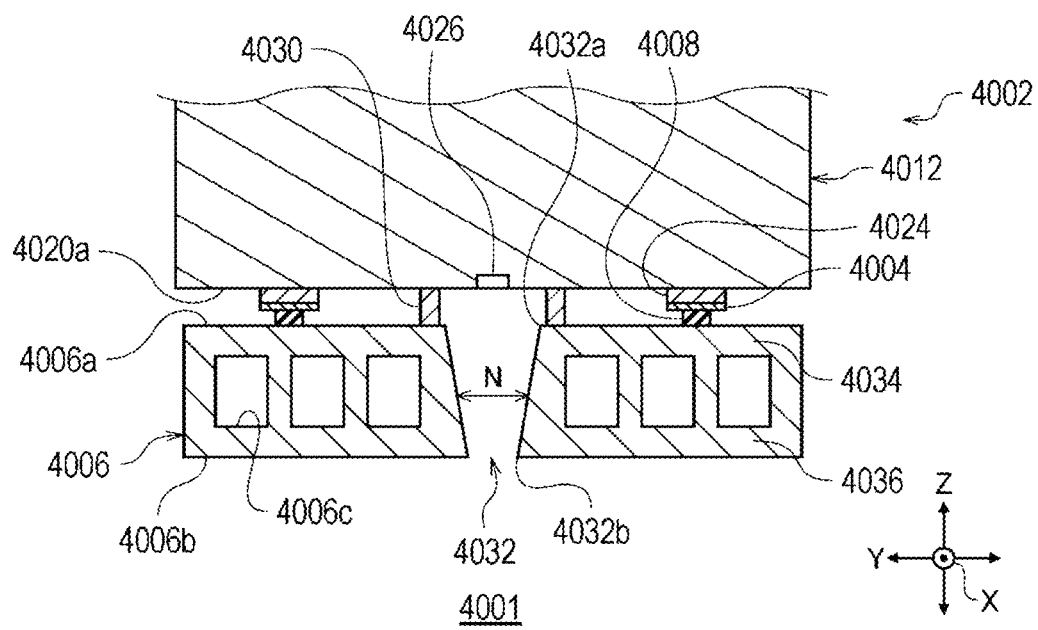
FIG. 32 is a cross-sectional view schematically showing a battery module according to a seventh exemplary embodiment.

The seventh exemplary embodiment has the same configuration as that of the fifth or sixth exemplary embodiment, except that a gas flow part has a tapered shape opposite to that of the sixth exemplary embodiment. Hereinafter, the present exemplary embodiment will be mainly described with configurations different from those of the fifth or sixth exemplary embodiment, and the common configurations will be briefly described or omitted. FIG. 32 is a cross-sectional view schematically showing a battery module according to the seventh exemplary embodiment. In FIG. 32, illustration of an internal structure of battery 4012 and separator 4014 is omitted.

Battery module 4001 includes assembly 4002, bus bar 4004, and cooling plate 4006. Assembly 4002 has a plurality of batteries 4012. On first face 4020*a* of each battery 4012, a pair of output terminals 4024 and valve 4026 are arranged. Bus bar 4004 electrically connects output terminals 4024 of the plurality of batteries 4012. Cooling plate 4006 is thermally connected to bus bar 4004 via heat conductive member 4008, and is arranged such that first main surface 4006*a* is opposed to first face 4020*a*.

Cooling plate 4006 includes a bottomless hole that opens in an arrangement direction (along axis Z) of assembly 4002 and cooling plate 4006, and has gas flow part 4032 overlapping at least partially with valve 4026 when viewed in the arrangement direction. Further, gas flow part 4032 has a shape in which gas flow path area N orthogonal to the arrangement direction of assembly 4002 and cooling plate 4006 gradually changes from one end side to another end side in the arrangement direction.

In the present exemplary embodiment, in gas flow part 4032, flow path area N at an end on the first main surface 4006*a* side is larger than flow path area N at an end on the second main surface 4006*b* side. Gas flow part 4032 of the present exemplary embodiment is the bottomless hole that opens in first main surface 4006*a* and second main surface 4006*b*. Therefore, the end on the first main surface 4006*a* side is end 4032*a* included in the same plane as first main surface 4006*a*, and the end on the second main surface 4006*b* side is end 4032*b* included in the same plane as second main surface 4006*b*. Therefore, in the bottomless hole constituting gas flow part 4032, an opening on the first main surface 4006*a* side is larger than an opening on the second main surface 4006*b* side.

That is, gas flow part 4032 of the present exemplary embodiment is tapered such that the flow path becomes narrower gradually or continuously from first main surface 4006*a* to second main surface 4006*b*. Note that, also in the present exemplary embodiment, when viewed in the arrangement direction of assembly 4002 and cooling plate 4006, each valve 4026 is entirely arranged in an opening of each gas flow part 4032 on the first main surface 4006*a* side.

Battery module 4001 according to the present exemplary embodiment can also achieve both the power generation performance and the reliability of battery module 4001, similarly to the fifth exemplary embodiment. Further, gas flow part 4032 of the present exemplary embodiment has a tapered shape in which flow path area N on a side closer to valve 4026 is larger than flow path area N on a side far from valve 4026. That is, gas flow part 4032 has a shape in which a gas inlet is larger than a gas outlet. This allows gas released from valve 4026 to be easily introduced into gas flow part 4032. In other words, gas flow part 4032 has a shape in which the gas outlet is smaller than the gas inlet. This makes it possible to suppress entering, into gas flow part 4032, of gas released into a space on the second main surface 4006*b* side of cooling plate 4006.

In the present exemplary embodiment, gas flow part 4032 includes the bottomless hole. However, gas flow part 4032 is not particularly limited to this structure. Gas flow part 4032 may have structures of the following Modified Examples 5 and 6. In the following Modified Examples 5 and 6, configurations different from those of the seventh exemplary embodiment will be mainly described, and the common configurations will be briefly described or omitted. Note that Modified Examples 5 and 6 for the present exemplary embodiment have a correspondence relationship similar to that of Modified Examples 3 and 4 for the sixth exemplary embodiment.

Modified Example 5

FIG. 33(A) is a cross-sectional view schematically showing a battery module according to Modified Example 5. In FIG. 33(A), illustration of an internal structure of battery 4012 and separator 4014 is omitted. Gas flow part 4032 of Modified Example 5 includes a bottomed hole that opens in the arrangement direction of assembly 4002 and cooling plate 4006. In this modified example, bottom face 4032*c* of the bottomed hole is arranged on the first main surface 4006*a* side. That is, gas flow part 4032 includes a recess that opens on the second main surface 4006*b* side.

Gas flow part 4032 has a shape in which flow path area N at an end on the first main surface 4006*a* side is larger than flow path area N at an end on the second main surface 4006*b* side, and flow path area N gradually changes from one end side to another end side in the arrangement direction. Since gas flow part 4032 is the bottomed hole that opens on second main surface 4006*b*, the end on the first main surface 4006*a* side is bottom face 4032*c* of the bottomed hole, and the end on the second main surface 4006*b* side is end 4032*b* included in the same plane as second main surface 4006*b*. Therefore, gas flow part 4032 of this modified example is tapered such that the flow path becomes narrower gradually or continuously from bottom face 4032*c* toward the opening on the second main surface 4006*b* side.

Cooling plate 4006 has thin-walled part 4040 that constitutes bottom face 4032*c* of the bottomed hole. Thin-walled part 4040 is arranged so as to be substantially flush with first main surface 4006*a*. Further, thin-walled part 4040 is integrally molded with a periphery of the bottomed hole. That is, thin-walled part 4040 is a portion of first plate part 4034. Further, also in this modified example, when viewed in the arrangement direction of assembly 4002 and cooling plate 4006, the entire peripheral edge of each valve 4026 is located in a region surrounded by a peripheral edge of bottom face 4032*c* of each gas flow part 4032.

Modified Example 6

FIG. 33(B) is a cross-sectional view schematically showing a battery module according to Modified Example 6. In FIG. 33(B), illustration of an internal structure of battery 4012 and separator 4014 is omitted. Gas flow part 4032 of Modified Example 6 includes a bottomed hole that opens in the arrangement direction of assembly 4002 and cooling plate 4006. In this modified example, bottom face 4032c of the bottomed hole is arranged on the second main surface 4006b side. That is, gas flow part 4032 includes a recess that opens on the first main surface 4006a side.

Gas flow part 4032 has a shape in which flow path area N at an end on the first main surface 4006a side is larger than flow path area N at an end on the second main surface 4006b side, and flow path area N gradually changes from one end side to another end side in the arrangement direction. Since gas flow part 4032 is the bottomed hole that opens on first main surface 4006a, the end on the first main surface 4006a side is end 4032a included in the same plane as first main surface 4006a, and the end on the second main surface 4006b side is bottom face 4032c of the bottomed hole. Therefore, gas flow part 4032 of this modified example is tapered such that the flow path becomes narrower gradually or continuously from an opening on the first main surface 4006a side toward bottom face 4032c on the second main surface 4006b side.

Cooling plate 4006 has thin-walled part 4040 that constitutes bottom face 4032c of the bottomed hole. Thin-walled part 4040 is arranged so as to be substantially flush with second main surface 4006b. Further, thin-walled part 4040 is integrally molded with a periphery of the bottomed hole. That is, thin-walled part 4040 is a portion of second plate part 4036. Furthermore, in this modified example, gas flow part 4032 opens on the first main surface 4006a side, and flow path area N gradually decreases toward thin-walled part 4040. This allows gas released from valve 4026 to be concentrated on thin-walled part 4040. Therefore, thin-walled part 4040 can be broken more reliably. Accordingly, a thickness of thin-walled part 4040 can be increased to improve the heat diffusion efficiency of cooling plate 4006. Further, also in this modified example, when viewed in the arrangement direction of assembly 4002 and cooling plate 4006, the entire peripheral edge of each valve 4026 is located in a region surrounded by a peripheral edge of an opening of each gas flow part 4032 on the first main surface 4006a side.

Moreover, in Modified Example 5, thin-walled part 4040 is arranged so as to be flush with first main surface 4006a. Further, in Modified Example 6, thin-walled part 4040 is arranged so as to be flush with second main surface 4006b. However, the arrangement of thin-walled part 4040 is not limited to these, and thin-walled part 4040 can be provided at any position between first main surface 4006a and second main surface 4006b.

Eighth Exemplary Embodiment

Figure 34:
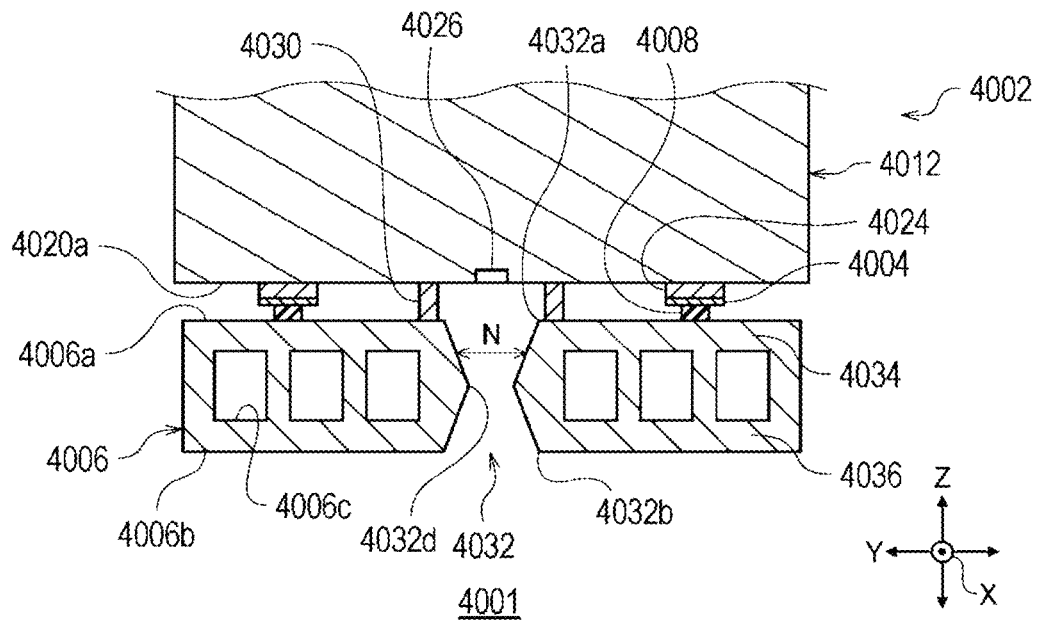
FIG. 34 is a cross-sectional view schematically showing a battery module according to an eighth exemplary embodiment.

The eighth exemplary embodiment has the same configuration as the fifth exemplary embodiment except that a gas flow part has a constricted shape. Hereinafter, the present exemplary embodiment will be mainly described with configurations different from those of the fifth exemplary embodiment, and the common configurations will be briefly described or omitted. FIG. 34 is a cross-sectional view schematically showing a battery module according to the eighth exemplary embodiment. In FIG. 34, illustration of an internal structure of battery 4012 and separator 4014 is omitted.

Battery module 4001 includes assembly 4002, bus bar 4004, and cooling plate 4006. Assembly 4002 has a plurality of batteries 4012. On first face 4020a of each battery 4012, a pair of output terminals 4024 and valve 4026 are arranged. Bus bar 4004 electrically connects output terminals 4024 of the plurality of batteries 4012. Cooling plate 4006 is thermally connected to bus bar 4004 via heat conductive member 4008, and is arranged such that first main surface 4006a is opposed to first face 4020a.

Cooling plate 4006 includes a bottomless hole that opens in an arrangement direction (axis Z) of assembly 4002 and cooling plate 4006, and has gas flow part 4032 overlapping at least partially with valve 4026 when viewed in the arrangement direction. Gas flow part 4032 has a shape in which gas flow path area N orthogonal to the arrangement direction of assembly 4002 and cooling plate 4006 gradually changes from one end side to another end side in the arrangement direction. Such gas flow part 4032 can be formed by performing known processing such as punching processing on a plate material constituting cooling plate 4006.

Gas flow part 4032 has constriction 4032d between an end on the first main surface 4006a side and an end on the second main surface 4006b side. In the present exemplary embodiment, constriction 4032d is located at a central part of gas flow part 4032 in the arrangement direction of assembly 4002 and cooling plate 4006. Gas flow path area N in gas flow part 4032 is minimum at constriction 4032d. That is, flow path area N gradually decreases from the end on the first main surface 4006a side toward constriction 4032d, and gradually increases from constriction 4032d toward the end on the second main surface 4006b side. Gas flow part 4032 of the present exemplary embodiment is the bottomless hole that opens in first main surface 4006a and second main surface 4006b. Therefore, the end on the first main surface 4006a side is end 4032a included in the same plane as first main surface 4006a, and the end on the second main surface 4006b side is end 4032b included in the same plane as second main surface 4006b.

Therefore, gas flow part 4032 of the present exemplary embodiment is tapered such that the flow path becomes narrower gradually or continuously from first main surface 4006a toward constriction 4032d, and the flow path becomes wider gradually or continuously from constriction 4032d to second main surface 4006b. Note that, also in the present exemplary embodiment, when viewed in the arrangement direction of assembly 4002 and cooling plate 4006, each valve 4026 is entirely arranged in an opening of each gas flow part 4032 on the first main surface 4006a side.

Battery module 4001 according to the present exemplary embodiment can also achieve both the power generation performance and the reliability of battery module 4001, similarly to the fifth exemplary embodiment. Further, gas flow part 4032 of the present exemplary embodiment has a tapered shape in which flow path area N on a side closer to valve 4026 is larger than flow path area N on a side far from valve 4026, in a portion from the end on the first main surface 4006a side to constriction 4032d. This allows gas released from valve 4026 to be easily introduced into gas flow part 4032. In addition, it is possible to suppress flow back, toward the battery 4012, of the gas released into a space on the second main surface 4006b side of cooling plate 4006.

In addition, gas flow part 4032 has a tapered shape such that flow path area N on a side far from valve 4026 is larger than flow path area N on a side closer to valve 4026, in a portion from constriction 4032d to second main surface 4006b. This allows gas released from valve 4026 to be more easily released to the space on the second main surface 4006b side of cooling plate 4006.

In the present exemplary embodiment, gas flow part 4032 includes the bottomless hole. However, gas flow part 4032 is not particularly limited to this structure. Gas flow part 4032 may have a structure of the following Modified Example 7. In the following Modified Example 7, configurations different from those of the eighth exemplary embodiment will be mainly described, and the common configurations will be briefly described or omitted. Note that Modified Example 7 for the present exemplary embodiment has a correspondence relationship similar to that of Modified Examples 1 and 2 for the fifth exemplary embodiment.

Modified Example 7

Figure 10:
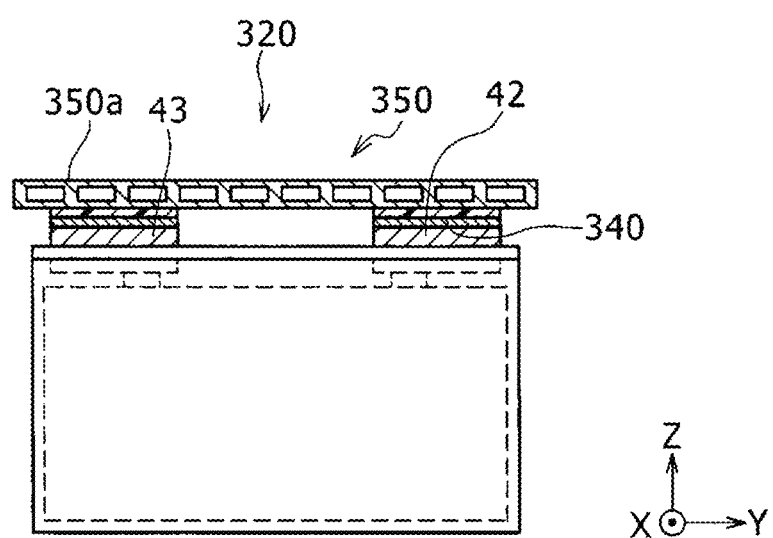
FIG. 10 is a schematic cross-sectional view corresponding to FIG. 2 in a battery module of another Modified Example 3.
Figure 35:
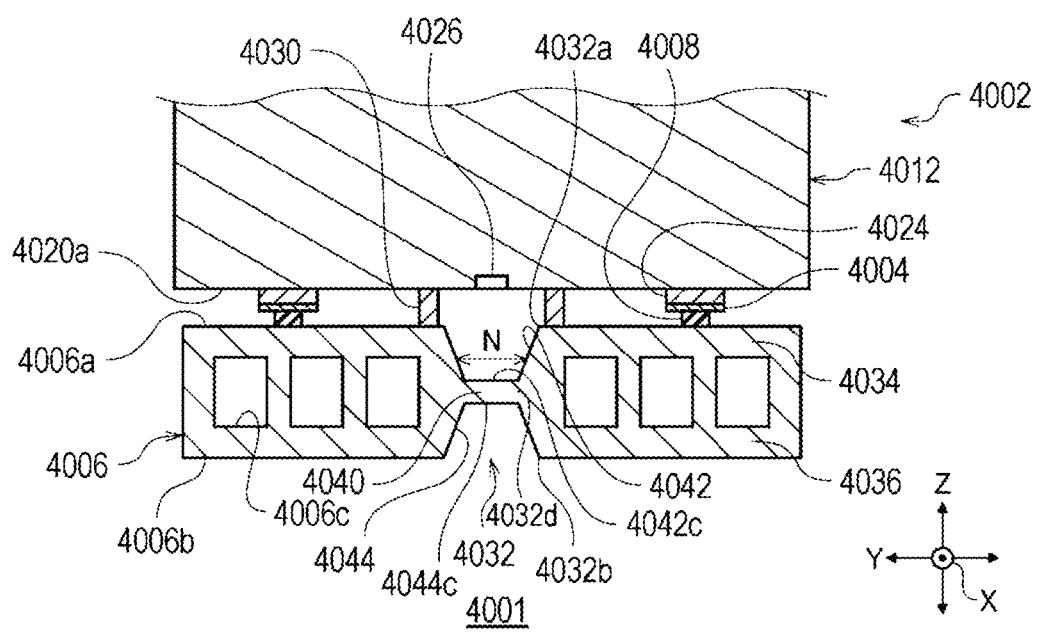
FIG. 35 is a cross-sectional view schematically showing a battery module according to Modified Example 7 of the eighth exemplary embodiment.

FIG. 35 is a cross-sectional view schematically showing a battery module according to Modified Example 7. In FIG. 10, illustration of an internal structure of battery 4012 and separator 4014 is omitted. Gas flow part 4032 of Modified Example 7 includes two bottomed holes that open in the arrangement direction of assembly 4002 and cooling plate 4006. Specifically, gas flow part 4032 includes first bottomed hole 4042 that opens to first main surface 4006*a* and second bottomed hole 4044 that opens to second main surface 4006*b*. First bottomed hole 4042 and second bottomed hole 4044 are arranged such that respective bottom faces 4042*c*, 44*c* are opposed to each other. Bottom face 4042*c* and bottom face 44*c* are arranged at a predetermined interval.

In first bottomed hole 4042, flow path area N at end 4032*a* on the first main surface 4006*a* side is larger than flow path area N at an end on the second main surface 4006*b* side, that is, bottom face 4042*c*. That is, first bottomed hole 4042 is tapered such that the flow path becomes narrower gradually or continuously from an opening on the first main surface 4006*a* side toward bottom face 4042*c*. On the other hand, in second bottomed hole 4044, flow path area N at end 4032*b* on the second main surface 4006*b* side is larger than flow path area N at an end on the first main surface 4006*a* side, that is, bottom face 44*c*. That is, second bottomed hole 4044 is tapered such that the flow path becomes wider gradually or continuously from bottom face 44*c* toward an opening on the second main surface 4006*b* side. Therefore, in this modified example, constriction 4032*d* is formed by the end of first bottomed hole 4042 on the second main surface 4006*b* side and the end of second bottomed hole 4044 on the first main surface 4006*a* side.

Gas flow part 4032 has a shape in which gas flow path area N orthogonal to the arrangement direction of assembly 4002 and cooling plate 4006 gradually changes from one end side to another end side in the arrangement direction. In gas flow part 4032 of this modified example, flow path area N gradually decreases from end 4032*a* on the first main surface 4006*a* side toward constriction 4032*d*, and flow path area N gradually increases from constriction 4032*d* toward end 4032*b* on the second main surface 4006*b* side.

Cooling plate 4006 has thin-walled part 4040 constituting bottom face 4042*c* of first bottomed hole 4042 and bottom face 44*c* of second bottomed hole 4044. In this modified example, a portion sandwiched between bottom face 4042*c* and bottom face 44*c* constitutes thin-walled part 4040. Further, thin-walled part 4040 is integrally molded with a periphery of the bottomed hole. Further, also in this modified example, when viewed in the arrangement direction of assembly 4002 and cooling plate 4006, the entire peripheral edge of each valve 4026 is located in a region surrounded by a peripheral edge of an opening of each gas flow part 4032 on the first main surface 4006*a* side.

Note that, in this Modified Example, thin-walled part 4040 is arranged at constriction 4032*d*. However, the arrangement of thin-walled part 4040 is not limited to this, and thin-walled part 4040 can be provided at any position between first main surface 4006*a* and second main surface 4006*b*.

Ninth Exemplary Embodiment

Figure 36:
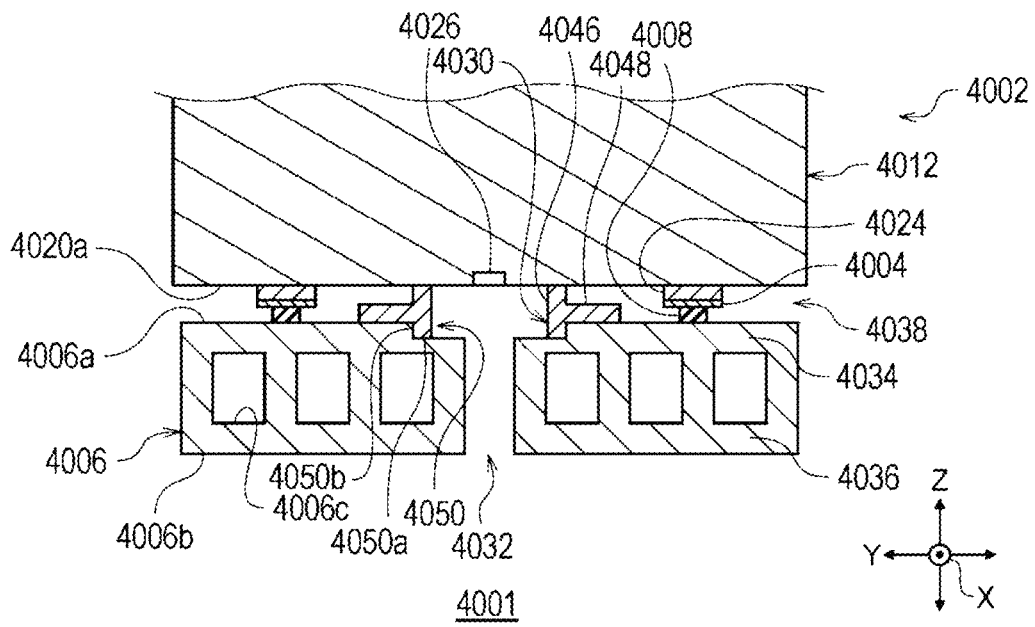
FIG. 36 is a cross-sectional view schematically showing a battery module according to a ninth exemplary embodiment.

The ninth exemplary embodiment has the same configuration as the fifth exemplary embodiment except that shapes of gas guiding part 4030 and cooling plate 4006 are different. Hereinafter, the present exemplary embodiment will be mainly described with configurations different from those of the fifth exemplary embodiment, and the common configurations will be briefly described or omitted. FIG. 36 is a cross-sectional view schematically showing a battery module according to the ninth exemplary embodiment. In FIG. 36, illustration of an internal structure of battery 4012 and separator 4014 is omitted.

Battery module 4001 includes assembly 4002, bus bar 4004, and cooling plate 4006. Assembly 4002 has a plurality of batteries 4012. On first face 4020*a* of each battery 4012, a pair of output terminals 4024 and valve 4026 are arranged. Bus bar 4004 electrically connects output terminals 4024 of the plurality of batteries 4012. Cooling plate 4006 is thermally connected to bus bar 4004 via heat conductive member 4008, and is arranged such that first main surface 4006*a* is opposed to first face 4020*a*.

Cooling plate 4006 includes a bottomless hole that opens in an arrangement direction (axis Z) of assembly 4002 and cooling plate 4006, and has gas flow part 4032 overlapping at least partially with valve 4026 when viewed in the arrangement direction. Further, battery module 4001 has gas guiding part 4030 in gap 4038 between valve 4026 and gas flow part 4032. Gas guiding part 4030 of the present exemplary embodiment has tube part 4046 and flange 4048.

Tube part 4046 is arranged so that openings face the arrangement direction of assembly 4002 and cooling plate 4006. One opening of tube part 4046 is connected to valve 4026. Another opening of tube part 4046 is connected to gas flow part 4032. Gas released from valve 4026 passes through inside of tube part 4046 to reach gas flow part 4032. Flange 4048 expands from an outer side face of tube part 4046 toward outside of the tube. Providing flange 4048 can increase strength of tube part 4046. This makes it possible to suppress deformation of tube part 4046 due to pressure of gas released from valve 4026.

Cooling plate 4006 of the present exemplary embodiment has stepped part 4050 that surrounds a periphery of gas flow part 4032 on first main surface 4006*a*. Stepped part 4050 has bottom face 4050*a* extending parallel to first main surface 4006*a* at a position closer to second main surface 4006*b* than first main surface 4006*a*, and inner side face 4050*b* that connects first main surface 4006*a* and bottom face 4050*a*. Therefore, first main surface 4006*a* is one step lower at stepped part 4050. Inner side face 4050*b* has a shape similar to tube part 4046, and is slightly larger than an outer diameter of tube part 4046 when viewed in the arrangement direction of assembly 4002 and cooling plate 4006.

Gas guiding part 4030 engages with stepped part 4050 at an end of tube part 4046 on a portion of gas guiding part 4030 closer to the cooling plate 4006. That is, the end of tube part 4046 on a portion of tube part 4046 closer to the cooling plate 4006 is arranged in stepped part 4050. In this state, bottom face 4050*a* abuts with a lower end face of tube part 4046, and inner side face 4050*b* is opposed to the outer side face of tube part 4046. This causes gas flow part 4032 to be positioned in an extending direction of first main surface 4006a, that is, in an in-plane direction of first main surface 4006a. As a result, it is possible to suppress displacement of a position of gas guiding part 4030 due to pressure of gas released from the valve 4026. Further, preferably, a face of flange 4048 facing toward first main surface 4006a abuts on first main surface 4006a, in a state where the end of tube part 4046 is engaged with stepped part 4050. This can further suppress deformation of tube part 4046.

In the present exemplary embodiment, gas flow part 4032 includes the bottomless hole. However, gas flow part 4032 is not particularly limited to this structure. Gas flow part 4032 may have a structure of the following Modified Example 8. Hereinafter, in the following modified example 8, configurations different from those of the ninth exemplary embodiment will be mainly described, and the common configurations will be briefly described or omitted. Note that Modified Example 8 for the present exemplary embodiment has a correspondence relationship similar to that of Modified Example 1 for the fifth exemplary embodiment.

Modified Example 8

Figure 37:
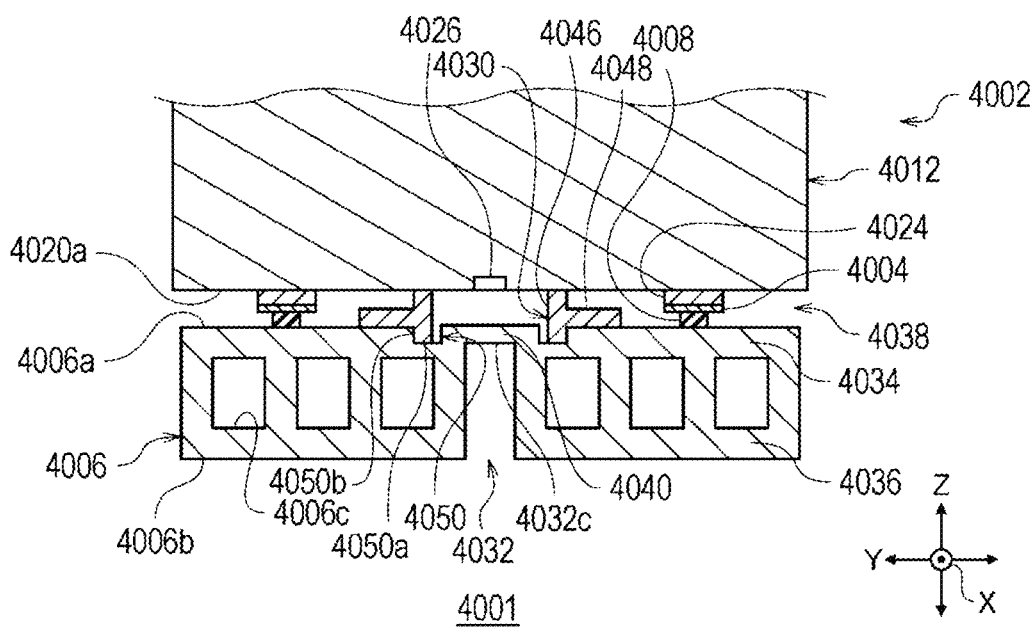
FIG. 37 is a cross-sectional view schematically showing a battery module according to Modified Example 8 of the ninth exemplary embodiment.

FIG. 37 is a cross-sectional view schematically showing a battery module according to Modified Example 8. In FIG. 37, illustration of an internal structure of battery 4012 and separator 4014 is omitted. Gas flow part 4032 of Modified Example 8 includes a bottomed hole that opens in the arrangement direction of assembly 4002 and cooling plate 4006. In this modified example, bottom face 4032c of the bottomed hole is arranged on the first main surface 4006a side. That is, gas flow part 4032 includes a recess that opens on the second main surface 4006b side. Cooling plate 4006 has thin-walled part 4040 that constitutes bottom face 4032c of the bottomed hole. Thin-walled part 4040 is arranged so as to be substantially flush with first main surface 4006a. Further, thin-walled part 4040 is integrally molded with a periphery of the bottomed hole. That is, thin-walled part 4040 is a portion of first plate part 4034.

Further, battery module 4001 has gas guiding part 4030. Gas guiding part 4030 has tube part 4046 and flange 4048. One opening of tube part 4046 is connected to valve 4026, and another opening is connected to gas flow part 4032. Flange 4048 expands from an outer side face of tube part 4046 toward outside of the tube. Cooling plate 4006 of the present exemplary embodiment has stepped part 4050 that surrounds a periphery of gas flow part 4032 on first main surface 4006a. More specifically, stepped part 4050 surrounds a periphery of bottom face 4032c of gas flow part 4032, in other words, periphery of thin-walled part 4040. Stepped part 4050 of this Modified Example includes a groove extending along a periphery of bottom face 4032c. Gas flow part 4032 engages with stepped part 4050 at an end of tube part 4046 on the portion of tube part 4046 closer to the cooling plate 4006. That is, the end of tube part 4046 on the portion of tube part 4046 closer to the cooling plate 4006 is fitted into the groove included in stepped part 4050.

Moreover, although not illustrated, thin-walled part 4040 may be provided on the second main surface 4006b side, similarly to Modified Example 2. Further, thin-walled part 4040 may be provided at any position between first main surface 4006a and second main surface 4006b.

When gas guiding part 4030 is provided in each of the above-described exemplary embodiments and modified examples, a magnitude relationship between area Sv of a region surrounded by a peripheral edge of valve 4026, flow path area Sg of gas guiding part 4030, and flow path area Sf of gas flow part 4032 may be Sv≤Sf≤Sg. Providing gas guiding part 4030 allows gas released from valve 4026 to easily flow into gas flow part 4032. Therefore, decrease in an amount of gas flowing into gas flow part 4032, which occurs when flow path area Sf of gas flow part 4032 is reduced, can be suppressed by installing gas guiding part 4030. That is, required flow path area Sf of gas flow part 4032 can be reduced. This makes it possible to suppress increase in size of gas flow part 4032, and further improve the cooling efficiency of cooling plate 4006.

The number of batteries 4012 included in assembly 4002 and the number of heat conductive members 4008 are not particularly limited. A structure of each part of assembly 4002, including a shape of separator 4014 and a fastening structure of end plate 4016 and bind bar 4018, is also not particularly limited. Battery module 4001 may include a bus bar plate. The bus bar plate is a plate-shaped member that is arranged so as to be opposed to first face 4020a of the plurality of batteries 4012, and covers first face 4020a. The bus bar plate corresponds to an assembly of walls 4014a included in individual separators 4014 in the exemplary embodiment.

Next, tenth, eleventh, twelfth, and thirteenth exemplary embodiments will be described.

In recent years, there has been a demand for even higher capacities of battery modules, and higher capacities of batteries are being promoted in order to meet this demand. Increase of the capacity of batteries leads to a flow of a large current through a bus bar that connects the batteries. This increases an amount of heat generated in the bus bar. Increase of the amount of heat generated by the bus bar causes heat to be transferred from the bus bar to the battery to raise a temperature of the battery, which may deteriorate power generation performance of the battery.

As a method of suppressing heat generation of the bus bar, it is conceivable to cause a cooling plate to abut on the bus bar. However, batteries, bus bars, and cooling plates each have dimensional tolerances. Therefore, it is not easy to thermally connect all the bus bars to the cooling plate, and there is a possibility that a heat dissipation effect of the cooling plate becomes uneven in individual bus bars. In this case, power generation performance of the battery connected to the bus bar with insufficient cooling may be deteriorated. Deterioration in power generation performance of the individual battery leads to deterioration in the power generation performance of the entire battery module.

These tenth, eleventh, twelfth, and thirteenth exemplary embodiments have been made in view of such a situation, and an object is to provide technology for suppressing deterioration in power generation performance of a battery module.

These tenth, eleventh, twelfth, and thirteenth exemplary embodiments are battery modules. The battery module includes: an assembly in which a plurality of batteries having housing and a pair of output terminals arranged on a first face of the housing are assembled; a plurality of bus bars that electrically connect the output terminals of the plurality of batteries; a cooling plate arranged so as to be opposed to the first face with the plurality of bus bars sandwiched in between; a heat conductive member that has an insulating property, abuts on the bus bar and the cooling plate, and thermally connects the bus bar and the cooling plate; and an expansion and contraction mechanism capable of biasing a surface of the heat conductive member to the bus bar or the cooling plate by taking a state of being elastically deformed and contracted.

According to these tenth, eleventh, twelfth, and thirteenth exemplary embodiments, it is possible to suppress deterioration in power generation performance of the battery module.

Tenth Exemplary Embodiment

Figure 38:
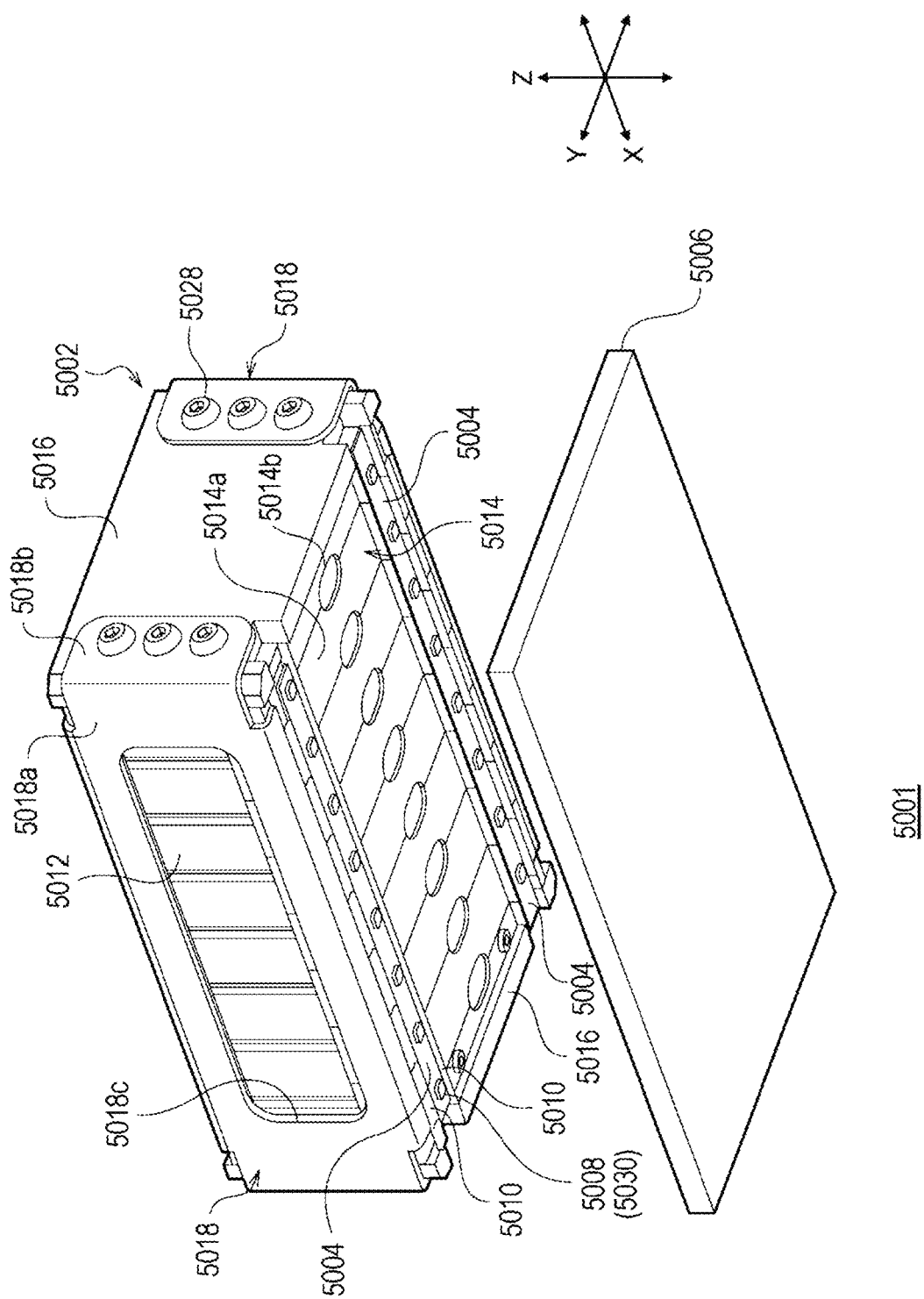
FIG. 38 is a perspective view of a battery module according to a tenth exemplary embodiment.
Figure 39:
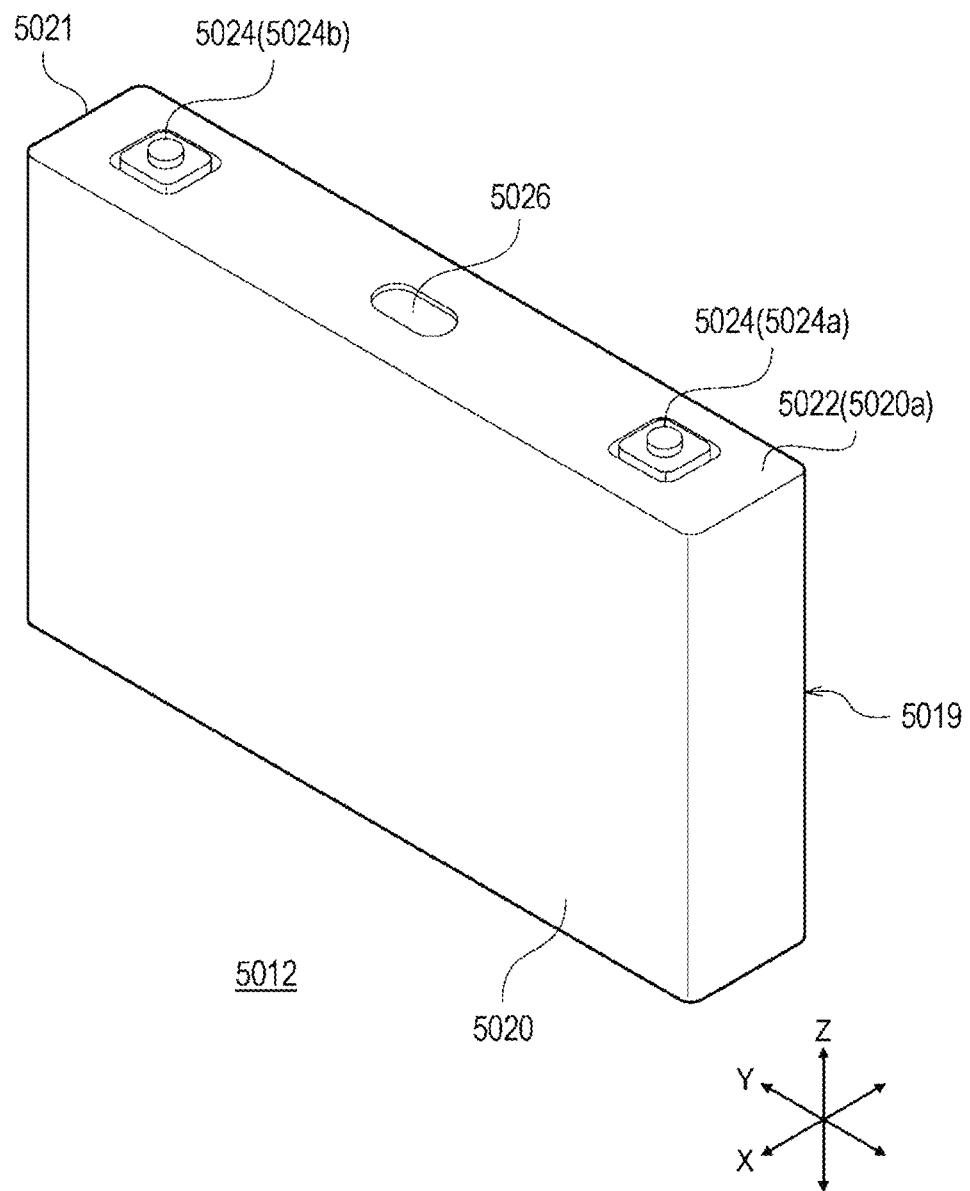
FIG. 39 is a perspective view of a battery.

FIG. 38 is a perspective view of a battery module according to the tenth exemplary embodiment. FIG. 39 is a perspective view of a battery. FIG. 38 illustrates a state where a cooling plate is disassembled. Battery module 5001, battery module 5001, includes assembly 5002, a plurality of bus bars 5004, bus bar 5004, cooling plate 5006, heat conductive member 5008, displacement regulator 5010, and expansion and contraction mechanism 5030. Assembly 5002 has a structure in which a plurality of batteries 5012 are assembled. Assembly 5002 of the present exemplary embodiment takes a form of a battery group in which a plurality of flat batteries 5012 are stacked, that is, a battery stack. Assembly 5002 has the plurality of batteries 5012, a plurality of separators 5014, separator 5014, a pair of end plates 5016, end plate 5016, and a pair of bind bars 5018, bind bar 5018.

Each battery 5012 is a rechargeable secondary battery such as, for example, a lithium ion battery, a nickel-hydrogen battery, or a nickel-cadmium battery. Battery 5012 is a so-called square battery, and has housing 5019 having a flat rectangular parallelepiped shape. Housing 5019 has outer can 5020 and lid 5022. On one face of outer can 5020, a substantially rectangular opening (not illustrated) is provided. Through this opening, an electrode body, an electrolytic solution, and the like are accommodated in outer can 5020. The opening of outer can 5020 is provided with lid 5022 that seals the opening of outer can 5020. Lid 5022 is, for example, a rectangular plate. Lid 5022 forms first face 5020a of housing 5019.

Lid 5022, that is, first face 5020a of housing 5019 is provided with output terminal 5024 of a positive electrode near one end in a longitudinal direction, and output terminal 5024 of a negative electrode near another end. The pair of output terminals 5024 are electrically connected respectively to a positive electrode plate and a negative electrode plate included in the electrode body. Hereinafter, as appropriate, output terminal 5024 of a positive electrode will be referred to as positive electrode terminal 5024a, and output terminal 5024 of a negative electrode will be referred to as negative electrode terminal 5024b. Further, when it is not necessary to distinguish the polarities of output terminals 5024, positive electrode terminal 5024a and negative electrode terminal 5024b are collectively referred to as output terminal 5024. Outer can 5020 and lid 5022 are conductors, and are, for example, made of metal. For example, outer can 5020 and lid 5022 are made of aluminum, iron, stainless steel, or the like. Lid 5022 and the opening of outer can 5020 are joined, for example, by a laser. Therefore, housing 5019 has joint 5021 that joins the opening of outer can 5020 and a peripheral edge of lid 5022. Each of the pair of output terminals 5024 is inserted through a through hole (not illustrated) formed on lid 5022. Between the pair of output terminals 5024 and each through hole, an insulating sealing member (not illustrated) is interposed.

In the description of the present exemplary embodiment, for convenience, a face (first face 5020a) on a side provided with lid 5022 is defined as an upper face of battery 5012, and an opposite face (a bottom face of outer can 5020) is defined as a bottom face of battery 5012. Battery 5012 also has four side faces connecting the upper and bottom faces. Two of the four sides are a pair of long side faces connected to long sides of the upper and bottom faces. These long side faces are faces (main surfaces) having a largest area among the six faces of battery 5012. The remaining two side faces, excluding the two long side faces, are a pair of short side faces connected to short sides of the upper and bottom faces. Further, in assembly 5002, a face on the upper face side of battery 5012 is defined as an upper face of assembly 5002, a face on the bottom face side of battery 5012 is defined as a bottom face of assembly 5002, and a face on the short side face side of battery 5012 is defined as a side face of assembly 5002. These directions and positions are defined for convenience. Therefore, for example, a portion defined as an upper face in the present disclosure does not mean being always located above a portion defined as a bottom face. For example, in assembly 5002 of the present exemplary embodiment, the upper face, that is, first face 5020a of battery 5012, is arranged so as to face downward in a vertical.

Lid 5022 is provided with safety valve 5026 between the pair of output terminals 5024. Safety valve 5026 is a mechanism to open to release internal gas when internal pressure of housing 5019 rises to a predetermined value or more. Safety valve 5026 of each battery 5012 is connected to a gas duct (not illustrated), and gas inside the battery is discharged from safety valve 5026 to the gas duct. For example, safety valve 5026 includes a thin-walled part provided on a part of lid 5022 and having a thickness thinner than other portions, and a linear groove formed on a surface of the thin-walled part. In this configuration, when internal pressure of housing 5019 rises, safety valve 5026 opens by tearing the thin-walled part starting from the groove.

The plurality of batteries 5012 are arranged side by side at a predetermined interval so that long side faces of adjacent batteries 5012 are opposed to each other. In the present exemplary embodiment, an alignment direction of the plurality of batteries 5012 is along axis X. Further, output terminals 5024 of individual batteries 5012 are arranged so as to face the same direction. In the present exemplary embodiment, output terminal 5024 of each battery 5012 is arranged so as to face downward in the vertical direction for convenience. Alternatively, output terminals 5024 of individual batteries 5012 may be arranged so as to face different directions. Then, output terminals 5024 of the plurality of batteries 5012 are electrically connected to each other by the plurality of bus bars 5004.

Each bus bar 5004 is a substantially strip-shaped member made of metal such as copper or aluminum. In the present exemplary embodiment, the plurality of batteries 5012 are grouped into a plurality of battery blocks including a plurality of batteries 5012. Then, in each battery block, output terminals 5024 having the same polarity are connected in parallel by bus bar 5004. In addition, output terminals 5024 of two adjacent battery blocks having different polarities are connected in series by bus bar 5004. Alternatively, all batteries 5012 may be connected in series.

Separator 5014 is also called an insulating spacer, and is made of, for example, resin having an insulating property. Each separator 5014 is arranged between two adjacent batteries 5012 to electrically insulate between these two batteries 5012. Further, some separators 5014 are arranged between battery 5012 and end plate 5016 to insulate between battery 5012 and end plate 5016. Examples of resin constituting each separator 5014 include thermoplastic resin such as polypropylene (PP), polybutylene terephthalate (PBT), polycarbonate (PC), and Noryl (registered trademark) resin (modified PPE).

Further, each separator 5014 has wall 5014a extending along axis X and covering first face 5020a of battery 5012. Covering first face 5020a of battery 5012 with wall 5014a makes it possible to secure a creepage distance between adjacent batteries 5012 or between battery 5012 and end plate 5016. Wall 5014a has opening 5014b at a position corresponding to safety valve 5026 so as to expose safety valve 5026 to outside.

The plurality of batteries 5012 and the plurality of separators 5014 arranged side by side are sandwiched between the pair of end plates 5016. The pair of end plates 5016 are arranged adjacent to batteries 5012 located at both ends in axis X, via separator 5014. End plate 5016 is made of, for example, a metal plate. On a face of end plate 5016 opposed to a long side face of battery 5012, there is provided a screw hole (not illustrated) into which screw 5028 is screwed.

The pair of bind bars 5018 are elongated members whose longitudinal axis is axis X. The pair of bind bars 5018 are arranged so as to face each other in axis Y orthogonal to axis X and parallel to a longitudinal axis of first face 5020a. Between the pair of bind bars 5018, the plurality of batteries 5012, the plurality of separators 5014, and the pair of end plates 5016 are interposed. Each bind bar 5018 has rectangular flat part 5018a extending parallel to a side face of assembly 5002, and four eaves 5018b projecting from individual end sides of flat part 5018a toward battery 5012. Two eaves 5018b opposed to each other in axis X are provided with through holes (not illustrated) through which screw 5028 is inserted. Flat part 5018a is provided with opening 5018c that exposes a short side face of battery 5012.

In a state where the plurality of batteries 5012 and the plurality of separators 5014 are arranged alternately and sandwiched between the pair of end plates 5016 in axis X, the plurality of batteries 5012, the plurality of separators 5014, and the pair of end plates 5016 are sandwiched in axis Y by the pair of bind bars 5018. Each bind bar 5018 is positioned so that a through hole of eave 5018b overlaps with a screw hole in end plate 5016. Then, screw 5028 is inserted through the through hole and screwed into the screw hole. By engaging the pair of bind bars 5018 with the pair of end plates 5016 in this way, the plurality of batteries 5012 are restrained.

The plurality of batteries 5012 are positioned in axis X by being tightened in axis X by bind bar 5018. In addition, upper and bottom faces of the plurality of batteries 5012 abut on, via separator 5014, two eaves 5018b opposed to each other in axis Z in which the upper and bottom faces are aligned. This allows the plurality of batteries 5012 to be positioned in axis Z. As an example, after the positioning of those is completed, bus bar 5004 is attached to output terminal 5024 of each battery 5012, and output terminals 5024 of the plurality of batteries 5012 are electrically connected to each other. For example, bus bar 5004 is fixed to output terminal 5024 by welding.

In assembly 5002, a face on a side on which output terminal 5024 projects is covered with cooling plate 5006. Cooling plate 5006 is arranged so as to be opposed to first face 5020a of each battery 5012. Bus bar 5004 is interposed between cooling plate 5006 and assembly 5002. Cooling plate 5006 is made of a material having high heat conductivity, such as aluminum. Note that cooling plate 5006 may internally have a flow path through which a refrigerant such as water or ethylene glycol flows.

Heat conductive member 5008 is interposed between each bus bar 5004 and cooling plate 5006, and abuts on each bus bar 5004 and cooling plate 5006. For example, heat conductive member 5008 is fixed to bus bar 5004 by an adhesive. Then, when assembly 5002 fixed with bus bar 5004 and heat conductive member 5008 is placed on cooling plate 5006, heat conductive member 5008 abuts on cooling plate 5006. Heat conductive member 5008 has high heat conductivity and an insulating property. This makes it possible to prevent electrical connection between bus bar 5004 and cooling plate 5006 via heat conductive member 5008.

As heat conductive member 5008, a known resin sheet or the like having good heat conductivity, such as acrylic rubber or silicone rubber, can be used. In the present exemplary embodiment, at a position overlapping with each output terminal 5024 in an arrangement direction (along axis Z) of assembly 5002 and cooling plate 5006, heat conductive member 5008 having a substantially rectangular parallelepiped shape is arranged. In each heat conductive member 5008, a surface opposed to bus bar 5004 abuts on a main surface of bus bar 5004, and a surface opposed to cooling plate 5006 abuts on a main surface of cooling plate 5006.

Each bus bar 5004 and cooling plate 5006 are connected thermally, that is, to be heat exchangeable, via heat conductive member 5008. This allows cooling plate 5006 to cool each bus bar 5004, and accordingly cool each battery 5012. Cooling each bus bar 5004 with use of cooling plate 5006 can further improve the cooling efficiency of bus bar 5004 and battery 5012. Further, by providing heat conductive member 5008 at a position overlapping with output terminal 5024 in the arrangement direction of assembly 5002 and cooling plate 5006, a heat conduction path from output terminal 5024 to cooling plate 5006 can be shortened. This can further improve the cooling efficiency of output terminal 5024, and accordingly of battery 5012. In a joint point between output terminal 5024 and a current collector member that electrically and thermally connects output terminal 5024 and the electrode body, structurally, resistance tends to be high, and therefore heat is likely to be generated. Therefore, it is desirable to preferentially cool output terminal 5024.

Assembly 5002 and cooling plate 5006 have, at a predetermined position, an insertion part (not illustrated) through which a fastening member such as a screw is inserted. Assembly 5002 and cooling plate 5006 are fixed to each other by insertion of the fastening member through the insertion part. Note that the fastening member that fixes assembly 5002 and cooling plate 5006 may be used for fixing cooling plate 5006 to a module case. Further, the fastening part of assembly 5002 is preferably provided at a position that does not overlap with battery 5012 when viewed in the arrangement direction of assembly 5002 and cooling plate 5006. For example, the fastening part of assembly 5002 is provided on end plate 5016 or bind bar 5018.

Displacement regulator 5010 is a structure that is interposed between assembly 5002 and cooling plate 5006, to maintain a distance between first face 5020a of battery 5012 and cooling plate 5006. When an impact is applied to battery module 5001 due to vibration and the like of a fixed object of battery module 5001, battery module 5001, assembly 5002 and cooling plate 5006 may be displaced in a direction approaching each other. When cooling plate 5006 approaches assembly 5002, a load may be applied to output terminal 5024 via bus bar 5004.

On the other hand, in battery module 5001 of the present exemplary embodiment, displacement regulator 5010 is interposed between assembly 5002 and cooling plate 5006. Displacement regulator 5010 abuts on both assembly 5002 and cooling plate 5006 at least when assembly 5002 and cooling plate 5006 are displaced in the direction approaching each other. This hinders further approach between assembly 5002 and cooling plate 5006. That is, a distance between assembly 5002 and cooling plate 5006 is maintained by a dimension of displacement regulator 5010. As a result, it is possible to reduce a load that may be applied to output terminal 5024 when assembly 5002 and cooling plate 5006 are displaced in the direction approaching each other.

In addition, more preferably, in a state where assembly 5002 and cooling plate 5006 are not displaced, displacement regulator 5010 abuts on both assembly 5002 and cooling plate 5006. This can further reduce a load applied to output terminal 5024. However, in an actual usage of battery module 5001, displacement regulator 5010 abutting on both assembly 5002 and cooling plate 5006 and displacement regulator 5010 abutting only on one of these may coexist. A structure of displacement regulator 5010 will be described in detail later.

In addition, a projecting height from first face 5020*a* of output terminal 5024, and each thickness of bus bar 5004, cooling plate 5006, and heat conductive member 5008 may include dimensional tolerances. Therefore, when assembly 5002 is placed on cooling plate 5006, some of heat conductive members 5008 may be in a non-contact state with cooling plate 5006. On the other hand, battery module 5001 according to the present exemplary embodiment has expansion and contraction mechanism 5030 that maintains abutting between heat conductive member 5008 and bus bar 5004 and abutting between heat conductive member 5008 and cooling plate 5006, to ensure a thermal connection between bus bar 5004 and cooling plate 5006.

In the present exemplary embodiment, expansion and contraction mechanism 5030 includes heat conductive member 5008. That is, heat conductive member 5008 of the present exemplary embodiment has elasticity or flexibility. Specific examples of heat conductive member 5008 listed above have enough elasticity so that heat conductive member 5008 can function as expansion and contraction mechanism 5030. In a state where battery module 5001 is assembled, heat conductive member 5008 can be elastically deformed by being sandwiched between bus bar 5004 and cooling plate 5006, to take a contracted state. Further, a contraction amount of heat conductive member 5008 changes in accordance with a size of a gap between bus bar 5004 and cooling plate 5006. Therefore, a tolerance of each member can be absorbed by heat conductive member 5008.

Expansion and contraction mechanism 5030 can bias a surface of heat conductive member 5008 to bus bar 5004 or cooling plate 5006 by taking a state of being elastically deformed and contracted. In the present exemplary embodiment, heat conductive member 5008 itself constitutes expansion and contraction mechanism 5030. Heat conductive member 5008 can bias a surface of heat conductive member 5008 to bus bar 5004 and cooling plate 5006 by taking a contracted state. In this way, by being pressed against both bus bar 5004 and cooling plate 5006, heat conductive member 5008 can maintain thermal connection between cooling plate 5006 and bus bar 5004. A dimension of heat conductive member 5008 in the arrangement direction of assembly 5002 and cooling plate 5006 is preferably set large enough to reliably absorb the tolerance of each member and maintain the thermal connection between cooling plate 5006 and bus bar 5004. Therefore, in a state where battery module 5001 is assembled, desirably all of heat conductive member 5008 is interposed between bus bar 5004 and heat conductive member 5008 in a compressed state to some extent.

Figure 40:
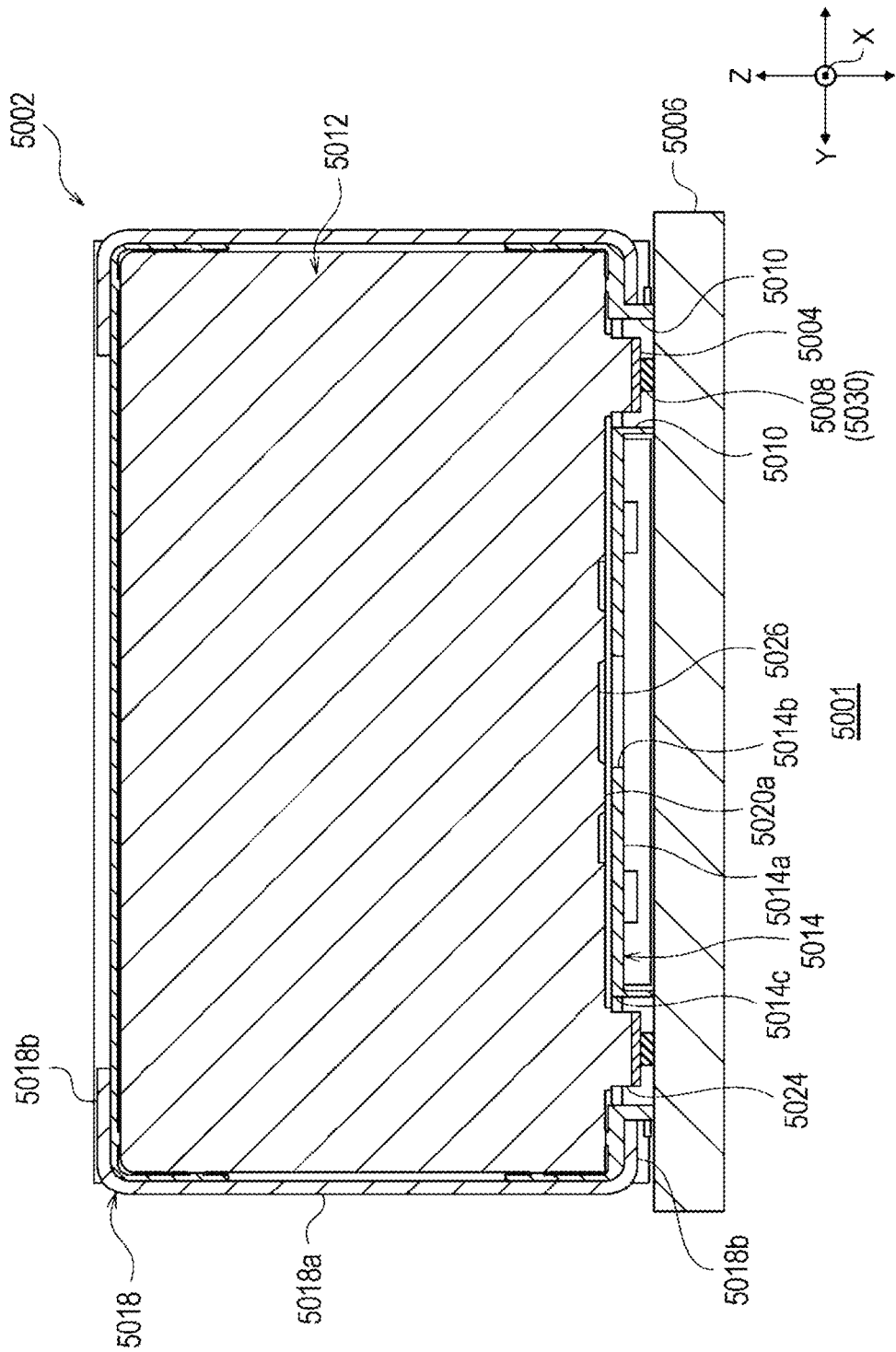
FIG. 40 is a cross-sectional view of the battery module.
Figure 41:
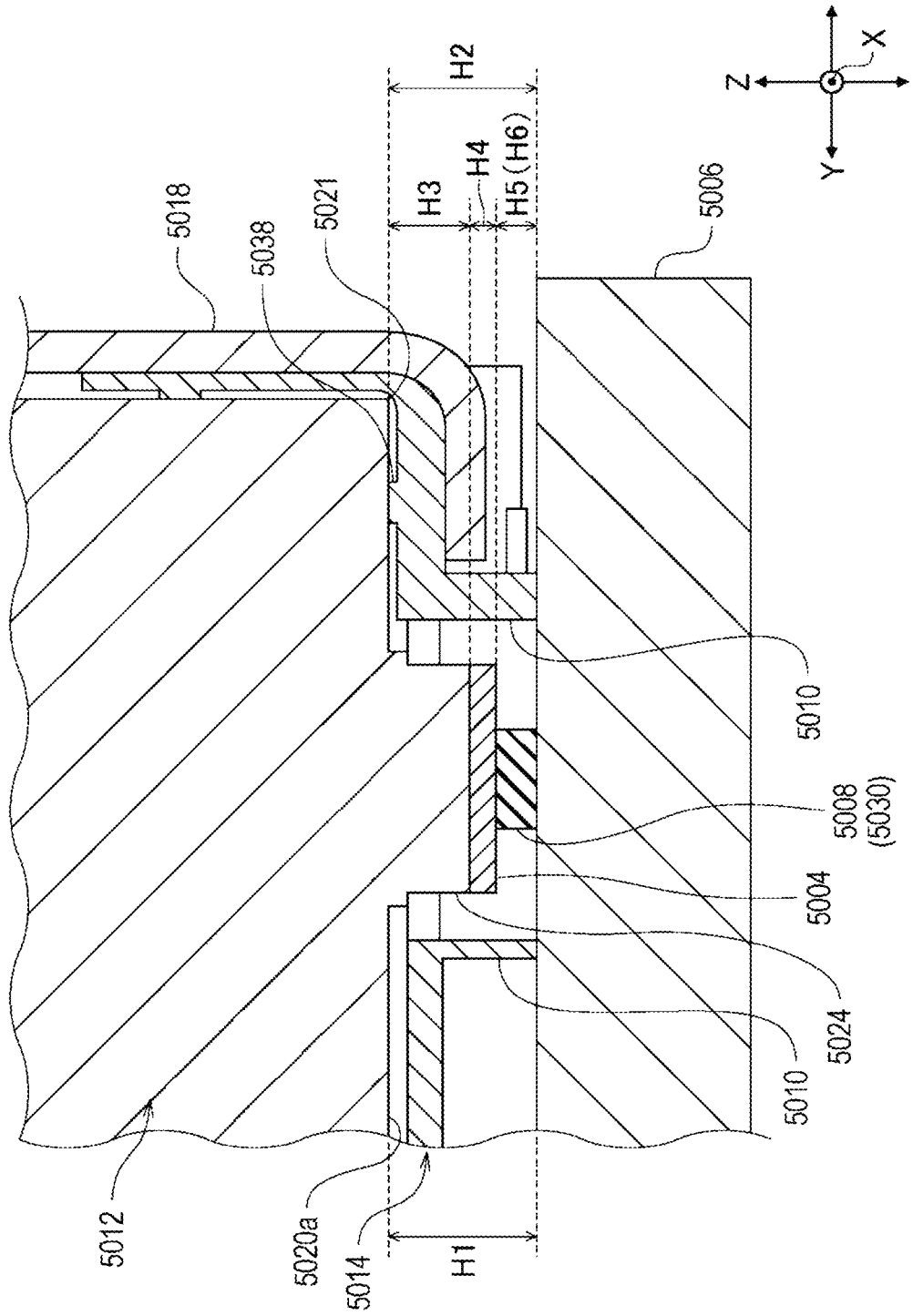
FIG. 41 is an enlarged cross-sectional view showing a region including an output terminal of the battery module.

Subsequently, a structure of displacement regulator 5010 will be described in detail. FIG. 3 is a cross-sectional view of a battery module. FIG. 41 is an enlarged cross-sectional view showing a region including an output terminal of the battery module. In FIGS. 40 and 41, illustration of an internal structure of battery 5012 and cooling plate 5006 is omitted.

Displacement regulator 5010 is provided on a face that is opposed to cooling plate 5006, in separator 5014. That is, displacement regulator 5010 includes a projection projecting from wall 5014*a* of separator 5014 toward cooling plate 5006. Specifically, wall 5014*a* of separator 5014 covering first face 5020*a* of battery 5012 has, at a position corresponding to output terminal 5024, notch 5014*c* so as to expose output terminal 5024 to outside. Displacement regulators 5010 are provided at both ends of notch 5014*c* in axis Y in which a pair of output terminals 5024 are aligned. That is, in the present exemplary embodiment, a pair of displacement regulators 5010 are arranged with output terminal 5024 sandwiched in between.

Displacement regulator 5010 satisfies the following requirements for dimension H1 in the arrangement direction of assembly 5002 and cooling plate 5006. Dimension H1 of displacement regulator 5010 is defined as a distance from first face 5020*a* to an end of displacement regulator 5010 on an opposite side to first face 5020*a*. In the present exemplary embodiment, since displacement regulator 5010 is provided in assembly 5002, dimension H1 is a projecting height of displacement regulator 5010 from first face 5020*a*. That is, dimension H1 of displacement regulator 5010 is less than or equal to projecting height H2 from first face 5020*a* in a stacked structure of output terminal 5024, bus bar 5004, heat conductive member 5008, and expansion and contraction mechanism 5030. When the projecting height of output terminal 5024 from first face 5020*a* is defined as H3, a dimension of bus bar 5004 in the arrangement direction of assembly 5002 and cooling plate 5006 is defined as H4, a dimension of heat conductive member 5008 in the arrangement direction is defined as H5, and a dimension of expansion and contraction mechanism 5030 in the arrangement direction is defined as H6, dimension H1 of displacement regulator 5010 satisfies a condition of H1≤H3+H4+H5 or H1≤H3+H4+H6, in the present exemplary embodiment in which heat conductive member 5008 also serves as expansion and contraction mechanism 5030. Further, when expansion and contraction mechanism 5030 has a structure different from that of heat conductive member 5008, dimension H1 satisfies a condition of H1≤H3+H4+H5+H6.

Note that, when two members constituting the stacked structure overlap with each other due to fitting, insertion, locking, and the like when viewed in a perpendicular direction to the arrangement direction of assembly 5002 and cooling plate 5006, a dimension of the overlapping portion of these two members is calculated as a dimension of any one of the members, and is not included in a dimension of another member. Further, the calculation does not include, in the stacked structure, a dimension of a portion that does not overlap with first face 5020*a* when viewed in the arrangement direction and projects toward a bottom face of outer can 5020 from first face 5020*a*. Further, the calculation does not include, in the stacked structure, a dimension of a portion that does not overlap with a main surface of cooling plate 5006 when viewed in the arrangement direction, and projects in a direction of separating from first face 5020*a*, from the main surface.

By making dimension H1 of displacement regulator 5010 to be less than or equal to the total of the individual dimensions of output terminal 5024, bus bar 5004, heat conductive member 5008, and expansion and contraction mechanism 5030, it is possible to further reliably maintain a state where output terminal 5024 and bus bar 5004 are electrically connected and a state where bus bar 5004 and cooling plate 5006 are thermally connected. Note that dimension H6 of expansion and contraction mechanism 5030 is preferably a dimension when expansion and contraction mechanism 5030 is in a state of being not contracted.

Further, it is preferable that dimension H1 of displacement regulator 5010 is larger than a sum of projecting height H3 of output terminal 5024 and dimension H4 of bus bar 5004. That is, displacement regulator 5010 projects toward cooling plate 5006 from bus bar 5004. This allows displacement regulator 5010 to more reliably reduce a load applied to output terminal 5024.

Further, displacement regulator 5010 has a larger spring constant than that of expansion and contraction mechanism 5030. That is, displacement regulator 5010 is less likely to be deformed by an external force than expansion and contraction mechanism 5030. In the present exemplary embodiment, since heat conductive member 5008 also serves as expansion and contraction mechanism 5030, displacement regulator 5010 has a larger spring constant than that of heat conductive member 5008. This allows displacement regulator 5010 to more reliably regulate displacement in the direction in which assembly 5002 and cooling plate 5006 approach each other. In the present exemplary embodiment, displacement regulator 5010 is integrally molded with separator 5014. Therefore, examples of a material constituting displacement regulator 5010 include thermoplastic resin such as polypropylene (PP), polybutylene terephthalate (PBT), polycarbonate (PC), and Noryl (registered trademark) resin (modified PPE). These thermoplastic resins have a larger spring constant than that of a resin sheet constituting heat conductive member 5008.

In addition, in displacement regulator 5010, a dimension in a perpendicular direction to the arrangement direction of assembly 5002 and cooling plate 5006 is larger than a dimension, in the perpendicular direction, of a stacked structure of output terminal 5024, bus bar 5004, heat conductive member 5008, and expansion and contraction mechanism 5030. In the present exemplary embodiment, as shown in FIG. 38, four displacement regulators 5010 extend along axis X while sandwiching bus bar 5004 extending along axis X, at both ends of assembly 5002 in axis Y. Each displacement regulator 5010 extends over a plurality of batteries 5012. Such a configuration makes it possible to more reliably suppress application of mechanical stress to the stacked structure, even when expansion and contraction mechanism 5030 is deformed unevenly, that is, compressed so as to be inclined instead of being compressed evenly in axis Z. Note that the number of displacement regulators 5010 is not particularly limited, and it suffices that at least one is provided.

Further, separator 5014 of the present exemplary embodiment has protrusion 5038 in contact with first face 5020a, on a face opposed to first face 5020a of battery 5012. Protrusion 5038 is located inward of joint 5021 when viewed in an arrangement direction (direction Z) of assembly 5002 and cooling plate 5006. Further, protrusion 5038 is arranged between output terminal 5024 and joint 5021 when viewed in direction Y or direction X. Further, on a face of separator 5014 opposed to first face 5020a, a flat region where protrusion 5038 is not provided does not abut on joint 5021. Joint 5021 has a relatively large dimensional tolerance for a projecting height from first face 5020a. On the other hand, by adopting the above structure, it is possible to define dimension H1 of displacement regulator 5010 provided on separator 5014, while eliminating an influence of the dimensional tolerance of joint 5021. Therefore, an assembly tolerance of dimension H1 of displacement regulator 5010 can be suppressed. In addition, on a face of separator 5014 opposed to a bottom face of outer can 5020, an elastic member may be provided to bias battery 5012 toward cooling plate 5006.

As described above, battery module 5001 of the present exemplary embodiment includes assembly 5002, a plurality of bus bars 5004, cooling plate 5006, heat conductive member 5008, and expansion and contraction mechanism 5030. Assembly 5002 has a structure obtained by assembling a plurality of batteries 5012 having housing 5019 and a pair of output terminals 5024 arranged on first face 5020a of housing 5019. The plurality of bus bars 5004 electrically connect output terminals 5024 of the plurality of batteries 5012 to each other. Cooling plate 5006 is arranged so as to be opposed to first face 5020a of housing 5019 with the plurality of bus bars 5004 sandwiched in between. Heat conductive member 5008 has an insulating property and abuts on bus bar 5004 and cooling plate 5006, to thermally connect bus bar 5004 and cooling plate 5006.

Expansion and contraction mechanism 5030 can bias a surface of heat conductive member 5008 to bus bar 5004 or cooling plate 5006 by taking a state of being elastically deformed and contracted, and maintains thermal connection between cooling plate 5006 and bus bar 5004.

Thermally connecting cooling plate 5006 to bus bar 5004 allows bus bar 5004 to be efficiently cooled. This makes it possible to increase capacities of battery 5012 and battery module 5001, without increasing a heat capacity of the bus bar by increasing a size and complicating a structure of the bus bar. In addition, it is possible to suppress temperature rise of battery 5012 due to transmission of heat generated in bus bar 5004 to battery 5012. Further, cooling plate 5006 can also cool output terminal 5024 and electrode body via bus bar 5004. Therefore, battery 5012 can be cooled efficiently, and deterioration in power generation performance of battery module 5001 can be suppressed. In addition, a heat dissipation structure of battery module 5001 other than cooling plate 5006 can be omitted or reduced, which enables downsizing and cost reduction of battery module 5001.

In addition, by providing expansion and contraction mechanism 5030, it is possible to absorb a dimensional tolerance of each member such as output terminal 5024, bus bar 5004, heat conductive member 5008, cooling plate 5006, and the like, to more reliably maintain a state where each bus bar 5004 and cooling plate 5006 are thermally connected. Further, when a dimension of a gap between assembly 5002 and cooling plate 5006 is changed with relative displacement of assembly 5002 and cooling plate 5006, expansion and contraction mechanism 5030 can expand and contract in accordance with this change in dimension. Therefore, it is possible to maintain a state where bus bar 5004 and cooling plate 5006 are thermally connected. This allows the plurality of bus bars 5004 to be uniformly cooled, and thus the plurality of batteries 5012 to be uniformly cooled. Therefore, according to the present exemplary embodiment, it is possible to suppress deterioration in power generation performance of battery module 5001.

Further, battery module 5001 includes displacement regulator 5010. Displacement regulator 5010 is interposed between assembly 5002 and cooling plate 5006, and a dimension in the arrangement direction of assembly 5002 and cooling plate 5006 is less than or equal to a projecting height from first face 5020a in a stacked structure of output terminal 5024, bus bar 5004, heat conductive member 5008, and expansion and contraction mechanism 5030. Then, displacement regulator 5010 abuts on both assembly 5002 and cooling plate 5006 at least when assembly 5002 and cooling plate 5006 are displaced in a direction approaching each other.

In a structure where cooling plate 5006 abuts on bus bar 5004, when assembly 5002 and cooling plate 5006 are relatively displaced due to vibration and the like inputted to battery module 5001 from outside, a large load may be applied to output terminal 5024. If the load applied to output terminal 5024 becomes excessive, output terminal 5024 may have damage or the like and the power generation performance of battery 5012 may deteriorate. On the other hand, in battery module 5001 in which a terminal formation face of battery 5012 and cooling plate 5006 are arranged to face each other, displacement in the approaching direction of assembly 5002 and cooling plate 5006 can be regulated by providing displacement regulator 5010 between assembly 5002 and cooling plate 5006. This can reduce the load that may be applied to output terminal 5024 due to approach of assembly 5002 and cooling plate 5006. Therefore, it is possible to suppress deterioration in power generation performance of battery 5012.

Further, heat conductive member 5008 of the present exemplary embodiment has elasticity, and expansion and contraction mechanism 5030 includes heat conductive member 5008. In this way, heat conductive member 5008 also functions as expansion and contraction mechanism 5030, which can reduce the number of parts of battery module 5001. In addition, the structure of battery module 5001 can be simplified.

Further, dimension H1 of displacement regulator 5010 is larger than a sum of projecting height H3 of output terminal 5024 and dimension H4 of bus bar 5004. This allows displacement regulator 5010 to more reliably reduce a load applied to output terminal 5024. Further, displacement regulator 5010 has a larger spring constant than that of expansion and contraction mechanism 5030. In other words, displacement regulator 5010 is more rigid than expansion and contraction mechanism 5030. This allows displacement regulator 5010 to more reliably regulate displacement in the direction in which assembly 5002 and cooling plate 5006 approach each other.

Further, assembly 5002 has separator 5014, and displacement regulator 5010 is provided on wall 5014a opposed to cooling plate 5006 in separator 5014. This makes it possible to suppress increase in the number of parts of battery module 5001 and complication of a manufacturing process due to the provision of displacement regulator 5010.

Further, battery module 5001 includes a pair of displacement regulators 5010 arranged with output terminal 5024 sandwiched in between. Such an arrangement of displacement regulator 5010 enables more reliable reduction of a load applied to output terminal 5024.

Eleventh Exemplary Embodiment

Figure 42:
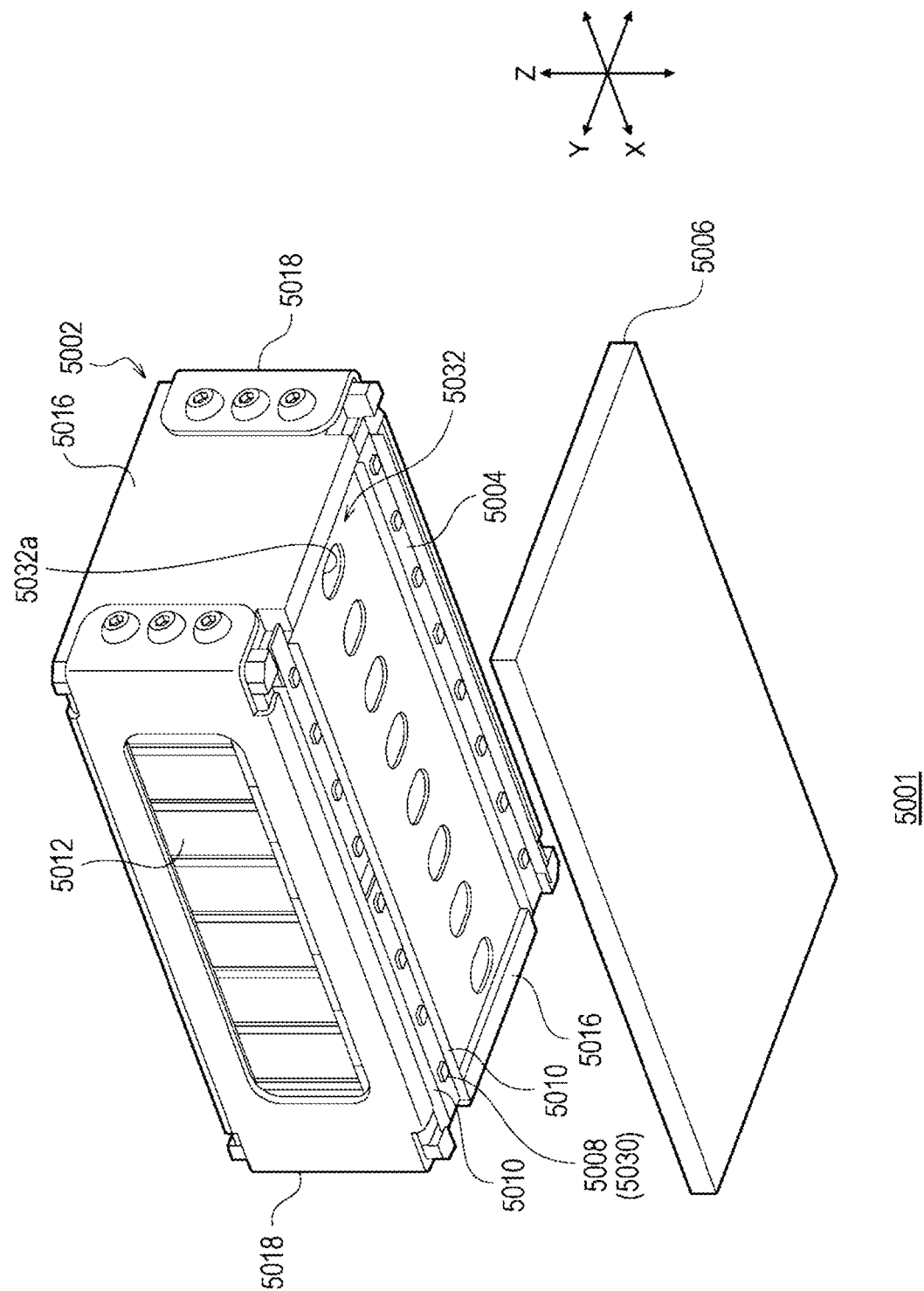
FIG. 42 is a perspective view of a battery module according to an eleventh exemplary embodiment.

The eleventh exemplary embodiment has the same configuration as the tenth exemplary embodiment except that a battery module includes a bus bar plate. Hereinafter, the present exemplary embodiment will be mainly described with configurations different from those of the tenth exemplary embodiment, and the common configurations will be briefly described or omitted. FIG. 42 is a perspective view of a battery module according to the eleventh exemplary embodiment. Note that FIG. 42 illustrates a state where a cooling plate is disassembled.

Battery module 5001 includes assembly 5002, a plurality of bus bars 5004, cooling plate 5006, heat conductive member 5008, displacement regulator 5010, and expansion and contraction mechanism 5030. Expansion and contraction mechanism 5030 includes heat conductive member 5008 having elasticity. Assembly 5002 has a plurality of batteries 5012, a pair of end plates 5016, a pair of bind bars 5018, and bus bar plate 5032.

Bus bar plate 5032 is a plate-shaped member that is arranged so as to be opposed to first face 5020a provided with output terminals 5024 of the plurality of batteries 5012, and covers first face 5020a. For example, bus bar plate 5032 is fixed to end plate 5016 or the like by a fastening member (not illustrated). Alternatively, bus bar plate 5032 may be fixed by being gripped by the pair of end plates 5016 and the pair of bind bars 5018. Bus bar plate 5032 corresponds to an assembly of walls 5014a included in individual separators 5014 in the tenth exemplary embodiment. Moreover, between adjacent batteries 5012 and between battery 5012 and end plate 5016, flat plate-shaped separator (not illustrated) is arranged.

Bus bar plate 5032 has opening 5032a at a position corresponding to safety valve 5026 of battery 5012 so as to expose safety valve 5026 to outside. Further, bus bar plate 5032 has an opening (not illustrated) at a position corresponding to output terminal 5024 of battery 5012 so as to expose output terminal 5024 to outside. The plurality of bus bars 5004 are mounted on bus bar plate 5032 and supported by bus bar plate 5032.

Displacement regulator 5010 is provided on a face opposed to cooling plate 5006 in bus bar plate 5032. That is, displacement regulator 5010 includes a projection projecting from a main surface of bus bar plate 5032 toward cooling plate 5006. Specifically, at both ends of the opening to expose output terminal 5024 in bus bar plate 5032, a pair of displacement regulators 5010 are provided. Therefore, the pair of displacement regulators 5010 are arranged with output terminal 5024 sandwiched in between.

Battery module 5001 according to the present exemplary embodiment can also suppress deterioration in power generation performance of battery module 5001, similarly to the tenth exemplary embodiment.

Twelfth Exemplary Embodiment

Figure 43:
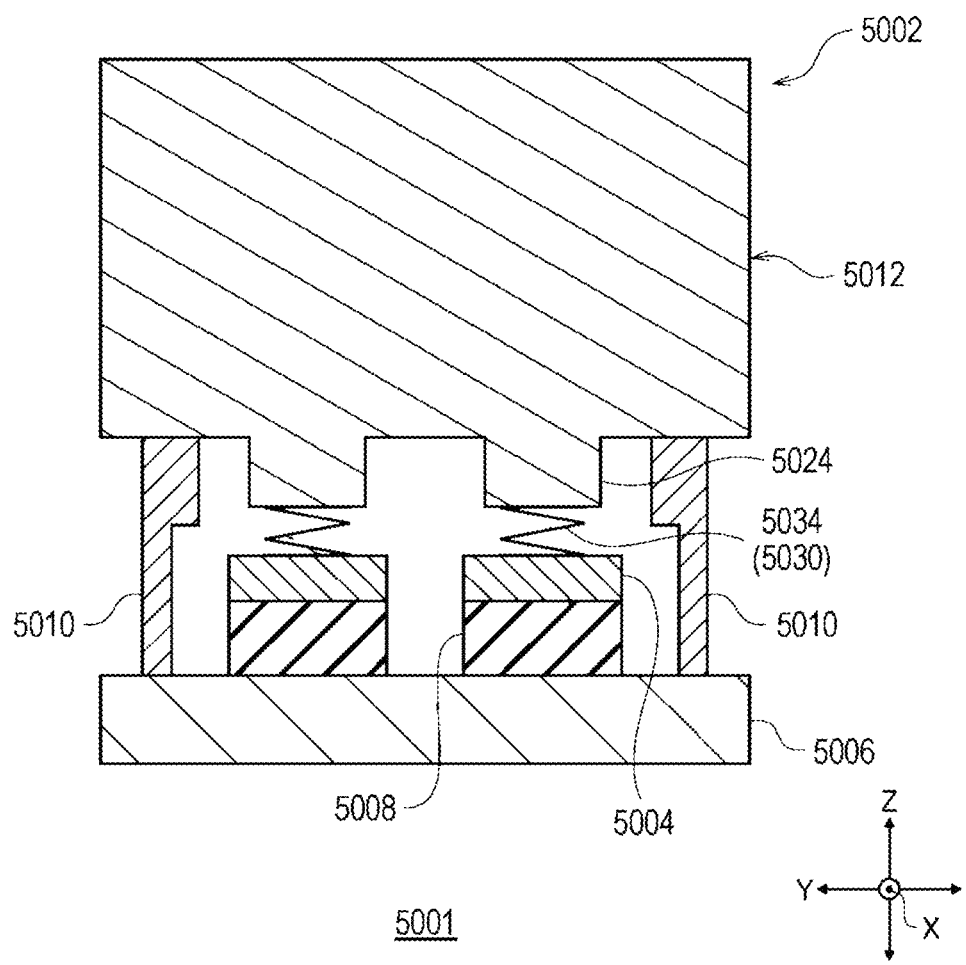
FIG. 43 is a cross-sectional view schematically showing a battery module according to a twelfth exemplary embodiment.

The twelfth exemplary embodiment has the same configuration as the tenth exemplary embodiment except that a structure of expansion and contraction mechanism 5030 is different. Hereinafter, the present exemplary embodiment will be mainly described with configurations different from those of the tenth exemplary embodiment, and the common configurations will be briefly described or omitted. FIG. 43 is a cross-sectional view schematically showing a battery module according to the twelfth exemplary embodiment. In FIG. 43, illustration of an internal structure of battery 5012 and cooling plate 5006, separator 5014, and bind bar 5018 are omitted.

Battery module 5001 includes assembly 5002, a plurality of bus bars 5004, cooling plate 5006, heat conductive member 5008, displacement regulator 5010, and expansion and contraction mechanism 5030. Assembly 5002 has a plurality of batteries 5012, a plurality of separators 5014, a pair of end plates 5016, and a pair of bind bars 5018.

Further, battery module 5001 of the present exemplary embodiment includes spring member 5034 interposed between output terminal 5024 and bus bar 5004. Then, expansion and contraction mechanism 5030 includes spring member 5034. Spring member 5034 has conductivity. Therefore, output terminal 5024 and bus bar 5004 are electrically connected via spring member 5034. As spring member 5034, a known spring such as a coil spring or a leaf spring can be used. Further, spring member 5034 is fixed to any one or both of output terminal 5024 and bus bar 5004. Examples of a fixing method include welding and fixing with an adhesive. Further, spring member 5034 and bus bar 5004 may be integrally configured by bending a part of bus bar 5004 to provide bus bar 5004 with a spring structure.

In a state where battery module 5001 is assembled, spring member 5034 can be elastically deformed by being sandwiched between bus bar 5004 and output terminal 5024, to take a contracted state. Further, a contraction amount of spring member 5034 changes in accordance with a size of a gap between bus bar 5004 and output terminal 5024. Therefore, a tolerance of each member can be absorbed by spring member 5034.

Spring member 5034 can press bus bar 5004 against heat conductive member 5008 by taking a contracted state. This allows a surface of heat conductive member 5008 to be biased to bus bar 5004 and cooling plate 5006. In this way, by being pressed against both bus bar 5004 and cooling plate 5006, heat conductive member 5008 can maintain thermal connection between cooling plate 5006 and bus bar 5004. A dimension of spring member 5034 in an arrangement direction of assembly 5002 and cooling plate 5006 is set large enough to reliably absorb a tolerance of each member and maintain the thermal connection between cooling plate 5006 and bus bar 5004.

Displacement regulator 5010 of the present exemplary embodiment is configured separately from separator 5014. However, the configuration is not particularly limited to this, and displacement regulator 5010 may be integrally molded with separator 5014 similarly to the tenth exemplary embodiment.

Battery module 5001 according to the present exemplary embodiment can also suppress deterioration in power generation performance of battery module 5001, similarly to the tenth exemplary embodiment.

Thirteenth Exemplary Embodiment

Figure 44:
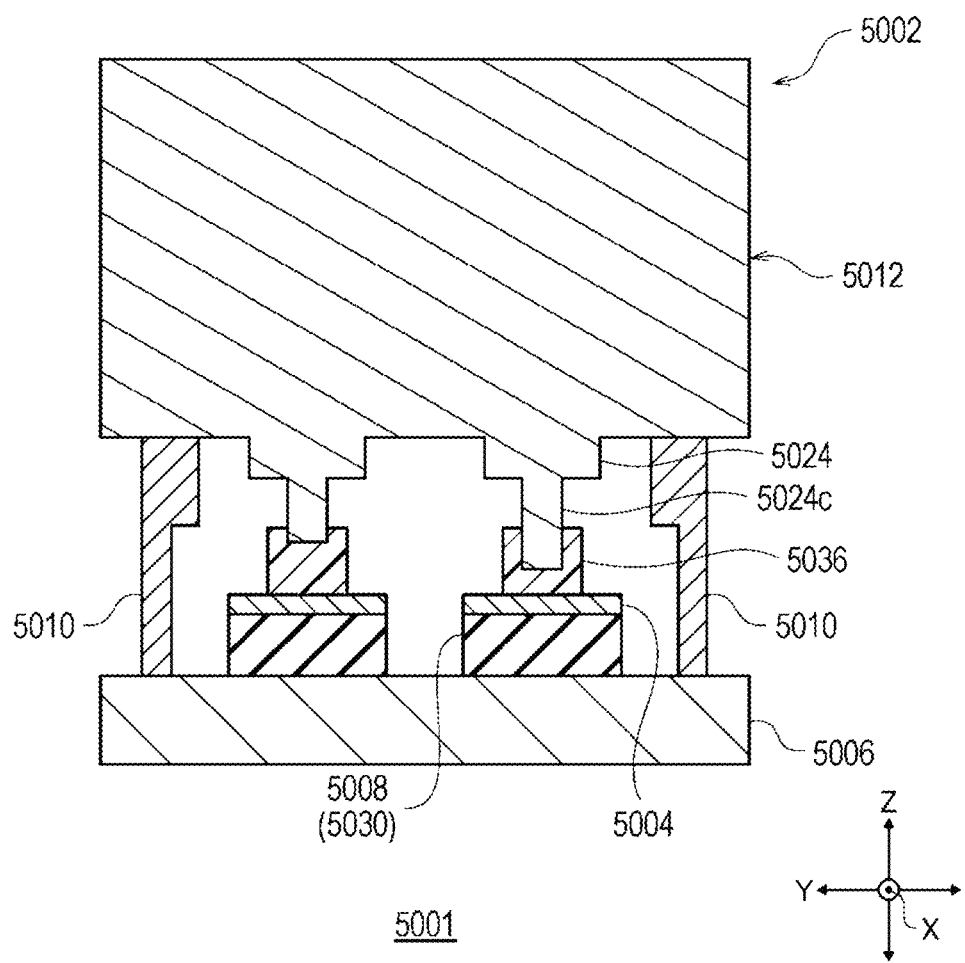
FIG. 44 is a cross-sectional view schematically showing a battery module according to a thirteenth exemplary embodiment.

The thirteenth exemplary embodiment has the same configuration as the tenth exemplary embodiment except that a battery module further includes an adhesive layer. Hereinafter, the present exemplary embodiment will be mainly described with configurations different from those of the tenth exemplary embodiment, and the common configurations will be briefly described or omitted. FIG. 44 is a cross-sectional view schematically showing a battery module according to the thirteenth exemplary embodiment. In FIG. 44, illustration of an internal structure of battery 5012 and cooling plate 5006, separator 5014, and bind bar 5018 are omitted.

Battery module 5001 includes assembly 5002, a plurality of bus bars 5004, cooling plate 5006, heat conductive member 5008, displacement regulator 5010, and expansion and contraction mechanism 5030. Expansion and contraction mechanism 5030 includes heat conductive member 5008 having elasticity. Assembly 5002 has a plurality of batteries 5012, a plurality of separators 5014, a pair of end plates 5016, and a pair of bind bars 5018.

Further, battery module 5001 of the present exemplary embodiment includes conductive adhesive layer 5036 that fixes output terminal 5024 to bus bar 5004. Examples of a conductive adhesive constituting adhesive layer 5036 include an epoxy resin mixed with a conductive material filler such as silver (Ag). Adhesive layer 5036 is interposed between output terminal 5024 and bus bar 5004, and abuts on both. Therefore, output terminal 5024 and bus bar 5004 are electrically connected via adhesive layer 5036.

Output terminal 5024 of the present exemplary embodiment has projection 5024c that projects toward cooling plate 5006. Then, a tip end of projection 5024c is embedded in adhesive layer 5036. Therefore, output terminal 5024 is in contact with adhesive layer 5036 at a tip end face and a side face of projection 5024c. This can increase a contact area between output terminal 5024 and adhesive layer 5036. As a result, output terminal 5024 and bus bar 5004 can be fixed more reliably. In addition, output terminal 5024 and bus bar 5004 can be electrically connected more reliably. Alternatively, output terminal 5024 may have an elongated shape as a whole extending toward cooling plate 5006. In this case as well, the tip end face and the side face of output terminal 5024 can be easily brought into contact with adhesive layer 5036.

Adhesive layer 5036 is formed, for example, as follows. That is, in a state where an uncured adhesive is applied to a surface of bus bar 5004, output terminal 5024 is inserted into the adhesive. Alternatively, in a state where an uncured adhesive is applied to a tip end of output terminal 5024, bus bar 5004 is pressed against the adhesive. By curing the adhesive in this state, adhesive layer 5036 is formed, and output terminal 5024 and bus bar 5004 are fixed by adhesive layer 5036.

Preferably, bus bar 5004 has a recess or a groove extending along a longitudinal axis of bus bar 5004. This allows the adhesive to be applied to the recess or the groove of bus bar 5004, and the adhesive to be reliably retained in a desired position during assembly of battery module 5001. As a result, a manufacturing process of battery module 5001 can be simplified.

Displacement regulator 5010 of the present exemplary embodiment is configured separately from separator 5014. However, the configuration is not particularly limited to this, and displacement regulator 5010 may be integrally molded with separator 5014 similarly to the tenth exemplary embodiment.

Battery module 5001 according to the present exemplary embodiment can also suppress deterioration in power generation performance of battery module 5001, similarly to the tenth exemplary embodiment. Further, in the present exemplary embodiment, not only heat conductive member 5008 but also adhesive layer 5036 can absorb a dimensional tolerance of each member. Therefore, adhesive layer 5036 forms a part of expansion and contraction mechanism 5030. This makes it possible to further secure the thermal connection between bus bar 5004 and cooling plate 5006.

In addition, since adhesive layer 5036 can absorb a dimensional tolerance of each member, a contraction amount of each heat conductive member 5008 can be made uniform in a state where battery module 5001 is assembled. This allows a thermal connection state between each bus bar 5004 and cooling plate 5006 to be made uniform, and enables more even cooling of entire battery module 5001.

The number of batteries 5012 included in assembly 5002 and the number of heat conductive members 5008 are not particularly limited. A structure of each part of assembly 5002, including a shape of separator 5014 and a fastening structure of end plate 5016 and bind bar 5018, is also not particularly limited.

REFERENCE MARKS IN THE DRAWINGS

1: battery pack
20, 120, 220, 320, 420: battery module
21: battery group
31: battery
40, 240: bus bar
40a: metal part (main body)
40b: insulating part
42, 43: output terminal
45: first face
46: orthogonal face
50, 150, 250, 350, 450: cooling plate
50a: flat plate
50b: first face contact part
51: passage
61: electrode body
62: outer can
63: lid
241: protrusion (first locking part)
253: hole (second locking part)
455: orthogonal face contact part
2001: battery module
2002: assembly
2004: cooling plate
2006: battery
2014: output terminal
2016: bus bar
2020: housing
2020a: first face
2022: valve
2024: electrode body
2032: current collector
2040: electrode plate
2050: spacer
52: wall
4001: battery module
4002: assembly
4004: bus bar
4006: cooling plate
4006a: first main surface
4006b: second main surface
4012: battery
4019: housing
4020a: first face
4024: output terminal
4026: valve
4030: gas guiding part
4032: gas flow part
4040: thin-walled part
4042: first bottomed hole
4044: second bottomed hole
4048: flange
4050: stepped part
5001: battery module
5002: assembly
5004: bus bar
5006: cooling plate
5008: heat conductive member
5010: displacement regulator
5012: battery
5014: separator
5020: outer can
5020a: first face
5024: output terminal
5030: expansion and contraction mechanism
5032: bus bar plate
5034: spring member
5036: adhesive layer

The invention claimed is:

1. A battery module comprising:
a plurality of batteries;
one or more bus bars that electrically connect the plurality of batteries together; and
a cooling plate that is thermally connected to the one or more bus bars, wherein each of the plurality of batteries includes:
an electrode body;
a housing that accommodates the electrode body;
a pair of output terminals electrically connected to the electrode body and arranged on a first face of the housing; and
a pair of tabs extending from the electrode body toward the first face of the housing, the pair of tabs electrically connected to the electrode body, and
among the pair of output terminals, one output terminal is connected to a corresponding one of the one or more bus bars, and
wherein the housing of each of the plurality of batteries has a valve arranged on a face different from the first face, the valve being configured to release gas inside the housing, and
each of the pair of tabs includes a plurality of tabs, and the plurality of tabs are arranged in a direction perpendicular to the direction in which the pair of output terminals are aligned.

2. The battery module according to claim 1, wherein the cooling plate internally has one or more passages to allow a coolant to flow through.

3. The battery module according to claim 1, wherein each of the one or more bus bars includes a main body made of metal, and an insulating part made of an insulating material to insulate the cooling plate from the main body.

4. The battery module according to claim 1, wherein the cooling plate includes a main body made of metal, and an insulating part made of an insulating material to insulate the main body from the one or more bus bars.

5. The battery module according to claim 1, wherein
at least one of the one or more bus bars has one or more first locking parts, and
the cooling plate has one or more second locking parts that are locked to the one or more first locking parts.

6. The battery module according to claim 1, wherein the cooling plate further includes a first face contact part that is in contact with a portion between the pair of output terminals, on an outer face of the first face.

7. The battery module according to claim 1, wherein the cooling plate further includes an orthogonal face contact part that is in contact with an orthogonal face substantially orthogonal to the first face in each of the plurality of batteries.

8. The battery module according to claim 6, wherein the cooling plate further has a flat plate arranged below the pair of output terminals in a vertical direction.

9. The battery module according to claim 1, wherein, among the pair of output terminals in each of the plurality of batteries, the cooling plate is thermally connected to both a bus bar connected to one output terminal and a bus bar connected to another output terminal.

10. The battery module according to claim 6, wherein the cooling plate has a first main surface opposed to the plurality of batteries and a second main surface located on an opposite side to the first main surface, on the first main surface, a region formed with an abutting face of the first face contact part projects toward the plurality of batteries, and on the second main surface, at least a part of a region overlapping with the abutting face of the first face contact part is recessed.

11. The battery module according to claim 6, wherein in the cooling plate, the first face contact part is thicker than a remaining portion, and a passage in the first face contact part has a larger dimension in a thickness direction of the cooling plate than a passage in a remaining portion.

12. The battery module according to claim 6, wherein the cooling plate has a flat plate opposed to the one or more bus bars, and a connector connecting the flat plate and the first face contact part, the connector being more flexible than the flat plate and the first face contact part.

13. The battery module according to claim 6, wherein the cooling plate is opposed to the first face, between the cooling plate and the first face, a plurality of heat transfer sheets are provided, and among the plurality of heat transfer sheets, rigidity of a heat transfer sheet interposed between the first face contact part and the first face is different from rigidity of a heat transfer sheet interposed between the first face and a remaining portion excluding the first face contact part of the cooling plate.

14. The battery module according to claim 1, wherein each of the plurality of batteries has a current collector that connects the pair of output terminals and the electrode body, in the electrode body, a plurality of positive electrode plates and a plurality of negative electrode plates are stacked, the valve faces upward in a vertical direction, and at least a part of the current collector is flexible by a weight of the electrode body.

15. The battery module according to claim 1, wherein each of the plurality of batteries further has a spacer that is arranged between the electrode body and a face where the valve of the housing is provided, the spacer being configured to separate the electrode body and the valve.

16. The battery module according to claim 15, wherein in the electrode body, a plurality of positive electrode plates and a plurality of negative electrode plates are stacked and included, and the spacer has:

a base opposed to a valve arrangement face of the housing; and a wall that projects from a face facing toward the electrode body, the wall extending in a direction that intersects an extending direction of a positive electrode plate and a negative electrode plate of the electrode body.

17. The battery module according to claim 16, wherein the base has a recess at a position overlapping with the valve, and the recess opens toward the electrode body.

18. The battery module according to claim 17, wherein the base has a thin-walled part constituting a bottom face of the recess, and the thin-walled part is flexible to a degree to be broken when gas is released from the valve.

19. The battery module according to claim 17, wherein the base has a thin-walled part constituting a bottom face of the recess, and the thin-walled part has a fragile part that is broken when gas is released from the valve.

20. The battery module according to claim 16, wherein the base has a through hole at a position overlapping with the valve.

21. The battery module according to claim 1, wherein in the electrode body, a plurality of positive electrode plates and a plurality of negative electrode plates are stacked, a restraint part that restrains an edge of the electrode body is provided, the housing has a valve arrangement face, and a valve non-arrangement face including the first face, and the restraint part restrains the edge opposed to the valve non-arrangement face.

22. The battery module according to claim 21, wherein the valve non-arrangement face has an opposing face that is opposed to the valve arrangement face, and the restraint part restrains the edge closer to the opposing face than the valve arrangement face.

23. The battery module according to claim 22, wherein the restraint part restrains the edge opposed to the opposing face.

24. The battery module according to claim 21, wherein the electrode body has a first edge opposed to the valve arrangement face and a second edge on an opposite side to the first edge, the restraint part has a first gripper that grips the first edge and a second gripper that grips the second edge, and when viewed from a stacking direction of the plurality of positive electrode plates and the plurality of negative electrode plates, a total area of a portion gripped by the first gripper at the first edge is smaller than a total area of a portion gripped by the second gripper at the second edge.

25. The battery module according to claim 21, wherein the electrode body has a first edge opposed to the valve arrangement face and a second edge on an opposite side to the first edge, and the restraint part exclusively grips the second edge of the electrode body.

26. The battery module according to claim 21, wherein the electrode body has a first edge opposed to the valve arrangement face and a second edge on an opposite side to the first edge, the restraint part has a first gripper that grips the first edge and a second gripper that grips the second edge, and the first gripper has a larger deformation amount than a deformation amount of the second gripper, when receiving a force in a stacking direction of the plurality of positive electrode plates and the plurality of negative electrode plates.

27. The battery module according to claim 21, wherein the valve arrangement face is opposed to the first face.

28. The battery module according to claim 21, wherein the valve arrangement face is opposed to an end face parallel to a stacking direction of the plurality of positive electrode plates and the plurality of negative electrode plates in the electrode body.

29. The battery module according to claim 1, wherein the housing of each of the plurality of batteries has a valve arranged on the first face and configured to release gas inside the housing, and a first main surface of the cooling plate is arranged to be opposed to the first face, and the cooling plate has a gas flow part including a bottomed hole or a bottomless hole being open in an arrangement direction of the plurality of batteries and the cooling plate, the gas flow part overlapping at least partially with the valve when viewed from the arrangement direction.

30. The battery module according to claim 29, wherein the gas flow part has a shape that a gas flow path area orthogonal to the arrangement direction gradually changes from one end side to another end side in the arrangement direction.

31. The battery module according to claim 30, wherein in the gas flow part, a flow path area at an end on the first main surface side is smaller than a flow path area at an end on a second main surface side opposed to the first main surface.

32. The battery module according to claim 30, wherein in the gas flow part, a flow path area at an end on the first main surface side is larger than a flow path area at an end on a second main surface side opposed to the first main surface.

33. The battery module according to claim 29, wherein
the gas flow part includes the bottomed hole, and
the cooling plate has a thin-walled part that constitutes a bottom face of the bottomed hole, the thin-walled part being integrally molded with a periphery of the bottomed hole.

34. The battery module according to claim 30, wherein
the gas flow part includes a first bottomed hole that opens on the first main surface and a second bottomed hole that opens on the second main surface opposed to the first main surface,
the first bottomed hole and the second bottomed hole are arranged to have respective bottom faces opposed to each other,
in the first bottomed hole, a flow path area at an end on the first main surface side is larger than a flow path area at an end on the second main surface side, and
in the second bottomed hole, a flow path area at an end on the second main surface side is larger than a flow path area at an end on the first main surface side.

35. The battery module according to claim 29, wherein when viewed from the arrangement direction, an entire peripheral edge of the valve is located in a region surrounded by a peripheral edge of an end of the gas flow part on the first main surface side.

36. The battery module according to claim 29, wherein
the valve and the gas flow part have a gap in the arrangement direction, and
the battery module has a gas guiding part having a tubular shape and arranged in the gap between the valve and the gas flow part.

37. The battery module according to claim 36, wherein the gas guiding part has a flange expanding outward of a tube.

38. The battery module according to claim 36, wherein
the cooling plate has a stepped part that surrounds a periphery of the gas flow part on the first main surface, and
the gas guiding part engages with the stepped part.

39. The battery module according to claim 1, wherein
the cooling plate is arranged to be opposed to the first face with the one or more bus bars sandwiched in between, and
the cooling plate further comprising:
a heat conductive member that has an insulating property and abuts on the one or more bus bars and the cooling plate to thermally connect the one or more bus bars and the cooling plate; and
an expansion and contraction mechanism configured to bias a surface of the heat conductive member to the one or more bus bars or the cooling plate, by taking a state of being elastically deformed and contracted.

40. The battery module according to claim 39, further comprising a displacement regulator that is interposed between the plurality of batteries and the cooling plate, wherein a dimension in an arrangement direction of the plurality of batteries and the cooling plate is less than or equal to a projecting height from the first face in a stacked structure of the pair of output terminals, each of the one or more bus bars, the heat conductive member, and the expansion and contraction mechanism, the displacement regulator abutting on both the plurality of batteries and the cooling plate at least when the plurality of batteries and the cooling plate are displaced in a direction approaching each other.

41. The battery module according to claim 39, wherein
the heat conductive member has elasticity, and
the expansion and contraction mechanism includes the heat conductive member.

42. The battery module according to claim 39, further comprising
a spring member interposed between each of the one or more bus bars and at least one of the pair of output terminals, wherein
the expansion and contraction mechanism includes the spring member.

43. The battery module according to claim 40, wherein a dimension of the displacement regulator in the arrangement direction is larger than a sum of the projecting height of at least one of the pair of output terminals and a dimension of each of the one or more bus bars in the arrangement direction.

44. The battery module according to claim 40, wherein the displacement regulator has a larger spring constant than a spring constant of the expansion and contraction mechanism.

45. The battery module according to claim 40, further comprising
a separator arranged between adjacent batteries to insulate between the adjacent batteries, wherein
the displacement regulator is provided on a face that is opposed to the cooling plate in the separator.

46. The battery module according to claim 40, further comprising
a bus bar plate arranged to be opposed to the first face of a plurality of the batteries and mounted with a plurality of the bus bars, wherein
the displacement regulator is provided on a face that is opposed to the cooling plate in the bus bar plate.

47. The battery module according to claim 40, wherein the battery module includes a pair of displacement regulators each being the displacement regulator that are arranged with at least one of the pair of output terminals sandwiched in between.

48. The battery module according to claim 39, further comprising a conductive adhesive layer that fixes at least one of the pair of output terminals to the one or more bus bars.

49. The battery module according to claim 40, wherein a dimension of the displacement regulator in a perpendicular direction to the arrangement direction is larger than a dimension of the stacked structure in the perpendicular direction.

50. The battery module according to claim 45, wherein
the housing has: an outer can having an opening; a lid that seals the opening; and a joint that joins the opening and a peripheral edge of the lid,
the separator has a protrusion in contact with the first face, on a face that is opposed to the first face, and the protrusion is located inward of the joint when viewed from the arrangement direction of the plurality of batteries and the cooling plate.

\* \* \* \* \*